US 6,707,773 B2

(12) United States Patent
Katayama

(10) Patent No.: US 6,707,773 B2
(45) Date of Patent: Mar. 16, 2004

(54) OPTICAL HEAD AND OPTICAL INFORMATION RECORDING AND PLAYBACK APPARATUS

(75) Inventor: Ryuichi Katayama, Tokyo (JP)

(73) Assignee: NEC Corporation, Tokyo (JP)

( * ) Notice: Subject to any disclaimer, the term of this patent is extended or adjusted under 35 U.S.C. 154(b) by 462 days.

(21) Appl. No.: 09/836,282

(22) Filed: Apr. 18, 2001

(65) Prior Publication Data
US 2001/0036137 A1 Nov. 1, 2001

(30) Foreign Application Priority Data
Apr. 20, 2000 (JP) ........................................ 2000-119919

(51) Int. Cl.$^7$ ................................................. G11B 7/00
(52) U.S. Cl. ............................... 369/53.19; 369/44.32; 369/44.26; 369/112.12; 369/112.15
(58) Field of Search ......................... 369/53.19, 44.32, 369/44.37, 44.23, 44.24, 44.41, 44.42, 112.03, 112.05, 112.06, 112.07, 112.1, 112.11, 112.12, 112.15, 112.04

(56) References Cited

U.S. PATENT DOCUMENTS

| 4,525,826 A | 7/1985 | Nakamura et al. |
| 5,001,690 A | 3/1991 | Kamiya et al. |
| 5,523,989 A | 6/1996 | Ishibashi |

FOREIGN PATENT DOCUMENTS

| EP | 0 351 953 A2 | 1/1990 |
| EP | 0 357 323 A2 | 3/1990 |
| EP | 0 749 116 A1 | 12/1996 |
| EP | 0 953 974 A2 | 11/1999 |
| EP | 1 003 161 A2 | 5/2000 |
| JP | 03-38737 | 2/1991 |
| JP | 05-307764 | 11/1993 |
| JP | 05-342613 | 12/1993 |
| JP | 07-141673 | 6/1995 |
| JP | 9-81942 A | 3/1997 |
| JP | 09-161293 | 6/1997 |
| JP | 11-134677 A | 5/1999 |
| JP | 2000-21014 A | 1/2000 |
| JP | 2000-57608 | 2/2000 |
| JP | 2000-90454 A | 3/2000 |

OTHER PUBLICATIONS

Motegi et al., "Development of Tilt Servo System using 4–Axis Lens Actuator for Disc Tilt Compensation",ISOM/ODS'99 Technical Digest, *SPIE*, vol. 3864, 1999, pp. 20–22.
Murao et al., "Tilt Servo using a Liquid Crystal Device", ISOM/ODS'96 Technical Digest, pp. 351–353.
Nakai et al., "Balanced Push–Pull Method for Tracking Error Sensing of Optical Pickup", *Proceedings of the 57$^{th}$ Annual Conference of the Japan Society for Applied Physics*, vol. 3, 1996, pp. 906 (7p–E–1).
Katayama et al., "Land/Grove Signal and Differential Push–Pull Signal Detection for Optical Disks by an Improved 3–Beam Method", *Japan Journal of Applied Physics*, vol. 38, 1999, 1761–1767.

*Primary Examiner*—Thang V. Tran
(74) *Attorney, Agent, or Firm*—Sughrue Mion, PLLC

(57) ABSTRACT

An object of the present invention is to provide an optical head apparatus which are capable of detecting correctly a radial tilt of an optical recording medium, without allowing offsets in radial tilt signals, even when an objective lens is shifted in a radial direction. A beam emitted from a semiconductor laser is divided into 0th order main beam and ±1st order sub beams. The three beams are shifted in the radial direction of the disc. The three beams reflected from the disc are diffracted by a holographic element, and are received by a photo detector. With respect to the main beam and the sub beams, a radial tilt of the disc is detected on the basis of a difference between intensities of the main and sub beams diffracted from a plurality of regions of the holographic element.

31 Claims, 20 Drawing Sheets

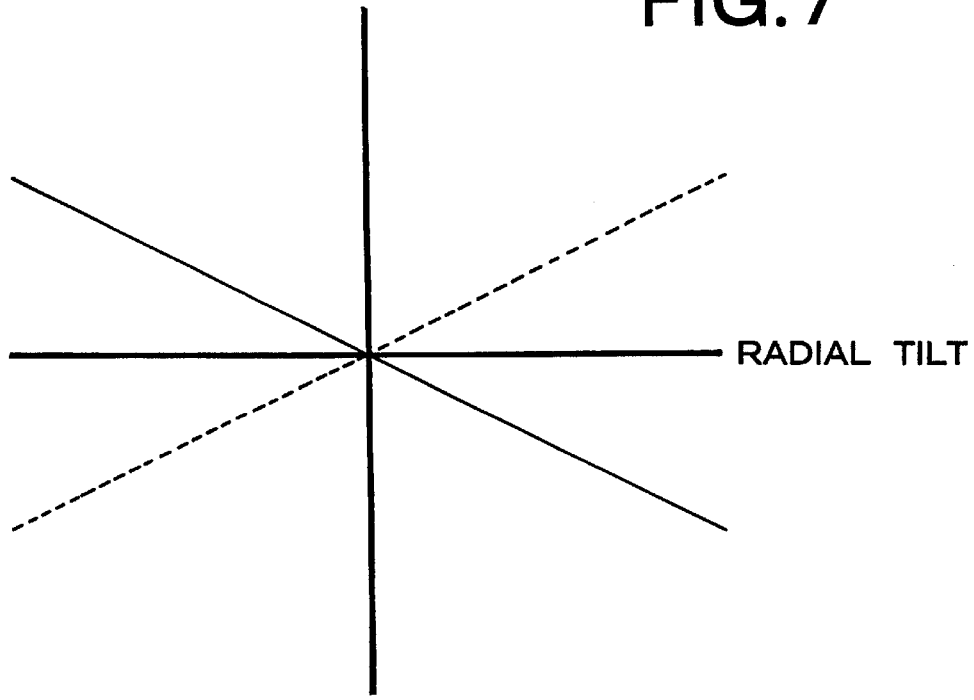
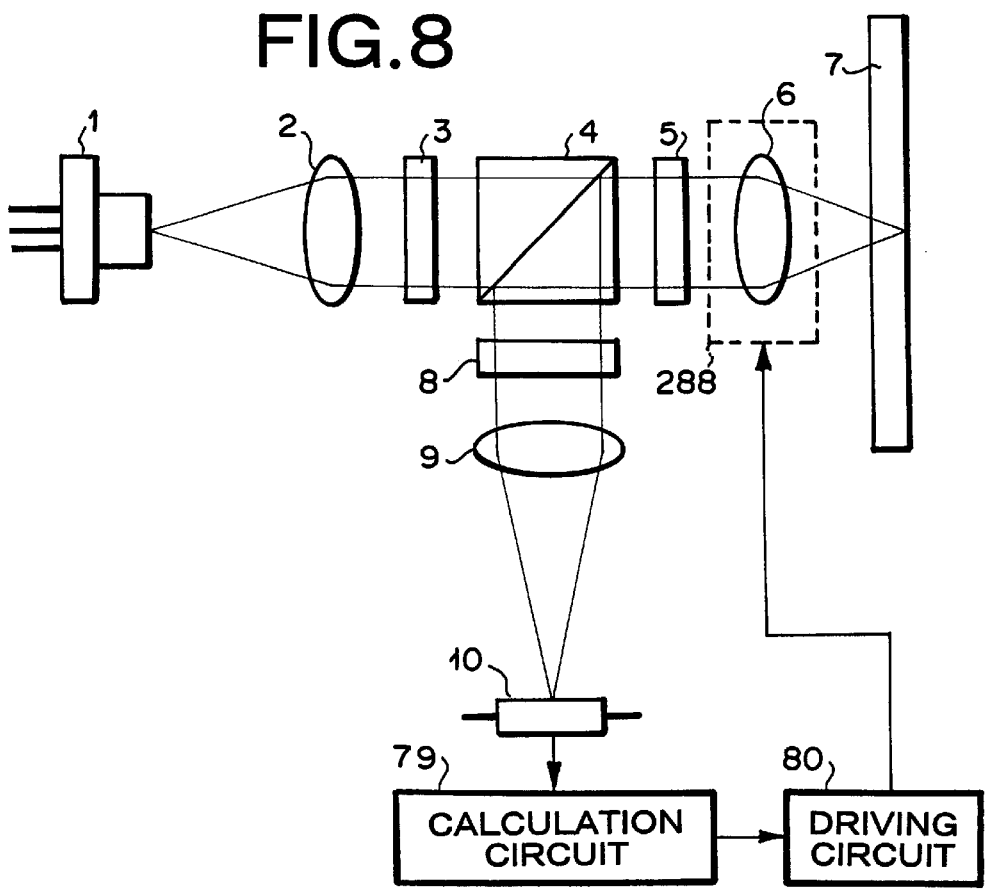

TANGENTIAL DIRECTION

RADIAL DIRECTION

OPTICAL HEAD AND OPTICAL INFORMATION RECORDING AND PLAYBACK APPARATUS

BACKGROUND OF THE INVENTION

1. Technical Field of the Invention

The present invention relates to an optical head apparatus and an optical information recording and playback apparatus which record on and play back from an optical recording medium, and particularly relates to an optical head apparatus and an optical information recording/playback apparatus which are capable of detecting a radial tilt of an optical recording medium.

2. Description of the Prior Art

A recording density in an optical information recording/playback apparatus is inversely proportional to a square of a diameter of a focused spot formed on an optical recording medium by an optical head apparatus. As the diameter of the focused spot becomes smaller, the recording density becomes higher. The diameter of the focused spot is inversely proportional to a numerical aperture of an objective lens in the optical head apparatus. Further, as the numerical aperture of the objective lens becomes higher, the diameter of the focused spot becomes smaller. Meanwhile, when the optical recording medium is tilted to a radial direction with respect to the objective lens, a shape of the focused spot is distorted due to a coma aberration caused on a substrate of the optical recording medium, and recording/playback characteristics are deteriorated. Since the coma aberration is proportional to a cube of the numerical aperture of the objective lens, as the numerical aperture of the objective lens becomes higher, a margin of a tilt of the optical recording medium in the radial direction with respect to the recording/playback characteristics (radial tilt) becomes smaller. Therefore, in the optical head apparatus and the optical information recording/playback apparatus in which the numerical aperture of the objective lens is made high in order to increase the recording density, it is necessary to detect and compensate the radial tilt of the optical recording medium so that the recording/playback characteristics are not deteriorated.

FIG. 27 shows a structure of a conventional optical head apparatus which is capable of detecting the radial tilt of the optical recording medium. This optical head apparatus is described in Japanese Patent Application Laid-Open No. 7-141673 (1995). A beam emitted from a semiconductor laser 257 is converted into a parallel beam by a collimating lens 258, and about 50% of the beam is transmitted through a half mirror 259 and is focused on a disc 261 by an objective lens 260. A beam reflected by the disc 261 is transmitted through the objective lens 260 in the opposite direction, and about 50% is reflected by a half mirror 259, and is divided into a transmitted beam and diffracted beams by a holographic element 262. The beams are transmitted through a lens 263 and are detected by a photo detector 264.

FIG. 28 is a plan view of the holographic element 262. The holographic element 262 has elliptical grating regions 265 and 266 which are positioned on the radial direction of the disc 261. The directions of the gratings in both the regions 265 and 266 are approximately parallel with a tangential direction of the disc 261, and the pattern of the gratings in both the regions 265 and 266 is off-axis concentric shape. Beams incident to the regions 265 and 266 are partially or fully diffracted as +1st order beams. Meanwhile, beams incident to the outside of the regions 265 and 266 are fully transmitted. Here, a dotted line in FIG. 28 shows an effective diameter of the objective lens 260.

FIG. 29 shows a pattern of detection portions of the photo detector 264 and an arrangement of focused spots on the photo detector 264. A focused spot 271 corresponds to a beam transmitted from the outside of the regions 265 and 266 of the holographic element 262, and it is received by detection portions 267 and 268 which are divided into two by a dividing line passing through an optical axis and parallel with the tangential direction of the disc 261. A focused spot 272 corresponds to the +1st order beam diffracted by the inside of the region 265 of the holographic element 262, and it is received by a single receiving area 269. A focused spot 273 corresponds to the +1st order beam diffracted by the inside of the region 266 of the holographic element 262, and it is received by a single receiving area 270.

When outputs from the detection portions 267 to 270 are represented by V267 to V270 respectively, a tracking error signal is obtained by calculation of (V267+V269)−(V268+V270) according to the push-pull method. A radial tilt signal for detecting a radial tilt of the disc 261 is obtained by calculation of (V267+V270)−(V268+V269). Moreover, a playback signal is obtained by calculation of (V267+V268+V269+V270). A method of obtaining a focusing error signal is not described.

There is explained below the reason the radial tilt of the disc 261 can be detected by the above-mentioned calculation with reference to FIGS. 30 to 32. FIGS. 30 to 32 show calculation examples of intensity distribution of the reflected beam from the disc 261. In the drawings, a dark portion corresponds to a portion where the intensity is strong, and a beaming portion corresponds to a portion where the intensity is weak.

FIG. 30 shows the intensity distribution in the case where the disc 261 does not have the radial tilt. The intensity distribution is symmetrical with respect to a straight line which passes through the optical axis and is parallel to the tangential direction of the disc 261. Further, the intensity is comparatively strong in regions 274 and 276 where the 0th order beam overlaps with the +1st order beam diffracted by the disc 261. The intensity is also comparatively strong in regions 275 and 277 where the 0th order beam overlaps with the −1st order beam diffracted by the disc 261. On the contrary, the intensity is comparatively weak in a region 278 where there is only the 0th order beam from the disc 261.

FIG. 31 shows the intensity distribution in the case where the disc 261 has a positive radial tilt. As for regions 279 and 281 which are regions where the 0th order beam and the +1st order beam diffracted by the disc 261 are overlapped with each other, the intensity in the region 279 as a peripheral area is stronger than the intensity in the region 281 as a central section. As for regions 280 and 282 which are regions where the 0th order beam and the −1st order beam diffracted by he disc 261 are overlapped with each other, the intensity in the region 280 as a peripheral area is weaker than the intensity in the region 282 as a central section.

FIG. 32 shows the intensity distribution in the case where the disc 261 has a negative radial tilt. As for regions 283 and 285 which are regions where the 0th order beam and the +1st order beam diffracted by the disc 261 are overlapped with each other, the intensity in the region 283 as a peripheral area is weaker than the intensity in the region 285 as a central section. As for regions 284 and 286 which are regions where the 0th order beam and the −1st order beam diffracted by the disc 261 are overlapped with each other, the intensity in the region 284 as a peripheral area is stronger than the intensity in the region 286 as a central section.

In FIGS. 30 to 32, the peripheral area and the central area in the region where the 0th order beam and the +1st order beam diffracted by the disc 261 are overlapped with each other correspond to the detection portions 267 and 269 of the photo detector 264 shown in FIG. 29, and the peripheral area and the central area in the region where the 0th order beam and the −1st order beam diffracted by the disc 261 are overlapped with each other correspond to the detection portions 268 and 270 of the photo detector 264 shown in FIG. 29.

When the radial tilt of the disc 261 is zero, positive and negative, a value of (V267+V270)−(V268+V269) as the radial tilt signal becomes zero, positive and negative respectively. Therefore, this radial tilt signal is used to detect the radial tilt of the disc 261. When the radial tilt of the disc 261 is detected, the radial tilt is corrected so as to eliminate a bad influence on the recording/playback characteristics.

In the conventional optical head apparatus, when the objective lens 260 shifts to the radial direction of the disc 261 due to eccentricity or the like of the disc 261, an offset is generated in the radial tilt signal. Therefore, the radial tilt of the disc 261 cannot be correctly detected by the conventional optical heads. Concretely, when the objective lens 260 shifts to the radial direction of the disc 261, the focused spot 271 on the photo detector 264 also shifts to the radial direction of the disc 261. In the case where the focused spot 271 shifts to the left in FIG. 29, an output from the beam receiving area 267 increases and an output from the beam receiving area 268 decreases. For this reason, a positive offset is generated in [(V267+V270)−(V268+V269)] as the radial tilt signal.

SUMMARY OF THE INVENTION

It is an object of the present invention to provide an optical head apparatus and an optical information recording/playback apparatus, wherein even if an objective lens shifts to the radial direction of an optical recording medium, an offset is not generated in a radial tilt signal, and a radial tilt of the optical recording medium can be detected correctly.

In an optical head apparatus of the present invention, a main beam and a sub beam are generated from a beam emitted from a beam source. The main beam and the sub beam reflected by an optical recording medium are divided into four regions, namely, R1 (a peripheral area of a region where a 0th order beam and a +1st order beam diffracted by the optical recording medium are overlapped with each other), R2 (a central area of a region where the 0th order beam and the +1st order beam diffracted by the optical recording medium are overlapped with each other), R3 (a peripheral area of a region where the 0th order beam and a −1st order beam diffracted by the optical recording medium are overlapped with each other), and R4 (a central area of a region where the 0th order beam and the −1st order beam diffracted by the optical recording medium are overlapped with each other). The radial tilt signal is proportional to the total intensity of R1 and R4 minus the total intensity of R2 and R3. In order to obtain the radial tilt signal, the sub beam is arranged to be shifted in a radial direction of the optical recording medium with respect to the mainbeam.

Here, let's compare the component of the total intensity of R1 and R4 minus the total intensity of R2 and R3 contributed by the main beam (radial tilt signal by main beam) with the component of the total intensity of R1 and R4 minus the total intensity of R2 and R3 contributed by the sub beam (radial tilt signal by sub beam).

The radial tilt signal by main beam is different from the radial tilt signal by sub beam, when the optical recording medium has a radial tilt. Meanwhile, in the case where the objective lens is shifted in the radial direction of the optical recording medium, since the shift of the main beam on the photo detector is the same as that of the sub beam, an offset generated in the radial tilt signal by main beam is the same as that generated in the radial tilt signal by sub beam.

Therefore, when a difference between the radial tilt signal by main beam and the radial tilt signal by sub beam is a final radial tilt signal, in the case where the optical recording medium has a radial tilt, the radial tilt signals by main beam and by sub beam are not canceled each other, and offsets generated in the radial tilt signals by main beam and by sub beam in the case where the objective lens is shifted in the radial direction of the optical recording medium are canceled each other. For this reason, even if the objective lens is shifted in the radial direction of the optical recording medium, an offset is not generated in the radial tilt signal, and the radial tilt of the optical recording medium can be detected correctly.

In an optical information recording/playback apparatus of the present invention, an optical head apparatus of the present invention which is capable of detecting the radial tilt of the optical recording medium is used so that the radial tilt of the. optical recording medium is corrected in order to eliminate a bad influence upon the recording/playback characteristics. According to the present invention, even if the objective lens is shifted in the radial direction of the optical recording medium, an offset is not generated in the radial tilt signal and the radial tilt of the optical recording medium can be detected correctly.

BRIEF EXPLANATION OF THE DRAWINGS

FIG. 7 is a diagram showing radial tilt characteristics in the optical head apparatus according to the first embodiment of the present invention.

FIG. 8 is a diagram showing an optical information recording/playback apparatus according to a first embodiment of the present invention.

PREFERRED EMBODIMENT OF THE INVENTION

First Embodiment of Optical Head Apparatus

Figure 1:
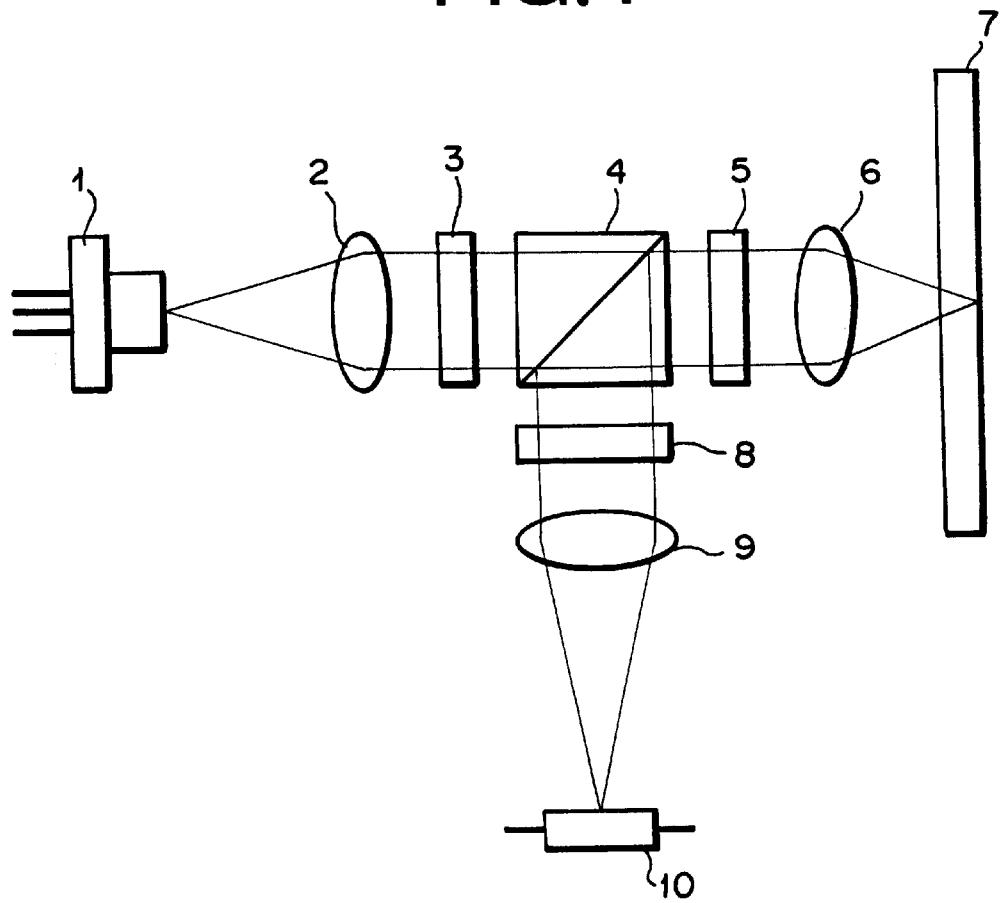
FIG. 1 is a diagram showing an optical head apparatus according to the first embodiment of the present invention.

FIG. 1 shows an optical head apparatus according to a first embodiment of the present invention. A beam emitted from a semiconductor laser 1 for emitting a laser beam with wavelength of about 650 nm is converted into a parallel beam by a collimating lens 2, and is divided into three beams: a 0th order beam as a main beam; and ±1st order beams diffracted as sub beams by a diffractive element 3. These beams enter a polarizing beam splitter 4 as P polarized beams and are transmitted about 100% therethrough. Thereafter, they are transmitted through a quarter wave plate 5 so as to be converted from linear polarized beams into circular polarized beams, and are focused on a disc 7 by an objective lens 6. The three beams reflected from the disc 7 corresponding to the 0th order beam and the ±1st order beams diffracted from the diffractive element 3 are transmitted through the objective lens in the opposite direction, and are transmitted through the quarter wave plate 5 so as to be converted from the circular polarized beams into linear polarized beams whose polarizing direction intersects perpendicularly to that in the forward path. Further, the linear polarized beams enter the polarizing beam splitter 4 as S polarized beams and are reflected about 100% thereby, and are diffracted approximately 100% as +1st order beams by a holographic element 8 and are transmitted through a lens 9 so as to be received by a photo detector 10.

Figure 2:
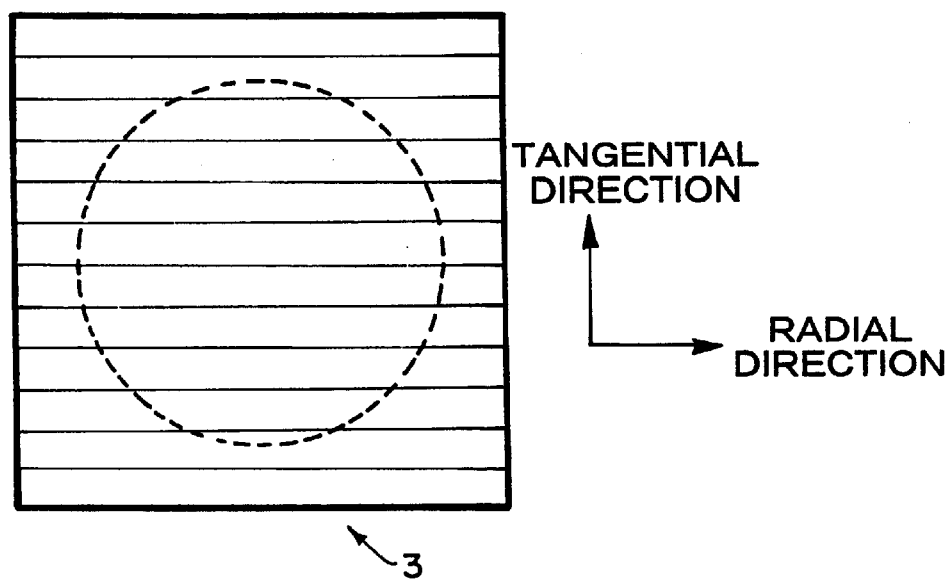
FIG. 2 is a plan view of a diffractive element in the optical head apparatus according to the first embodiment of the present invention.

FIG. 2 is a plan view of the diffractive element 3. The diffractive element 3 is constituted so that diffraction gratings are formed in a region including an effective diameter of the objective lens 6 represented by a dotted line in the drawing. A direction of the gratings in the diffraction gratings is approximately parallel with a radial direction of the disc 7, and patterns of the gratings are linear with equal pitches. When a phase difference between a line area and a space area of the gratings is, for example, $0.232\pi$, an incident beam is transmitted about 87.3% as a 0th order beam, and is diffracted about 5.1% as ±1st order beams.

Figure 3:
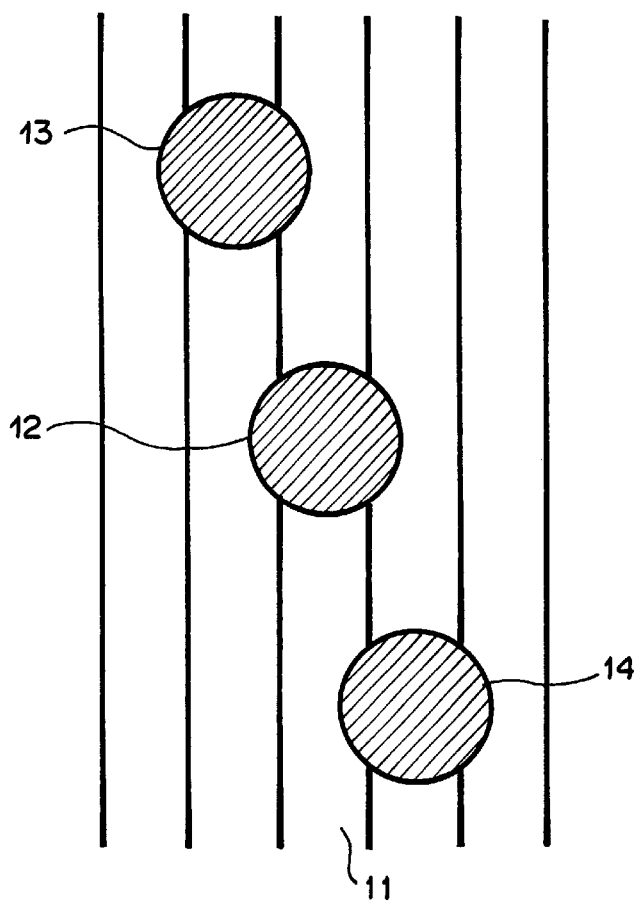
FIG. 3 is a diagram showing an arrangement of focused spots on a disc in the optical head apparatus according to the first embodiment of the present invention.

FIG. 3 shows an arrangement of focused spots on the disc 7. Here, a convex portion of a groove formed on the disc 7 viewed from an incident beam to the disc 7 is a groove, and a concave portion is a land, and the groove or the land are used as tracks. Focused spots 12, 13 and 14 correspond to a 0th order beam, a +1st order beam and a −1st order beam diffracted by the diffractive element 3, respectively. The focused spot 12 is arranged on a track 11 (groove or land), the focused spot 13 is arranged on a track (land or groove) adjacent to the left side of the track 11, and the focused spot 14 is arranged on a track (land or groove) adjacent to the right side of the track 11.

Figure 4:
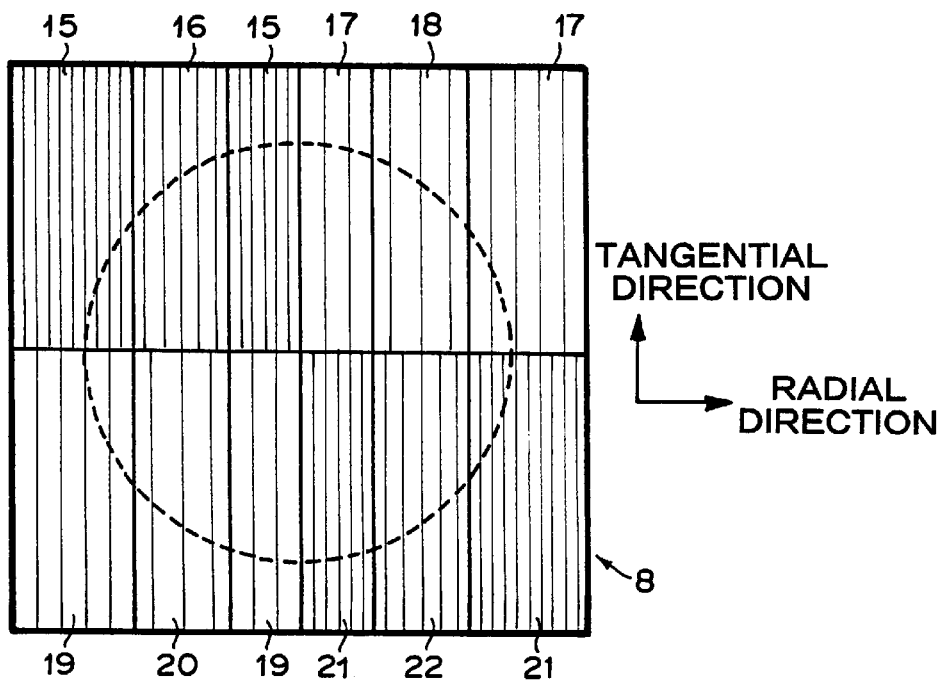
FIG. 4 is a plan view of a holographic element in the optical head apparatus according to the first embodiment of the present invention.

FIG. 4 is a plan view of the holographic element 8. The holographic element 8 is divided into eight regions 15 to 22 by five dividing lines parallel with a tangential direction of the disc 7 and a line parallel with the radial direction. The directions of the gratings are parallel with the tangential direction of the disc 7 in all the regions 15 to 22. Moreover, the patterns of the gratings are linear with equal pitches in all the regions 15 to 22. The pitch in the regions 15 and 21 is the narrowest. The pitch in the regions 16 and 22, the pitch in the regions 17 and 19 and the pitch in the regions 18 and 20 are wider in this order. Further, sectional shapes of the gratings in all the regions 15 to 22 are of saw-tooth shapes, and when a phase difference between a top portion and a bottom portion of the saw tooth with respect to the incident beam is 2π, the incident beam to the respective areas is diffracted approximately 100% as the +1st order beam. A direction of the saw tooth in the regions 15 to 18 is set so that the +1st order beam is deflected to the left in the drawing, and a direction of the saw tooth in the regions 19 to 22 is set so that the +1st order beam is deflected to the right in the drawing.

Figure 5:
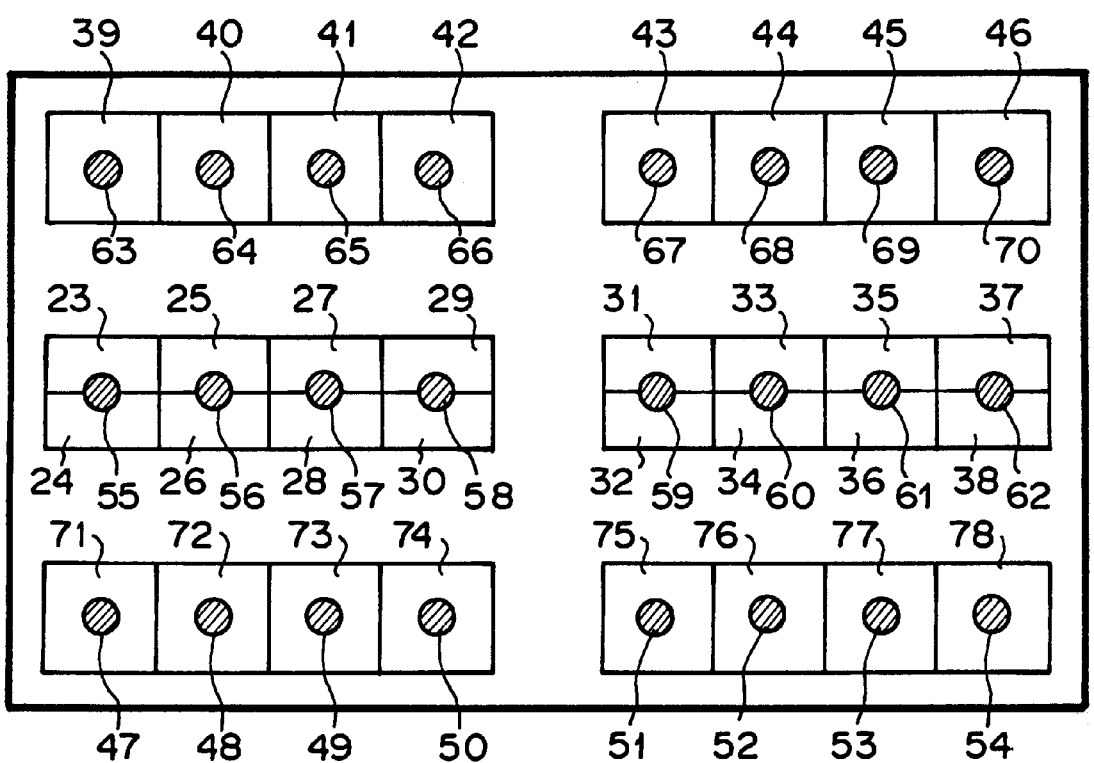
FIG. 5 is a diagram showing a pattern of detection portions of the photo detector in the optical head apparatus according to the first embodiment of the present invention and an arrangement of focused spots on the photo detector.

FIG. 5 shows a pattern of detection portions of the photo detector 10 and an arrangement of focused spots on the photo detector 10. A focused spot 55 corresponds to the +1st order beam diffracted by the region 15 of the holographic element 8 of the 0th order beam from the diffractive element 3, and is focused on a boundary line between detection portions 23 and 24 divided by a dividing line parallel with the radial direction of the disc 7. A focused spot 56 corresponds to the +1st order beam diffracted by the region 16 of the holographic element 8 of the 0th order beam from the diffractive element 3, and is focused on a boundary line between detection portions 25 and 26 divided by a dividing line parallel with the radial direction of the disc 7. A focused spot 57 corresponds to the +1st order beam diffracted by the region 17 of the holographic element 8 of the 0th order beam from the diffractive element 3, and is focused on a boundary line between detection portions 27 and 28 divided by a dividing line parallel with the radial direction of the disc 7.

A focused spot 58 corresponds to the +1st order beam diffracted by the region 18 of the holographic element 8 of the 0th order beam from the diffractive element 3, and is focused on a boundary line between detection portions 29 and 30 divided by a dividing line parallel with the radial direction of the disc 7. A focused spot 59 corresponds to the +1st order beam diffracted by the region 20 of the holographic element 8 of the 0th order beam from the diffractive element 3, and is focused on a boundary line between detection portions 31 and 32 divided by a dividing line parallel with the radial direction of the disc 7. A focused spot 60 corresponds to the +1st order beam diffracted by the region 19 of the holographic element 8 of the 0th order beam from the diffractive element 3, and is focused on a boundary line between detection portions 33 and 34 divided by a dividing line parallel with the radial direction of the disc 7. A focused spot 61 corresponds to the +1st order beam diffracted by the region 22 of the holographic element 8 of the 0th order beam from the diffractive element 3, and is focused on a boundary line between detection portions 35 and 36 divided by a dividing line parallel with the radial direction of the disc 7. A focused spot 62 corresponds to the +1st order beam diffracted by the region 21 of the holographic element 8 of the 0th order beam from the diffractive element 3, and is focused on a boundary line between detection portions 37 and 38 divided by a dividing line parallel with the radial direction of the disc 7.

Further, a focused spot 63 corresponds to the +1st order beam diffracted by the region 15 of the holographic element 8 of the +1st order beam diffracted from the diffractive element 3, and is focused on single beam receiving area 39. A focused spot 64 corresponds to the +1st order beam diffracted by the region 16 of the holographic element 8 of the +1st order beam diffracted from the diffractive element 3, and is focused on single beam receiving area 40. A focused spot 65 corresponds to the +1st order beam diffracted by the region 17 of the holographic element 8 of the +1st order beam diffracted from the diffractive element 3, and is focused on single beam receiving area 41. A focused spot 66 corresponds to the +1st order beam diffracted by the region 18 of the holographic element 8 of the +1st order beam diffracted from the diffractive element 3, and is focused on single beam receiving area 42.

A focused spot 67 corresponds to the +1st order beam diffracted by the region 20 of the holographic element 8 of the +1st order beam diffracted from the diffractive element 3, and is focused on single beam receiving area 43. A focused spot 68 corresponds to the +1st order beam diffracted by the region 19 of the holographic element 8 of the +1st order beam diffracted from the diffractive element 3, and is focused on single beam receiving area 44. A focused spot 69 corresponds to the +1st order beam diffracted by the region 22 of the holographic element 8 of the +1st order beam diffracted from the diffractive element 3, and is focused on single beam receiving area 45. A focused spot 70 corresponds to the +1st order beam diffracted by the region 21 of the holographic element 8 of the +1st order beam diffracted from the diffractive element 3, and is focused on single beam receiving area 46.

In addition, a focused spot 71 corresponds to the +1st order beam diffracted by the region 15 of the holographic element 8 of the −1st order beam diffracted from the diffractive element 3, and is focused on single beam receiving area 47. A focused spot 72 corresponds to the +1st order beam diffracted by the region 16 of the holographic element 8 of the −1st order beam diffracted from the diffractive element 3, and is focused on single beam receiving area 48. A focused spot 73 corresponds to the +1st order beam diffracted by the region 17 of the holographic element 8 of the −1st order beam diffracted from the diffractive element 3, and is focused on single beam receiving area 49. A focused spot 74 corresponds to the +1st order beam diffracted by the region 18 of the holographic element 8 of the −1st order beam diffracted from the diffractive element 3, and is focused on single beam receiving area 50.

A focused spot 75 corresponds to the +1st order beam diffracted by the region 20 of the holographic element 8 of the −1st order beam diffracted from the diffractive element 3, and is focused on single beam receiving area 51. A focused spot 76 corresponds to the +1st order beam diffracted by the region 19 of the holographic element 8 of the −1st order beam diffracted from the diffractive element 3, and is focused on single beam receiving area 52. A focused spot 77 corresponds to the +1st order beam diffracted by the region 22 of the holographic element 8 of the −1st order beam diffracted from the diffractive element 3, and is focused on single beam receiving area 53. A focused spot 78 corresponds to the +1st order beam diffracted by the region 21 of the holographic element 8 of the −1st order beam diffracted from the diffractive element 3, and is focused on single beam receiving area 54.

When outputs from the detection portions 23 to 54 are represented by V23 to V54 respectively, a focusing error signal is obtained by calculation of [(V23+V25+V27+V29+V32+V34+V36+V38)−(V24+V26+V28+V30+V31+V33+V35+V37)] according to the Foucault method. A tracking error signal is obtained by calculation of [(V23+V24+V25+V26+V31+V32+V33+V34)−(V27+V28+V29+V30+V35+V36+V37+V38)]−K[(V39+V40+V43+V44+V47+V48+V51+V52)−(V41+V42+V45+V46+V49+V50+V53+V54)] (K is constant) according to the differential push-pull method.

In addition, a radial tilt signal for detecting a radial tilt of the disc 7 is obtained by calculation of [(V23+V24+V29+V30+V33+V34+V35+V36)−(V25+V26+V27+V28+V31+V32+V37+V38)]−K[(V39+V42+V44+V45+V47+V50+V52+V53)−(V40+V41+V43+V46+V48+V49+V51+V54)] (K is constant). Moreover, a playback signal by the focused spot 12 as a main beam is obtained by calculation of (V23+V24+V25+V26+V27+V28+V29+V30+V31+V32+V33+V34+V35+V36+V37+V38).

There will be explained below a reason that the radial tilt of the disc 7 can be detected by the above calculation with reference to FIGS. 30 to 32.

Figure 30:
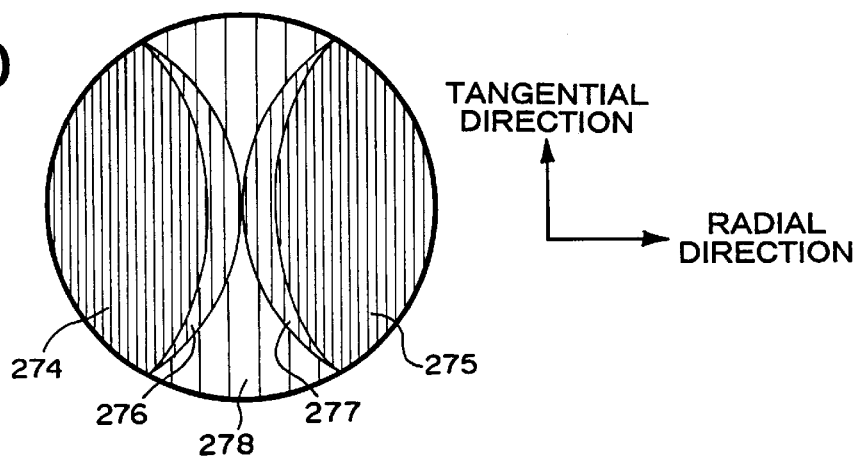
FIG. 30 is a diagram showing a calculating example of the intensity distribution of a reflected beam from a disc.
Figure 31:
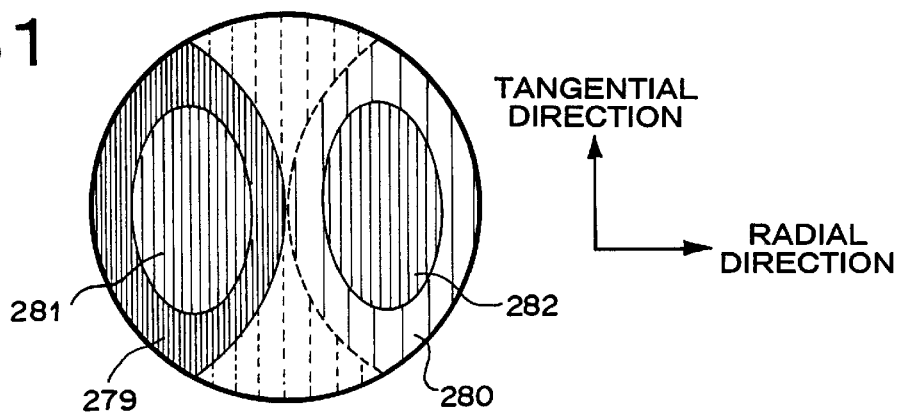
FIG. 31 is a diagram showing a calculating example of the intensity distribution of the reflected beam from the disc.
Figure 32:
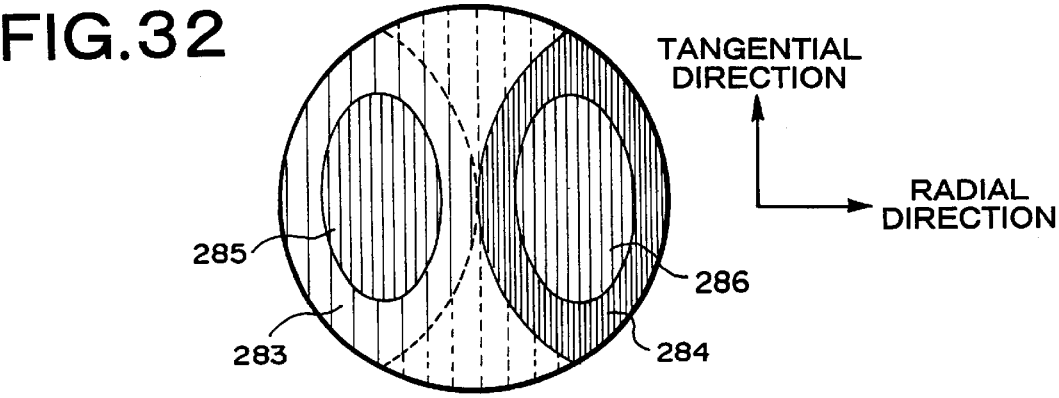
FIG. 32 is a diagram showing a calculating example of the intensity distribution of the reflected beam from the disc.

FIGS. 30 to 32 show examples of calculating intensity distribution of a reflected beam from the disc 7. The calculations were made in the structure shown in FIG. 1 under the condition that a wavelength of the semiconductor laser 1 is 660 nm, a numerical aperture of the objective lens 6 is 0.65, a substrate thickness of the disc 7 is 0.6 mm, a track pitch is 0.5 µm and a groove depth is 70 nm. Dark portions in the drawings are portions where the intensity is strong, and beaming portions are portions where the intensity is weak. FIG. 30 shows the intensity distribution of the main beam in the case where the disc 7 does not have a radial tilt and the focused spot 12 as the main beam is positioned on the groove or land of the disc 7. As for the intensity distribution, the intensity is comparatively strong in regions 274 and 276 which are regions where a 0th order beam and a +1st order beam diffracted by the disc 7 are overlapped (region on the left side in the radial direction in the drawing) and in regions 275 and 277 which are regions where a 0th order beam and a −1st order beam diffracted by the disc 7 are overlapped (region on the right side in the radial direction of the disc 7 in the drawing) and these regions are symmetrical with respect to a straight line which passes through an optical axis and is parallel with the tangential direction of the disc 7. The intensity is comparatively weak in a region 278 which is a region of only a 0th order beam from the disc 7.

FIG. 31 shows intensity distribution of the main beam in the case where the disc 7 has a radial tilt of +0.2° and the focused spot 12 as the main beam is positioned on the groove of the disc 7, or in the case where the disc 7 has a radial tilt of −0.2° and the focused spot 12 as the main beam is positioned on the land of the disc 7. In a region where the 0th order beam and the +1st order beam diffracted by the disc 7 are overlapped with each other, the intensity in a region 279 as a peripheral area is stronger than the intensity in a region 281 as a central section. In a region where the 0th order beam and the −1st order beam diffracted by the disc 7 are overlapped with each other, the intensity of a region 280 as a peripheral area is weaker than the intensity in a region 282 as a central section.

FIG. 32 shows intensity distribution of the main beam in the case where the disc 7 has a radial tilt of −0.2° and the focused spot 12 as the main beam is positioned on the groove of the disc 7, or in the case where the disc 7 has a radial tilt of +0.2° and the focused spot 12 as the main beam is positioned on the land of the disc 7. In a region where the 0th order beam and the +1st order beam diffracted by the disc 7 are overlapped with each other, the intensity in a region 283 as a peripheral area is weaker than the intensity in a region 285 as a central section. In a region where the 0th order beam and the −1st order beam diffracted by the disc 7 are overlapped with each other, the intensity in a region 284 as a peripheral area is stronger than the intensity in a region 286 as a central section.

In FIGS. 30 to 32, the peripheral sections in the region where the 0th order beam and the +1st order beam diffracted by the disc 7 are overlapped with each other correspond to the detection portions 23, 24, 33 and 34 of the photo detector 10, and the central sections in the region where the 0th order beam and the +1st order beam diffracted by the disc 7 are overlapped with each other correspond to the detection portions 25, 26, 31 and 32 of the photo detector 10. The peripheral sections in the region where the 0th order beam and the −1st order beam diffracted by the disc 7 are overlapped with each other correspond to the detection portions 27, 28, 37 and 38 of the photo detector 10, and the central sections in the region where the 0th order beam and the −1st order beam diffracted by the disc 7 are overlapped with each other correspond to the detection portions 29, 30, 35 and 36 of the photo detector 10.

FIGS. 6A to 6L show various waveforms relating to the tracking error signal and the radial tilt signal. The horizontal axes show displacement of the focused spot 12 when the focused spot 12 as the main beam crosses the groove of the disc 7 from the left side to the right side of the radial direction. State "a" shows a state that the focused spot 12 is positioned on the groove. State "b" shows a state that the focused spot 12 is positioned on a boundary between the groove and the land. State "c" shows a state that the focused spot 12 is positioned on the land. State "d" shows a state that the focused spot 12 is positioned on a boundary between the land and the groove.

Figure 6A:
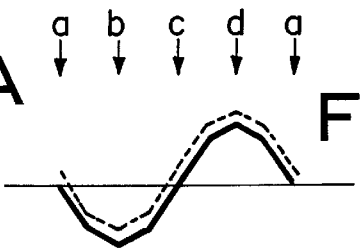
FIGS. 6A to 6L are various waveforms relating to tracking error signals and radial tilt signals in the optical head apparatus according to the first embodiment of the present invention.

A waveform of [(V23+V24+V25+V26+V31+V32+V33+V34)−(V27+V28+V29+V30+V35+V36+V37+V38)] as a push-pull signal by means of the focused spot 12 as the main beam is represented by a solid line in FIG. 6A. Since a focused spot 13 is arranged to be shifted from the focused spot 12 to the left side in FIG. 3 in the radial direction of the disc 7 by ½ pitch of the groove of the disc 7, a waveform of [(V39+V40+V43+V44)−(V41+V42+V45+V46)] as a push-pull signal by means of the focused spot 13 as a sub beam is represented by a solid line in FIG. 6B such that a phase is delayed by $\pi$ with respect to the waveform of the solid line in FIG. 6A.

Figure 6B:
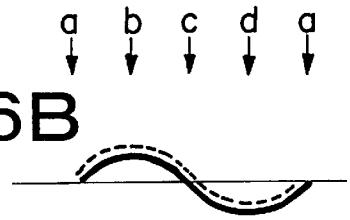

In addition, since a focused spot 14 is arranged to be shifted to the right side in FIG. 3 from the focused spot 12 in the radial direction of the disc 7 by ½ pitch of the groove of the disc 7, a waveform of [(V47+V48+V51+V52)−(V49+V50+V53+V54)] as a push-pull signal by means of the focused spot 14 as the sub beam is represented by a solid line in FIG. 6B such that a phase is advanced by $\pi$ with respect to the waveform represented by the solid line in FIG. 6A. Since the phases of the waveforms represented by the solid lines in FIGS. 6A and 6B are opposite to each other, a waveform of a difference between the push-pull signal by means of the focused spot 12 as the main beam and the sum of the push-pull signals by means of the focused spots 13 and 14 as the sub beams, namely, of [(V23+V24+V25+V26+V31+V32+V33+V34)−(V27+V28+V29+V30+V35+V36+V37+V38)]−K[(V39+V40+V43+V44+V47+V48+V51+V52)−(V41+V42+V45+V46+V49+V50+V53+V54)] (K is constant) as a tracking error signal according to the differential push-pull method is represented by a solid line in FIG. 6C.

In the case where the disc 7 has no radial tilt, a value of [(V23+V24+V29+V30+V33+V34+V35+V36)−(V25+V26+V27+V28+V31+V32+V37+V38)] as a radial tilt signal by means of the focused spot 12 as the main beam becomes zero in both the cases where the focused spot 12 is positioned on the groove and the land of the disc 7. For this reason, its waveform is represented by a solid line in FIG. 6D. Since the focused spot 13 is arranged to be shifted to the left side in FIG. 3 from the focused spot 12 in the radial direction of the disc 7 by ½ pitch of the groove of the disc 7, a waveform of [(V39+V42+V44+V45)−(V40+V41+V43+V46)] as a radial tilt signal by means of the focused spot 13 as the sub beam is represented by a solid line in FIG. 6E such that a phase is delayed by $\pi$ with respect to the waveform represented by the solid line in FIG. 6D. Since the focused spot 14 is arranged to be shifted to the right side in FIG. 3 from the focused spot 12 in the radial direction of the disc 7 by ½ pitch of the groove of the disc 7, a waveform of

Figure 6C:
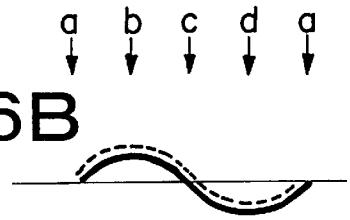
Figure 6D:
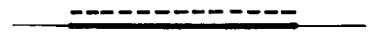
Figure 6E:
Figure 6F:

[(V47+V50+V52+V53)−(V48+V49+V51+V54)] as a radial tilt signal by means of the focused spot 14 as the sub beam is represented by a solid line in FIG. 6E such that a phase is advanced by π with respect to the waveform represented by the solid line in FIG. 6D. For this reason, a waveform of a difference between the radial tilt signal by means of the focused spot 12 as the main beam and the sum of the radial tilt signals by means of the focused spots 13 and 14 as the sub beams, namely, [(V23+V24+V29+V30+V33+V34+V35+V36)−(V25+V26+V27+V28+V31+V32+V37+V38)]−K[(V39+V42+V44+V45+V47+V50+V52+V53)−(V40+V41+V43+V46+V48+V49+V51+V54)] (K is constant) is represented by a solid line in FIG. 6F.

In the case where the disc 7 has a positive radial tilt, a value of [(V23+V24+V29+V30+V33+V34+V35+V36)−(V25+V26+V27+V28+V31+V32+V37+V38)] as the radial tilt signal by means of the focused spot 12 as the main beam is a positive value in the case where the focused spot 12 is positioned on the groove of the disc 7 and is a negative value in the case where the focused spot 12 is positioned on the land. For this reason, its waveform is represented by a solid line in FIG. 6G. Since the focused spot 13 is arranged to be shifted to the left side in FIG. 3 from the focused spot 12 in the radial direction of the disc 7 by ½ pitch of the groove of the disc 7, a waveform of [(V39+V42+V44+V45)−(V40+V41+V43+V46)] as the radial tilt signal by means of the focused spot 13 as the sub beam is represented by a solid line in FIG. 6H such that a phase is delayed by π with respect to the waveform represented by the solid line in FIG. 6G.

Figure 6G:
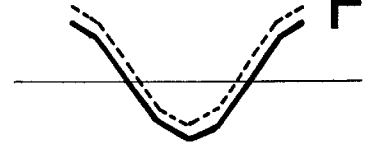
Figure 6H:
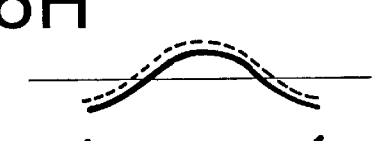
Figure 6I:
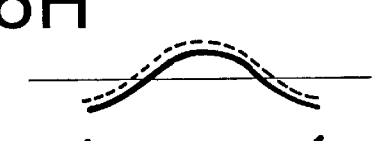

In addition, since the focused spot 14 is arranged to be shifted to the right side in FIG. 3 from the focused spot 12 in the radial direction of the disc 7 by ½ pitch of the groove of the disc 7, a waveform of [(V47+V50+V52+V53)−(V48+V49+V51+V54)] as the radial tilt signal by means of the focused spot 14 as the sub beam is represented by a solid line in FIG. 6H such that a phase is advanced by π with respect to the waveform represented by the solid line in FIG. 6G. Since the phases of the waveforms represented by the solid lines in FIGS. 6G and 6H are opposite to each other, a waveform of a difference between the radial tilt signal by means of the focused spot 12 as the main beam and the sum of the radial tilt signals by means of the focused spots 13 and 14 as the sub beams, namely, of [(V23+V24+V29+V30+V33+V34+V35+V36)−(V25+V26+V27+V28+V31+V32+V37+V38)]−K[(V39+V42+V44+V45+V47+V50+V52+V53)−(V40+V41+V43+V46+V48+V49+V51+V54)] (K is constant) as a final radial tilt signal is represented by a solid line in FIG. 6I.

In the case where the disc 7 has a negative radial tilt, a value of [(V23+V24+V29+V30+V33+V34+V35+V36)−(V25+V26+V27+V28+V31+V32+V37+V38)] as the radial tilt signal by means of the focused spot 12 as the main beam is a negative value in the case where the focused spot 12 is positioned on the groove of the disc 7 and is a positive value in the case where the focused spot 12 is positioned on the land. For this reason, its waveform is represented by a solid line in FIG. 6J. Since the focused spot 13 is arranged to be shifted to the left side in FIG. 3 from the focused spot 12 in the radial direction of the disc 7 by ½ pitch of the groove of the disc 7, a waveform of [(V39+V42+V44+V45)−(V40+V41+V43+V46)] as the radial tilt signal by means of the focused spot 13 as the sub beam is represented by a solid line in FIG. 6K such that a phase is delayed by π with respect to the waveform represented by the solid line in FIG. 6J.

Figure 6J:
Figure 6K:
Figure 6L:
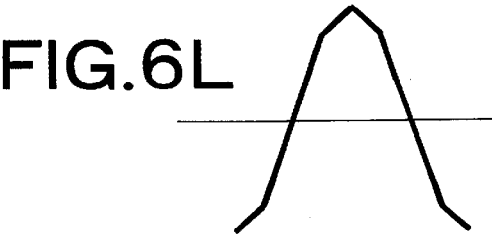

In addition, since the focused spot 14 is arranged to be shifted to the right side in FIG. 3 from the focused spot 12 in the radial direction of the disc 7 by ½ pitch of the groove of the disc 7, a waveform of [(V47+V50+V52+V53)−(V48+V49+V51+V54)] as the radial tilt signal by means of the focused spot 14 as the sub beam is represented by a solid line in FIG. 6K such that a phase is advanced by π with respect to the waveform represented by the solid line in FIG. 6J. Since the phases of the waveforms represented by the solid lines in FIGS. 6J and 6K are opposite to each other, a waveform of a difference between the radial tilt signal by means of the focused spot 12 as the main beam and the sum of the radial tilt signals by means of the focused spots 13 and 14 as the sub beams, namely, of [(V23+V24+V29+V30+V33+V34+V35+V36)−(V25+V26+V27+V28+V31+V32+V37+V38)]−K[(V39+V42+V44+V45+V47+V50+V52+V53)−(V40+V41+V43+V46+V48+V49+V51+V54)] (K is constant) as a final radial tilt signal is represented by a solid line in FIG. 6L.

At first, it is assumed that track a servo signal is applied to the state "a", namely, to the groove by using the tracking error signal shown in FIG. 6C. In the case where the radial tilt of the disc 7 is 0, positive and negative, the values of the radial tilt signals shown in FIGS. 6F, 6I and 6L become zero, positive and negative respectively. Therefore, this radial tilt signal is used so as to be capable of detecting the radial tilt of the disc 7. Next, it is assumed that a track servo signal is applied to the state "c", namely, to the land by using the tracking error signal shown in FIG. 6C. In the case where the radial tilt of the disc 7 is zero, positive and negative, the values of the radial tilt signals shown in FIGS. 6F, 6I and 6L become zero, negative and positive respectively. Therefore, the radial tilt signal is used so as to be capable of detecting the radial tilt of the disc 7.

When the objective lens 6 is shifted in the radial direction of the disc 7, the main beam and the sub beams on the holographic element 8 are also shifted in the radial direction of the disc 7. When the main beam is shifted to the left in FIG. 4, the outputs from the detection portions 23, 24, 33 and 34 increase, and the outputs from the detection portions 27, 28, 37 and 38 decrease. Moreover, when the sub beams are shifted to the left in FIG. 4, the outputs from the detection portions 39, 44, 47 and 52 increase, and the outputs from the detection portions 41, 46, 49 and 54 decrease.

At this time, a waveform of [(V23+V24+V25+V26+V31+V32+V33+V34)−(V27+V28+V29+V30+V35+V36+V37+V38)] as a push-pull signal by means of the focused spot 12 as the main beam is represented by a dotted line in FIG. 6A. A waveform of [(V39+V40+V43+V44)−(V41+V42+V45+V46)] as a push-pull signal by means of the focused spot 13 as the sub beam is represented by a dotted line in FIG. 6B. A waveform of [(V47+V48+V51+V52)−(V49+V50+V53+V54)] as a push-pull signal by means of the focused spot 14 as the sub beam is represented by a dotted line in FIG. 6B. Although the phases of the dotted lines in FIGS. 6A and 6B are opposite to each other, since signs of DC components are the same, a waveform of [(V23+V24+V25+V26+V31+V32+V33+V34)−(V27+V28+V29+V30+V35+V36+V37+V38)]−K[(V39+V40+V43+V44+V47+V48+V51+V52)−(V41+V42+V45+V46+V49+V50+V53+V54)] (K is constant) as a tracking error signal according to the differential push-pull method is represented by a solid line in FIG. 6C in such a manner that a value of K is set suitably and offsets generated in the push-pull signals of the main beam and the sub beams are canceled each other.

In the case where the disc 7 has no radial tilt, a waveform of [(V23+V24+V29+V30+V33+V34+V35+V36)−(V25+V26+V27+V28+V31+V32+V37+V38)] as a radial tilt signal by means of the focused spot 12 as the main beam is represented by a dotted line in FIG. 6D. A waveform of [(V39+V42+V44+V45)−(V40+V41+V43+V46)] as a radial tilt signal by means of the focused spot 13 as the sub beam is represented by a dotted line in FIG. 6E. A waveform of [(V47+V50+V52+V53)−(V48+V49+V51+V54)] as a radial tilt signal by means of the focused spot 14 as the sub beam is represented by a dotted line in FIG. 6E. Since signs of DC components of the waveforms represented by the dotted lines in FIGS. 6D and 6E are the same, a waveform of [(V23+V24+V29+V30+V33+V34+V35+V36)−(V25+V26+V27+V28+V31+V32+V37+V38)]−K[(V39+V42+V44+V45+V47+V50+V52+V53)−(V40+V41+V43+V46+V48+V49+V51+V54)] (K is constant) as a final radial tilt signal is represented by a solid line in FIG. 6F in such a manner that the value of K is set suitably and offsets generated in the radial tilt signals of the main beam and the sub beams are canceled each other.

In the case where the disc 7 has a positive radial tilt, a waveform of [(V23+V24+V29+V30+V33+V34+V35+V36)−(V25+V26+V27+V28+V31+V32+V37+V38)] as a radial tilt signal by means of the focused spot 12 as the main beam is represented by a dotted line in FIG. 6G. A waveform of [(V39+V42+V44+V45)−(V40+V41+V43+V46)] as a radial tilt signal by means of the focused spot 13 as the sub beam is represented by a dotted line in FIG. 6H. A waveform of [(V47+V50+V52+V53)−(V48+V49+V51+V54)] as a radial tilt signal by means of the focused spot 14 as the sub beam is represented by a dotted line in FIG. 6H. Since phases of the waveforms represented by the dotted lines in FIGS. 6G and 6H are opposite to each other but signs of DC components are the same, a waveform of [(V23+V24+V29+V30+V33+V34+V35+V36)−(V25+V26+V27+V28+V31+V32+V37+V38)]−K[(V39+V42+V44+V45+V47+V50+V52+V53)−(V40+V41+V43+V46+V48+V49+V51+V54)] (K is constant) as a final radial tilt signal is represented by a solid line in FIG. 6I in such a manner that the value of K is set suitably and offsets generated in the radial tilt signals of the main beam and the sub beams are canceled each other.

In the case where the disc 7 has a negative radial tilt, a waveform of [(V23+V24+V29+V30+V33+V34+V35+V36)−(V25+V26+V27+V28+V31+V32+V37+V38)] as a radial tilt signal by means of the focused spot 12 as the main beam is represented by a dotted line in FIG. 6J. A waveform of [(V39+V42+V44+V45)−(V40+V41+V43+V46)] as a radial tilt signal by means of the focused spot 13 as the sub beam is represented by a dotted line in FIG. 6K. A waveform of [(V47+V50+V52+V53)−(V48+V49+V51+V54)] as a radial tilt signal by means of the focused spot 14 as the sub beam is represented by a dotted line in FIG. 6K. Since phases of the waveforms represented by the dotted lines in FIGS. 6J and 6K are opposite to each other but signs of DC components are the same, a waveform of [(V23+V24+V29+V30+V33+V34+V35+V36)−(V25+V26+V27+V28+V31+V32+V37+V38)]−K[(V39+V42+V44+V45+V47+V50+V52+V53)−(V40+V41+V43+V46+V48+V49+V51+V54)] (K is constant) as a final radial tilt signal is represented by a solid line in FIG. 6L in such a manner that the value of K is set suitably and offsets generated in the radial tilt signals of the main beam and the sub beams are canceled each other.

Namely, even when the objective lens 6 is shifted in the radial direction of the disc 7, an offset is not generated in the radial signal, and the radial tilt of the disc 7 can be detected correctly.

FIG. 7 shows radial tilt characteristics when track servo is applied. The horizontal axis shows the radial tilt, and the vertical axis shows a radial tilt signal which is normalized by a track sum signal. A dotted line in the drawing shows the case where track servo is applied to the groove, and a solid line shows the case where track servo is applied to the land. In the cases where the track servo is applied to the land and the groove, as an absolute value of the radial tilt is larger, an absolute value of the radial tilt signal becomes larger. The sensitivity of detection of the radial tilt is given by absolute values of inclinations of the linear solid line and dotted line in the drawing. Under the conditions of the calculation of the intensity distribution shown in FIGS. 30 to 32, the sensitivity is about 0.4°, and this value is very high.

First Embodiment of Optical Information Recording and Playback Apparatus

FIG. 8 shows the optical information recording/playback apparatus according to the first embodiment of the present invention. In the present embodiment, a calculation circuit 79 and a driving circuit 80 as the optical information recording/playback apparatus are added to the optical head apparatus according to the first embodiment of the present invention shown in FIG. 1. Conventional optical information recording/playback apparatus are provided with a driving circuit for rotating a disc, a reading signal processing circuit for reading data, an image signal, a sound signal and the like from a disc, a writing signal processing circuit for writing data, an image signal, a sound signal and the like into a disc, a processing circuit such as an operation panel, a control circuit such as CPU and the like, but since they are conventional circuits, the description thereof is omitted.

The calculation circuit 79 calculates a radial tilt signal based on the outputs from the respective detection portions of the photo detector 10. The calculating method was described in the first embodiment of the optical head apparatus of the present invention. The driving circuit 80 is combined with the calculating circuit 79 so as to compose a loop circuit by means of feedback, and this loop circuit tilts the objective lens 6 in the region 288 surrounded by a dotted line in the drawing to the radial direction of the disc 7 by means of an actuator so that the radial tilt signal becomes zero. As a result, the radial tilt of the disc 7 is corrected, and a bad influence upon the recording/playback characteristics is eliminated. For example, as the actuator, an electromagnetic actuator, a piezo-electric actuator or the like is used. The concrete structure of the actuator is described in ISOM/ODS'99 Technical Digest pp. 20–22, for example. As shown in FIG. 7, the signs of the radial tilt signals are opposite to each other in the case where track servo is applied to the groove and in the case where track servo is applied to the land. Therefore, a polarity of the circuit composed of the calculation circuit 79 and the driving circuit 80 for correcting the radial tilt is switched for the land and the groove.

Second Embodiment of Optical Information Recording and Playback Apparatus

Figure 9:
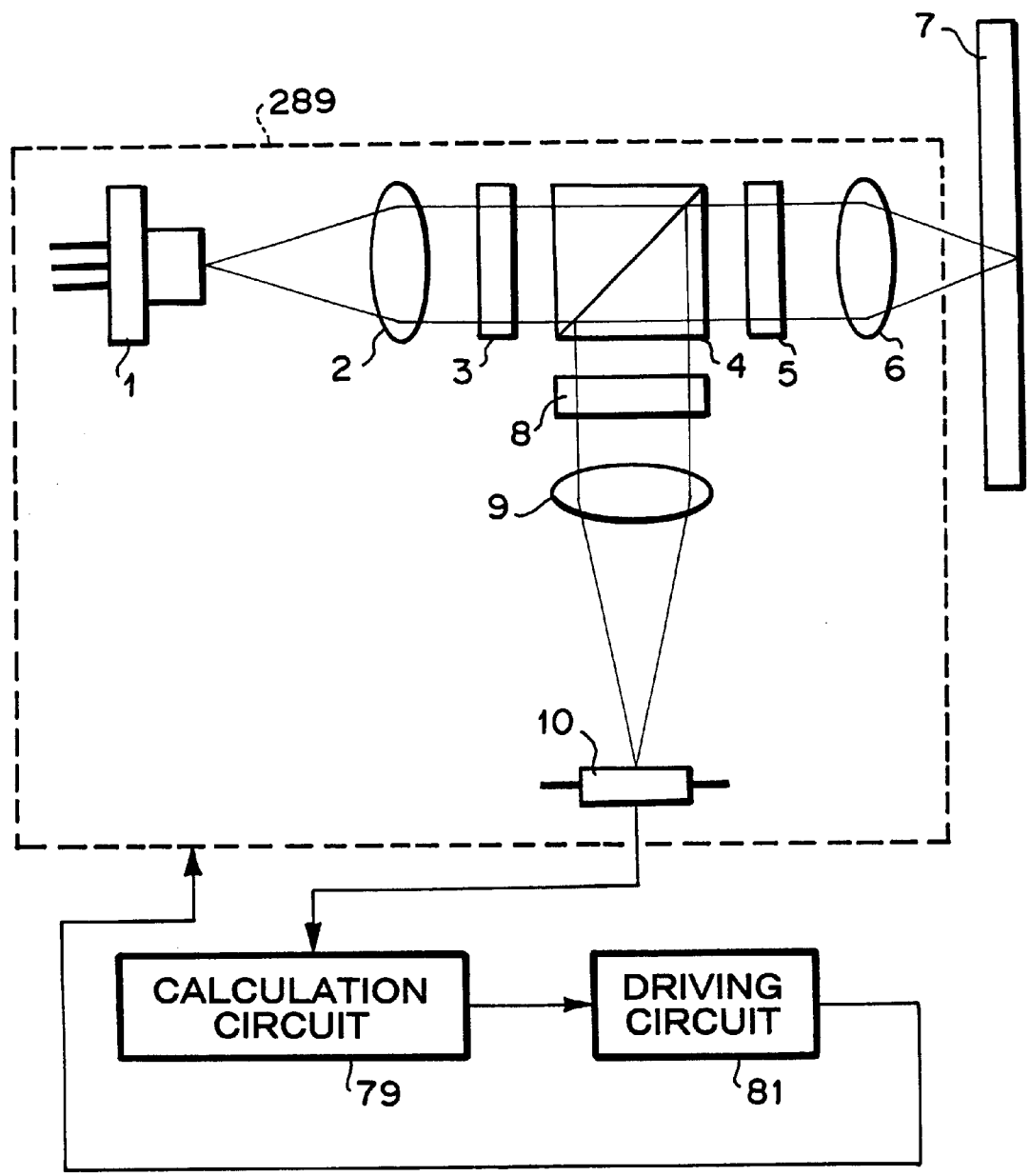
FIG. 9 is a diagram showing an optical information recording/playback apparatus according to a second embodiment of the present invention.

FIG. 9 shows the optical information recording/playback apparatus according to the second embodiment of the present invention. In the present embodiment, the calculation circuit 79 and a driving circuit 81 are added to the optical head apparatus according to the first embodiment of the present invention shown in FIG. 1.

The calculation circuit 79 calculates a radial tilt signal based on the outputs from the detection portions of the photo detector 10. The calculating method was described in the first embodiment of the optical head apparatus of the present invention.

In addition, the driving circuit 81 is combined with the calculation circuit 79 so as to compose a loop circuit by means of feedback, and this loop circuit tilts the whole optical head apparatus in the region 289 surrounded by a dotted line in the drawing by means of a motor, not shown, to the radial direction of the disc 7 so that the radial tilt signal becomes zero. As a result, the radial tilt of the disc 7 is corrected, and a bad influence upon the recording/playback characteristics is eliminated. For example, as the motor, a DC motor, a step motor or the like is used. The concrete structure of the motor is described in, for example, Japanese Patent Application Laid-Open No. 9-161293 (1997). As shown in FIG. 7, the signs of the radial tilt signals are opposite to each other in the case where track servo is applied to the groove and in the case where track servo is applied to the land. Therefore, a polarity of the circuit composed of the calculation circuit 79 and the driving circuit 81 for correcting the radial tilt is switched for the land and the groove.

As an embodiment of the optical information recording/playback apparatus of the present invention, in addition to the above embodiment, there also considers an embodiment that a liquid crystal optical element is mounted in an optical system of the optical head apparatus so as to correct the radial tilt of the disc 7. In this embodiment using the liquid crystal optical element, different voltages are applied to the respective regions of the liquid crystal optical element divided into a plurality of region so that the radial tilt signal becomes zero, and coma aberration such that coma aberration due to the substrate of the disc 7 is canceled is generated. The concrete structure of the liquid crystal optical element is described in, for example, ISOM/ODS'96 Technical Digest pp. 351–353.

Second Embodiment of Optical Head Apparatus

Figure 10:
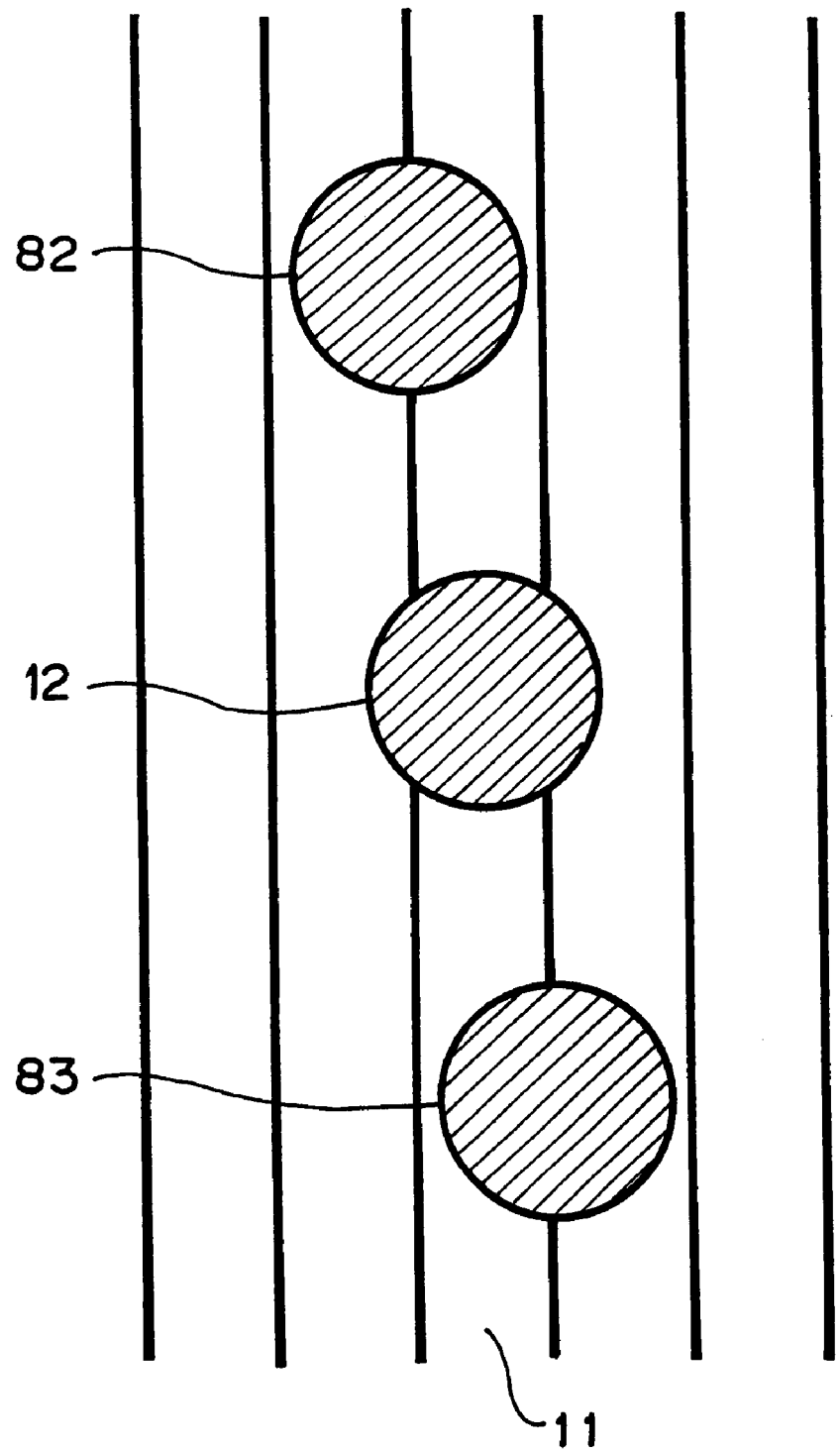
FIG. 10 is a diagram showing an arrangement of focused spots on a disc in the optical head apparatus according to a second embodiment of the present invention.

In the second embodiment of the optical head of the present invention, the arrangement of the focused spots on the disc 7 shown in FIG. 3 in the optical head apparatus according to the first embodiment of the present invention is changed into an arrangement of the focused spots on the disc 7 shown in FIG. 10. Spots 12, 82 and 83 correspond to a 0th order beam, a +1st order beam and a −1st order beam diffracted by the diffractive element 3. The focused spot 12 is arranged on a track 11 (groove or land), the focused spot 82 is arranged on a boundary between the track 11 and a track adjacent to it on the left side (land or groove), and the focused spot 83 is arranged on a boundary between the track 11 and a track adjacent to it on the right side (land or groove).

FIGS. 11A to 11P show various waveforms relating to the tracking error signal and the radial tilt signal. The horizontal axis shows a displacement between the focused spot 12 and a groove when the focused spot 12 as the main beam crosses the groove of the disc 7 from the left side to the right side of the radial direction, State "a" shows a state that the focused spot 12 is positioned on the groove. State "b" shows a state that the focused spot 12 is positioned on a boundary between the groove and the land. State "c" shows a state that the focused spot 12 is positioned on the land. State "d" shows a state that the focused spot 12 is positioned on a boundary between the land and the groove.

A waveform of [(V23+V24+V25+V26+V31+V32+V33+V34)−(V27+V28+V29+V30+V35+V36+V37+V38)] as a push-pull signal by means of the focused spot 12 as the main beam is represented by a solid line in FIG. 11A. Since the focused spot 82 shown in FIG. 10 is arranged to be shifted from the focused spot 12 to the left side of FIG. 10 in the radial direction of the disc 7 by ¼ pitch of the groove of the disc 7, a waveform of [(V39+V40+V43+V44)−(V41+V42+V45+V46)] as a push-pull signal by means of the focused spot 82 as a sub beam is represented by a solid line in FIG. 11B such that a phase is delayed by $\pi/2$ with respect to the waveform of the solid line in FIG. 11A.

In addition, since the focused spot 83 shown in FIG. 10 is arranged to be shifted from the focused spot 12 to the right side in FIG. 10 in the radial direction of the disc 7 by ¼ pitch of the groove of the disc 7, a waveform of [(V47+V48+V51+V52)−(V49+V50+V53+V54)] as a push-pull signal by means of the focused spot 83 as the sub beam is represented by a solid line in FIG. 11C such that a phase is advanced by $\pi/2$ with respect to the waveform represented by the solid line in FIG. 11A. Since the phases of the waveforms represented by the solid lines in FIGS. 11B and 11C are opposite to each other and the phases are shifted by $\pi/2$ with respect to the waveform represented by the solid line in FIG. 11A, a waveform of a difference between the push-pull signal by means of the focused spot 12 as the main beam and the sum of the push-pull signals by means of the focused spots 82 and 83 as the sub beams, namely, of [(V23+V24+V25+V26+V31+V32+V33+V34)−(V27+V28+V29+V30+V35+V36+V37+V38)]−K[(V39+V40+V43+V44+V47+V48+V51+V52)−(V41+V42+V45+V46+V49+V50+V53+V54)] (K is constant) as a tracking error signal according to the differential push-pull method is represented by a solid line in FIG. 1D.

In the case where the disc 7 has no radial tilt, a value of [(V23+V24+V29+V30+V33+V34+V35+V36)−(V25+V26+V27+V28+V31+V32+V37+V38)] as a radial tilt signal by means of the focused spot 12 as the main beam becomes zero in both the cases where the focused spot 12 is positioned on the groove and the land of the disc 7. For this reason, its waveform is represented by a solid line in FIG. 11E. Since the focused spot 82 is arranged to be shifted from the focused spot 12 to the left side in FIG. 10 in the radial direction of the disc 7 by ¼ pitch of the groove of the disc 7, a waveform of [(V39+V42+V44+V45)−(V40+V41+V43+V46)] as a radial tilt signal by means of the focused spot 82 as the sub beam is represented by a solid line in FIG. 11F such that a phase is delayed by $\pi/2$ with respect to the waveform represented by the solid line in FIG. 11E.

In addition, since the focused spot 83 is arranged to be shifted from the focused spot 12 to the right side in FIG. 10 in the radial direction of the disc 7 by ¼ pitch of the groove of the disc 7, a waveform of [(V47+V50+V52+V53)−(V48+V49+V51+V54)] as a radial tilt signal by means of the focused spot 83 as the sub beam is represented by a solid line in FIG. 11G such that a phase is advanced by $\pi/2$ with respect to the waveform represented by the solid line in FIG. 1E. For this reason, a waveform of a difference between the radial tilt signal by means of the focused spot 12 as the main beam and the sum of the radial tilt signals by means of the focused spots 82 and 83 as the sub beams, namely, [(V23+V24+V29+V30+V33+V34+V35+V36)−(V25+V26+V27+V28+V31+V32+V37+V38)]−K[(V39+V42+V44+V45+V47+V50+V52+V53)−(V40+V41+V43+V46+V48+V49+V51+V54)] (K is constant) is represented by a solid line in FIG. 11H.

In the case where the disc 7 has a positive radial tilt, a value of [(V23+V24+V29+V30+V33+V34+V35+V36)−(V25+V26+V27+V28+V31+V32+V37+V38)] as the radial tilt signal by means of the focused spot 12 as the main beam is a positive value in the case where the focused spot 12 is positioned on the groove of the disc 7 and is a negative value in the case where the focused spot 12 is positioned on the land. For this reason, its waveform is represented by a solid line in FIG. 11I. Since the focused spot 82 is arranged to be shifted from the focused spot 12 to the left side in FIG. 10 in the radial direction of the disc 7 by ¼ pitch of the groove of the disc 7, a waveform of [(V39+V42+V44+V45)−(V40+V41+V43+V46)] as the radial tilt signal by means of the focused spot 82 as the sub beam is represented by a solid line in FIG. 1J such that a phase is delayed by π/2 with respect to the waveform represented by the solid line in FIG. 11I. Since the focused spot 83 is arranged to be shifted from the focused spot 12 to the right side in FIG. 10 in the radial direction of the disc 7 by ¼ pitch of the groove of the disc 7, a waveform of [(V47+V50+V52+V53)−(V48+V49+V51+V54)] as the radial tilt signal by means of the focused spot 83 as the sub beam is represented by a solid line in FIG. 11K such that a phase is advanced by π/2 with respect to the waveform represented by the solid line in FIG. 11I.

In addition, since the phases of the waveforms represented by the solid lines in FIGS. 11J and 11K are opposite to each other and the phases are shifted by π/2 with respect to the waveform represented by the solid line in FIG. 11I, a waveform of a difference between the radial tilt signal by means of the focused spot 12 as the main beam and the sum of the radial tilt signals by means of the focused spots 82 and 83 as the sub beams, namely, of [(V23+V24+V29+V30+V33+V34+V35+V36)−(V25+V26+V27+V28+V31+V32+V37+V38)]−K[(V39+V42+V44+V45+V47+V50+V52+V53)−(V40+V41+V43+V46+V48+V49+V51+V54)] (K is constant) as a final radial tilt signal is represented by a solid line in FIG. 11L.

In the case where the disc 7 has a negative radial tilt, a value of [(V23+V24+V29+V30+V33+V34+V35+V36)−(V25+V26+V27+V28+V31+V32+V37+V38)] as the radial tilt signal by means of the focused spot 12 as the main beam is a negative value in the case where the focused spot 12 is positioned on the groove of the disc 7 and is a positive value in the case where the focused spot 12 is positioned on the land. For this reason, its waveform is represented by a solid line in FIG. 11M. Since the focused spot 82 is arranged to be shifted from the focused spot 12 to the left side in FIG. 10 in the radial direction of the disc 7 by ¼ pitch of the groove of the disc 7, a waveform of [(V39+V42+V44+V45)−(V40+V41+V43+V46)] as the radial tilt signal by means of the focused spot 82 as the sub beam is represented by a solid line in FIG. 11N such that a phase is delayed by π/2 with respect to the waveform represented by the solid line in FIG. 11M. Since the focused spot 83 is arranged to be shifted from the focused spot 12 to the right side in FIG. 10 with respect to in the radial direction of the disc 7 by ¼ pitch of the groove of the disc 7, a waveform of [(V47+V50+V52+V53)−(V48+V49+V51+V54)] as the radial tilt signal by means of the focused spot 83 as the sub beam is represented by a solid line in FIG. 11O such that a phase is advanced by π/2 with respect to the waveform represented by the solid line in FIG. 11M.

In addition, since the phases of the waveforms represented by the solid lines in FIGS. 11N and 11O are opposite to each other and the phases are shifted by π/2 with respect to the waveform represented by the solid line in FIG. 11M, a waveform of a difference between the radial tilt signal by means of the focused spot 12 as the main beam and the sum of the radial tilt signals by means of the focused spots 82 and 83 as the sub beams, namely, of [(V23+V24+V29+V30+V33+V34+V35+V36)−(V25+V26+V27+V28+V31+V32+V37+V38)]−K[(V39+V42+V44+V45+V47+V50+V52+V53)−(V40+V41+V43+V46+V48+V49+V51+V54)] (K is constant) as a final radial tilt signal is represented by a solid line in FIG. 11P.

At first, it is assumed that track servo is applied to the state "a", namely to the groove by using the tracking error signal shown in FIG. 11D. In the case where the radial tilt of the disc 7 is zero, positive and negative, the values of the radial tilt signal shown in FIGS. 11H, 11L and 11P become zero, positive and negative respectively. Therefore, this radial tilt signal is used so as to be capable of detecting the radial tilt of the disc 7. Next, it is assumed that track servo is applied to the state "c", namely, to the land by using the tracking error signal shown in FIG. 11D. In the case where the radial tilt of the disc 7 is zero, positive and negative, the values of the radial tilt signal shown in FIGS. 11H, 11L and 11P become zero, negative and positive respectively. Therefore, the radial tilt signal is used so as to be capable of detecting the radial tilt of the disc 7.

When the objective lens 6 is shifted in the radial direction of the disc 7, the main beam and the sub beams on the holographic element 8 are also shifted in the radial direction of the disc 7. When the main beam is shifted to the left in FIG. 4, the outputs from the detection portions 23, 24, 33 and 34 increase, and the outputs from the detection portions 27, 28, 37 and 38 decrease. Moreover, when the sub beams are shifted to the left in FIG. 4, the outputs from the detection portions 39, 44, 47 and 52 increase, and the outputs from the detection portions 41, 46, 49 and 54 decrease.

At this time, a waveform of [(V23+V24+V25+V26+V31+V32+V33+V34)−(V27+V28+V29+V30+V35+V36+V37+V38)] as a push-pull signal by means of the focused spot 12 as the main beam is represented by a dotted line in FIG. 11A. A waveform of [(V39+V40+V43+V44)−(V41+V42+V45+V46)] as a push-pull signal by means of the focused spot 82 as the sub beam is represented by a dotted line in FIG. 11B. A waveform of [(V47+V48+V51+V52)−(V49+V50+V53+V54)] as a push-pull signal by means of the focused spot 83 as the sub beam is represented by a dotted line in FIG. 11C. Although the phases of the dotted lines in FIGS. 11B and 11C are opposite to each other and the phases are shifted by π/2 with respect to the waveform represented by the dotted line in FIG. 11A, since signs of DC components are the same, a waveform of [(V23+V24+V25+V26+V31+V32+V33+V34)−(V27+V28+V29+V30+V35+V36+V37+V38)]−K[(V39+V40+V43+V44+V47+V48+V51+V52)−(V41+V42+V45+V46+V49+V50+V53+V54)] (K is constant) as a tracking error signal according to the differential push-pull method is represented by a solid line in FIG. 11D in such a manner that a value of K is set suitably and offsets generated in the push-pull signals of the main beam and the sub beams are canceled each other.

In the case where the disc 7 has no radial tilt, a waveform of [(V23+V24+V29+V30+V33+V34+V35+V36)−(V25+V26+V27+V28+V31+V32+V37+V38)] as a radial tilt signal by means of the focused spot 12 as the main beam is represented by a dotted line in FIG. 11E. A waveform of [(V39+V42+V44+V45)−(V40+V41+V43+V46)] as a radial tilt signal by means of the focused spot 82 as the sub beam is represented by a dotted line in FIG. 11F. A waveform of [(V47+V50+V52+V53)−(V48+V49+V51+V54)] as a radial tilt signal by means of the focused spot 83 as the sub beam is represented by a dotted line in FIG. 11G. Since signs of DC components of the waveforms represented by the dotted lines in FIGS. 11E and 11F and 11G are the same, a waveform of [(V23+V24+V29+V30+V33+V34+V35+V36)−(V25+V26+V27+V28+V31+V32+V37+V38)]−K[(V39+V42+V44+V45+V47+V50+V52+V53)−(V40+V41+V43+V46+V48+V49+V51+V54)] (K is constant) as a final radial tilt signal is represented by a solid line in FIG.

11H in such a manner that the value of K is set suitably and offsets generated in the radial tilt signals of the main beam and the sub beams are canceled each other.

In the case where the disc 7 has a positive radial tilt, a waveform of [(V23+V24+V29+V30+V33+V34+V35+V36)−(V25+V26+V27+V28+V31+V32+V37+V38)] as a radial tilt signal by means of the focused spot 12 as the main beam is represented by a dotted line in FIG. 11I. A waveform of [(V39+V42+V44+V45)−(V40+V41+V43+V46)] as a radial tilt signal by means of the focused spot 82 as the sub beam is represented by a dotted line in FIG. 11J. A waveform of [(V47+V50+V52+V53)−(V48+V49+V51+V54)] as a radial tilt signal of by means of the focused spot 83 as the sub beam is represented by a dotted line in FIG. 11K. Since phases of the waveforms represented by the dotted lines in FIGS. 11J and 11K are opposite to each other and the phases are shifted by $\pi/2$ with respect to the waveform represented by the dotted line in FIG. 11I but signs of DC components are the same, a waveform of [(V23+V24+V29+V30+V33+V34+V35+V36)−(V25+V26+V27+V28+V31+V32+V37+V38)]−K[(V39+V42+V44+V45+V47+V50+V52+V53)−(V40+V41+V43+V46+V48+V49+V51+V54)] (K is constant) as a final radial tilt signal is represented by a solid line in FIG. 11L in such a manner that the value of K is set suitably and offsets generated in the radial tilt signals of the main beam and the sub beams are canceled each other.

In the case where the disc 7 has a negative radial tilt, a waveform of [(V23+V24+V29+V30+V33+V34+V35+V36)−(V25+V26+V27+V28+V31+V32+V37+V38)] as a radial tilt signal by means of the focused spot 12 as the main beam is represented by a dotted line in FIG. 11M. A waveform of [(V39+V42+V44+V45)−(V40+V41+V43+V46)] as a radial tilt signal by means of the focused spot 82 as the sub beam is represented by a dotted line in FIG. 11N. A waveform of [(V47+V50+V52+V53)−(V48+V49+V51+V54)] as a radial tilt signal by means of the focused spot 83 as the sub beam is represented by a dotted line in FIG. 11O. Since phases of the waveforms represented by the dotted lines in FIGS. 11N and 11O are opposite to each other and the phases are shifted by $\pi/2$ with respect to the waveform represented by the dotted line in FIG. 11M but signs of DC components are the same, a waveform of [(V23+V24+V29+V30+V33+V34+V35+V36)−(V25+V26+V27+V28+V31+V32+V37+V38)]−K[(V39+V42+V44+V45+V47+V50+V52+V53)−(V40+V41+V43+V46+V48+V49+V51+V54)] (K is constant) as a final radial tilt signal is represented by a solid line in FIG. 11P in such a manner that the value of K is set suitably and offsets generated in the radial tilt signals of the main beam and the sub beams are canceled each other.

Namely, even when the objective lens 6 is shifted in the radial direction of the disc 7, an offset is not generated in the radial signal, and the radial tilt of the disc 7 can be detected correctly.

In the second embodiment of the optical head apparatus of the present invention, the waveform of [(V39+V40+V43+V44)−(V41+V42+V45+V46)] as the push-pull signal by means of the focused spot 82 as the sub beam is represented by the solid line in FIG. 11B, and the waveform of [(V47+V48+V51+V52)−(V49+V50+V53+V54)] as the push-pull signal by means of the focused spot 83 as the sub beam is represented by the solid line in FIG. 11C. Here, a difference between the push-pull signal by means of the focused spot 82 and the push-pull signal by means of the focused spot 83 is called as a land/groove position detecting signal. At this time, a value of [(V39+V40+V43+V44+V49+V50+V53+V54)−(V41+V42+V45+V46+V47+V48+V51+V52)] as the land/groove position detecting signal becomes a positive value in the case where the focused spot 12 as the main beam is positioned on the groove of the disc 7 and becomes a negative value in the case where the focused spot 12 is positioned on the land. Therefore, signs of the land/groove position detecting signal enable detection as to whether the focused spot 12 is positioned on the land or the groove in the disc 7.

Third Embodiment of Optical Head Apparatus

Figure 12:
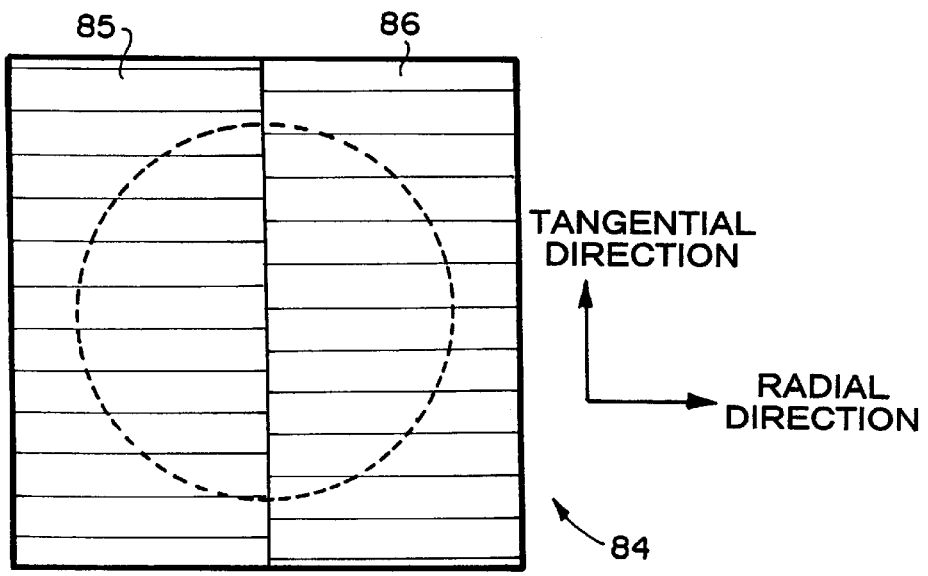
FIG. 12 is a plan view of the diffractive element in the optical head apparatus according to a third embodiment of the present invention.

In the optical head apparatus according to the third embodiment of the present invention, the diffractive element 3 shown in FIG. 2 in the optical head apparatus according to the first embodiment of the present invention shown in FIG. 1 is replaced by a diffractive element 84 shown in FIG. 12.

FIG. 12 is a plan view showing the diffractive element 84. The diffractive element 84 is constituted so that diffraction gratings are formed in a region including the effective diameter of the objective lens 6 shown by a dotted line in the drawing, and the region is divided into two regions 85 and 86 by a straight line which passes through the optical axis of the incident beam and is parallel with the tangential direction of the disc 7. Directions of the diffraction gratings are parallel with the radial direction of the disc 7 in both the areas 85 and 86, and the pattern of the gratings are linear with equal pitches in both the regions 85 and 86. Phases of the gratings in the regions 85 and 86 are shifted by $\pi$ each other.

Here, when a phase difference between the line portions and the space portions of the gratings is, for example, $0.232\pi$, an incident beam is transmitted about 87.3% as a 0th order beam and is diffracted about 5.1% as ±1st order beams. When the +1st order beam and the −1st order beam are a beam diffracted up and a beam diffracted down in FIG. 12, phases of the +1st order beams diffracted from the regions 85 and 86 are shifted by $\pi$ each other, and phases of the −1st order beams diffracted from regions 85 and 86 are shifted by $\pi$ each other.

Figure 13:
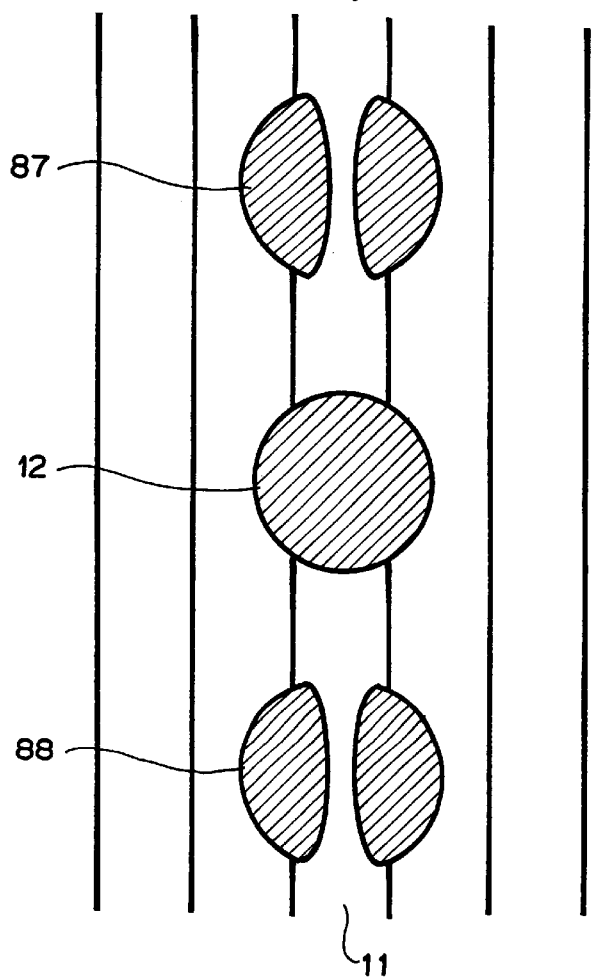
FIG. 13 is a diagram showing an arrangement of focused spots on the disc in the optical head apparatus according to the third embodiment of the present invention.

FIG. 13 shows an arrangement of focused spots on the disc 7. Spots 12, 87 and 88 correspond to a 0th order beam, a +1st order beam and a −1st order beam diffracted by the diffractive element 84 respectively, and they are positioned on the same track 11 (groove or land). The focused spots 87 and 88 have two peaks of the same intensity on the right and left sides in the radial direction of the disc 7.

The diffractive element 84 is divided into the two regions 85 and 86 by the straight line which passes through the optical axis of the incident beam and is parallel with the tangential direction of the disc 7, and the phases of the gratings in the regions 85 and 86 are shifted by $\pi$ each other so that phases of the sub beams entering the objective lens 6 are shifted by $\pi$ on the left and right side of the straight line passing through the optical axis and parallel with the tangential direction of the disc 7. Relating to the tracking error signal, this is equivalent to that the focused spots of the two sub beams on the disc 7 are arranged to be shifted from the focused spot of the main beam by ½ pitch of the groove of the disc 7 to the opposite directions in the radial direction of the disc 7. The reason for this is described in, for example, Proceedings of the 57th Annual Conference of the Japan Society for Applied Physics, Vol.3 pp 906 (7p-E-1). Similarly both of them are equivalent to each other as for a radial tilt signal.

Therefore, various waveforms relating to the tracking error signals and the radial tilt signals in the optical head apparatus according to the third embodiment of the present invention are the same as the waveforms relating to the tracking error signals and the radial tilt signals in the optical head apparatus according to the first embodiment of the present invention. Namely, even if the objective lens 6 is shifted in the radial direction of the disc 7, an offset is not generated in the radial tilt signal and the radial tilt of the disc 7 can be detected correctly.

In the optical head apparatus according to the third embodiment of the present invention, the focused spot 12 as the main beam and the focused spots 87 and 88 as the sub beams are arranged on the same track 11 of the disc 7. Therefore, as for a disc with different track pitches, the arrangement of the focused spots 12, 87 and 88 is not changed, and the radial tilt of a disc with arbitrary track pitch can be detected correctly.

Fourth Embodiment of Optical Head Apparatus

Figure 14:
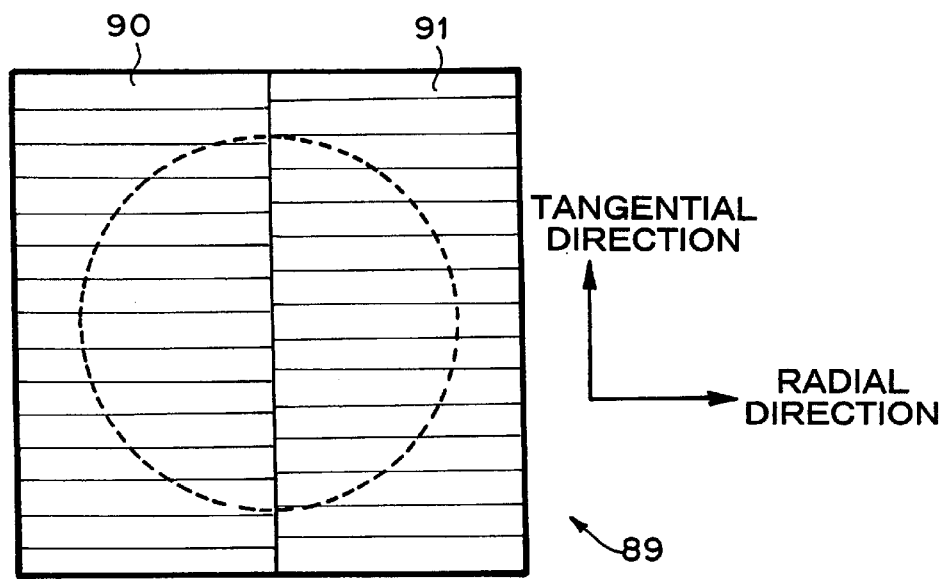
FIG. 14 is a plan view of the diffractive element in the optical head apparatus according to a fourth embodiment of the present invention.

In the optical head apparatus according to the fourth embodiment of the present invention, the diffractive element 3 shown in FIG. 2 in the optical head apparatus according to the first embodiment of the present invention is replaced by a diffractive element 89 shown in FIG. 14.

FIG. 14 a is plan view showing the diffractive element 89. The diffractive element 89 is constituted so that diffraction gratings are formed in a region including the effective diameter of the objective lens 6 shown by a dotted line in the drawing, and the region is divided into two regions 90 and 91 by a straight line which passes through the optical axis of the incident beam and is parallel with the tangential direction of the disc 7. Directions of the diffraction gratings are parallel with the radial direction of the disc 7 in both the regions 90 and 91, and the pattern of the gratings are linear with equal pitches in both the regions 90 and 91. Phases of the gratings in the regions 90 and 91 are shifted by $\pi/2$ each other. When a phase difference between the line portions and the space portions of the gratings is, for example, $0.232\pi$, an incident beam is transmitted about 87.3% as a 0th order beam and is diffracted about 5.1% as ±1st order beams. When the +1st order beam and the −1st order beam are a beam diffracted up and a beam diffracted down in FIG. 14, a phase of the +1st order beam diffracted by the region 90 is advanced by $\pi/2$ from the +1st order beam diffracted by the region 91, and a phase of the −1st order beam diffracted by the region 90 is delayed by $\pi/2$ from the −1st order beam diffracted by the region 91.

Figure 15:
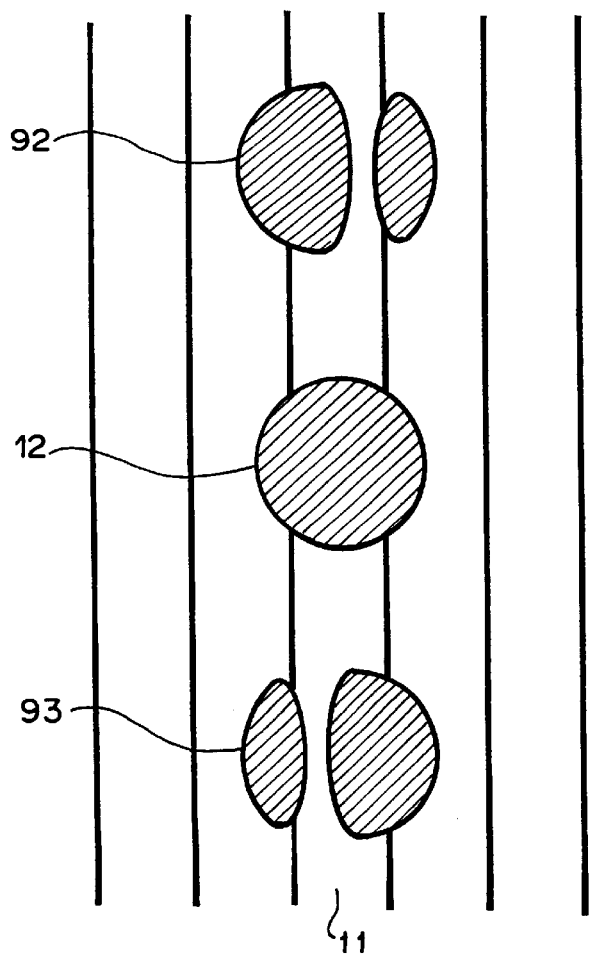
FIG. 15 is a diagram showing an arrangement of focused spots on the disc in the optical head apparatus according to the fourth embodiment of the present invention.

FIG. 15 shows an arrangement of focused spots on the disc 7. Spots 12, 92 and 93 correspond to a 0th order beam, a +1st order beam and a −1st order beam diffracted by the diffractive element 89 respectively, and they are positioned on the same track 11 (groove or land). The focused spot 92 has two peaks in which the intensity is strong on the left side in the radial direction of the disc 7 and the intensity is weak on the right side, and the focused spot 93 has two peaks in which the intensity is weak on the left side in the radial direction of the disc 7 and the intensity is strong on the right side.

The diffractive element 89 is divided into the two regions 90 and 91 by the straight line which passes through the optical axis of the incident beam and is parallel with the tangential direction of the disc 7, and the phases of the gratings in the regions 90 and 91 are shifted by $\pi/2$ each other so that phases of the sub beams entering the objective lens 6 are shifted by $\pi/2$ on the left and right side of the straight line passing through the optical axis and parallel with the tangential direction of the disc 7. Relating to a tracking error signal, this is equivalent to that the focused spots of the two sub beams on the disc 7 are arranged to be shifted from the focused spot of the main beam by ¼ pitch of the groove of the disc 7 to the opposite directions in the radial direction of the disc 7. The reason for this is described in, for example, Japanese Journal of Applied Physics Vol. 38, Part I, 3B, pp. 1761–1767. Similarly both of them are equivalent to each other as for a radial tilt signal.

Figure 11:
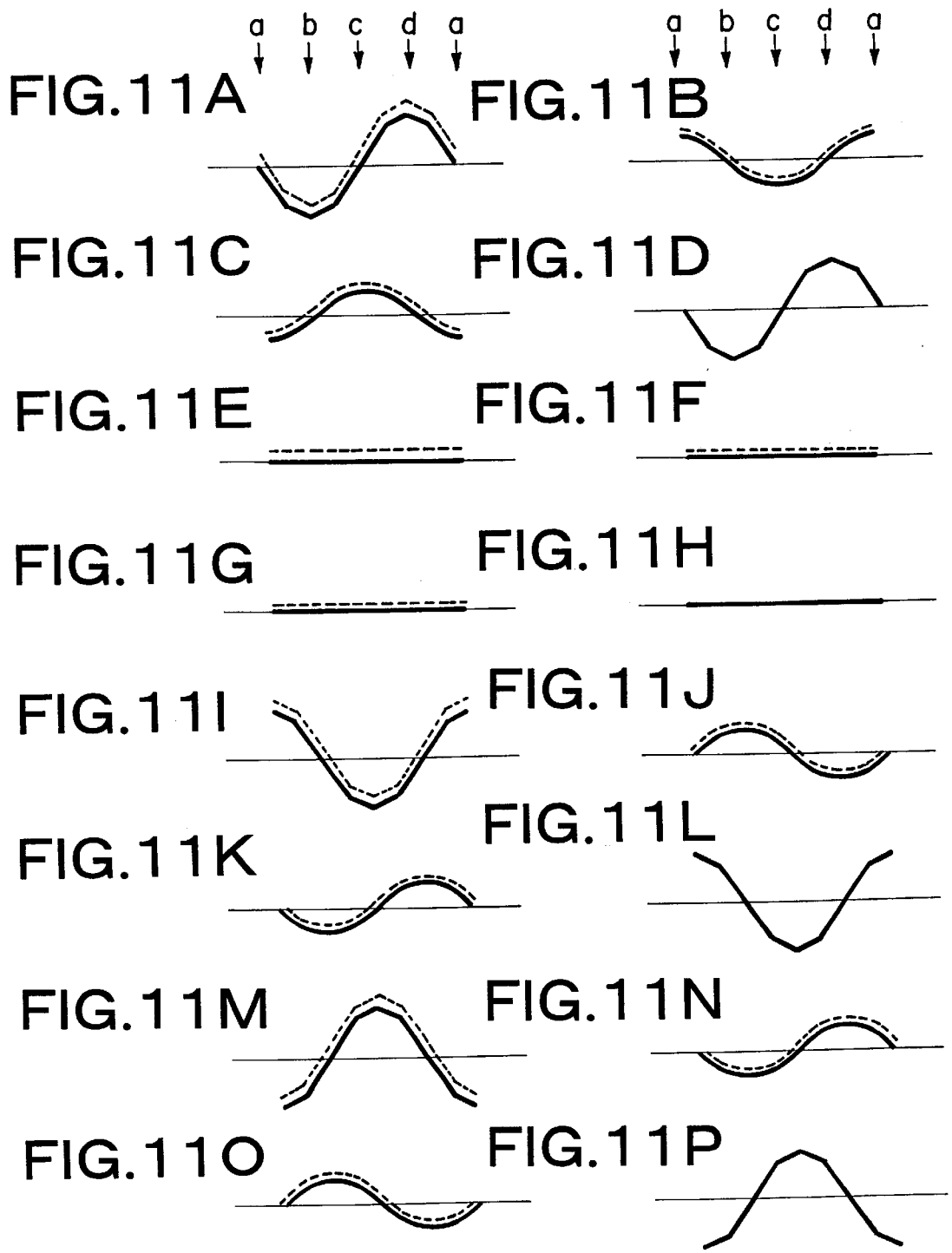
FIGS. 11A to 11P are various waveforms relating to tracking error signals and radial tilt signals in the optical head apparatus according to the second embodiment of the present invention.

Therefore, various waveforms relating to the tracking error signals and the radial tilt signals in the optical head apparatus according to the fourth embodiment of the present invention are the same as the waveforms relating to the tracking error signals and the radial tilt signals in the optical head apparatus according to the second embodiment of the present invention shown in FIG. 11. Namely, even if the objective lens 6 is shifted in the radial direction of the disc 7, an offset is not generated in the radial tilt signal and the radial tilt of the disc 7 can be detected correctly.

In the optical head apparatus according to the fourth embodiment of the present invention, the focused spot 12 as the main beam and the focused spots 92 and 93 as the sub beams are arranged on the same track 11 of the disc 7. Therefore, as for a disc with different track pitches, the arrangement of the focused spots 12, 92 and 93 is not changed, and the radial tilt of a disc with arbitrary track pitch can be detected correctly.

In addition, similarly to the optical head apparatus according to the second embodiment of the present invention, signs of the land/groove position detecting signal enable detection as to whether the focused spot 12 is positioned on the land or groove on the disc 7.

Fifth Embodiment of Optical Head Apparatus

Figure 16:
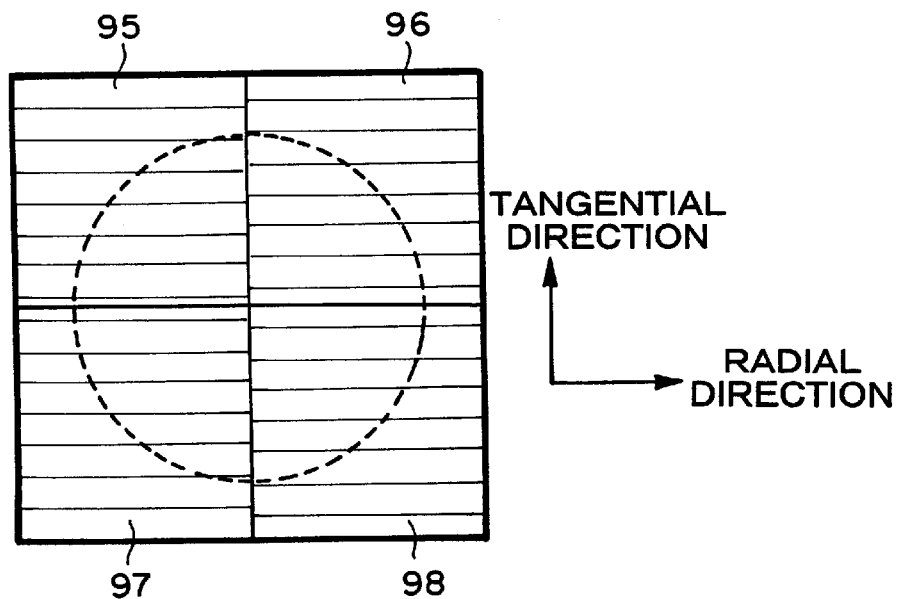
FIG. 16 is a plan view of the diffractive element in the optical head apparatus according to a fifth embodiment of the present invention.

In the optical head apparatus according to the fifth embodiment of the present invention, the diffractive element 3 shown in FIG. 2 of the optical head apparatus according to the first embodiment of the present invention is replaced by a diffractive element 94 shown in FIG. 16.

FIG. 16 is a plan view of the diffractive element 94. The diffractive element 94 is constituted so that diffraction gratings are formed in a region including the effective diameter of the objective lens 6 shown by a dotted line in the drawing, and the region is divided into four regions 95 to 98 by a straight line which passes through the optical axis of the incident beam and is parallel with the tangential direction of the disc 7 and a straight line parallel with the radial direction of the disc 7. Directions of the diffraction gratings are parallel with the radial direction of the disc 7 in all the regions 95 to 98, and the pattern of the gratings are linear with equal pitches in all the regions 95 to 98. Phases of the gratings in the regions 95 and 96 and phases of the gratings in the regions 97 and 98 are shifted by $\pi/2$ each other. When a phase difference between the line portions and the space portions of the gratings is, for example, $0.232\pi$, an incident beam is transmitted about 87.3% as a 0th order beam and is diffracted about 5.1% as ±1st order beams. When the +1st order beam and the −1st order beam are a beam diffracted up and a beam diffracted down in FIG. 16, the phases of the +1st order beams diffracted from the regions 95 and 98 are advanced by $\pi/2$ from the phases of the +1st order beams diffracted from the regions 96 and 97, and the phases of the −1st order beams diffracted from the regions 95 and 98 are delayed by $\pi/2$ from the phases of the −1st order beams diffracted from the regions 96 and 97.

Figure 17:
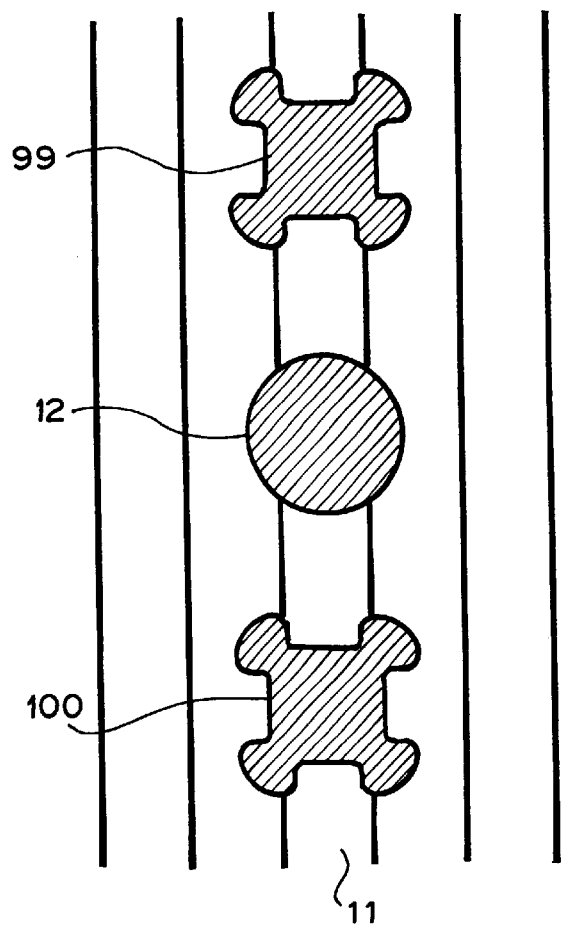
FIG. 17 is a diagram showing an arrangement of focused spots on the disc in the optical head apparatus according to the fifth embodiment of the present invention.

FIG. 17 shows an arrangement of focused spots on the disc 7 in the case where the diffractive element 94 is used in the optical head apparatus.

Spots 12, 99 and 100 correspond to a 0th order beam, a +1st order beam and a −1st order beam diffracted by the diffractive element 94 respectively, and they are positioned on the same track 11 (groove or land). The focused spots 99 and 100 have four side lobes in a direction of ±45° with respect to the tangential direction and the radial direction of the disc 7.

A waveform of [(V23+V24+V25+V26+V31+V32+V33+V34)−(V27+V28+V29+V30+V35+V36+V37+V38)] as a push-pull signal by means of the focused spot 12 as the main beam is represented by the solid line in FIG. 11A. Here, push-pull signals by means of the +1st order beams diffracted from the regions 95 and 96 of the diffractive element 94 and the +1st order beams diffracted from the regions 97 and 98 are called as a plus forward-side push-pull signal and a plus backward-side push-pull signal by means of the focused spot 99 respectively, and push-pull signals by means of the −1st order beams diffracted from the regions 95 and 96 of the diffractive element 94 and the −1st order beams diffracted from the regions 97 and 98 are called as a minus forward-side push-pull signal and a minus backward-side push-pull signal by means of the focused spot 100 respectively. At this time, waveforms of [(V39+V40)−(V41+V42)] as the plus forward-side push-pull signal by means of the focused spot 99 as the sub beam and [(V51+V52)−(V53+V54)] as the minus backward-side push-pull signal by means of the focused spot 100 are represented by the solid line in FIG. 11B.

Waveforms of [(V43+V44)−(V45+V46)] as the plus backward-side push-pull signal by means of the focused spot 99 as the sub beam and [(V47+V48)−(V49+V50)] as the minus forward-side push-pull signal by means of the focused spot 100 are represented by the solid line in FIG. 11C.

For this reason, a waveform of a difference between the push-pull signal by means of the focused spot 12 as the main beam and the sum of the forward-side and backward-side push-pull signals by means of the focused spots 99 and 100 as the sub beams, namely, [(V23+V24+V25+V26+V31+V32+V33+V34)−(V27+V28+V29+V30+V35+V36+V37+V38)]−K[(V39+V40+V43+V44+V47+V48+V51+V52)−(V41+V42+V45+V46+V49+V50+V53+V54)] (K is constant) as a tracking error signal according to the differential push-pull method is represented by the solid line in FIG. 11D.

In the case where the disc 7 has no radial tilt, a waveform of [(V23+V24+V29+V30+V33+V34+V35+V36)−(V25+V26+V27+V28+V31+V32+V37+V38)] as a radial tilt signal by means of the focused spot 12 as the main beam is represented by the solid line in FIG. 11E.

Here, the radial tilt signals by means of the +1st order beams diffracted from the regions 95 and 96 of the diffractive element 94 and the +1st order beams diffracted from the regions 97 and 98 are called as a plus forward-side radial tilt signal and a plus backward-side radial tilt signal by means of the focused spot 99 respectively, and the radial tilt signals by means of the −1st order beams diffracted from the regions 95 and 96 of the diffractive element 94 and the −1st order beams diffracted from the regions 97 and 98 are called as a minus forward-side radial tilt signal and a minus backward-side radial tilt signal by means of the focused spot 100 respectively. At this time, waveforms of [(V39+V42)−(V40+V41)] as the plus forward-side radial tilt signal by means of the focused spot 99 as the sub beam and [(V52+V53)−(V51+V54)] as the minus backward-side radial tilt signal by means of the focused spot 100 are represented by the solid line in FIG. 11F. Waveforms of [(V44+V45)−(V43+V46)] as the plus backward-side radial tilt signal by means of the focused spot 99 as the sub beam and [(V47+V50)−(V48+V49)] as the minus forward-side radial tilt signal by means of the focused spot 100 are represented by the solid line in FIG. 11G.

For this reason, a waveform of a difference between the radial tilt signal by means of the focused spot 12 as the main beam and the sum of the forward-side and backward-side radial tilt signals by means of the focused spots 99 and 100 as the sub beams, namely, of [(V23+V24+V29+V30+V33+V34+V35+V36)−(V25+V26+V27+V28+V31+V32+V37+V38)]−K[(V39+V42+V44+V45+V47+V50+V52+V53)−(V40+V41+V43+V46+V48+V49+V51+V54)] (K is constant) as a final radial tilt signal is represented by the solid line in FIG. 11H.

In the case where the disc 7 has a positive radial tilt, a waveform of [(V23+V24+V29+V30+V33+V34+V35+V36)−(V25+V26+V27+V28+V31+V32+V37+V38)] as a radial tilt signal by means of the focused spot 12 as the main beam is represented by the solid line in FIG. 11I. A waveform of [(V39+V42)−(V40+V41)] as the plus forward-side radial tilt signal by means of the focused spot 99 as the sub beam and a waveform of [(V52+V53)−(V51+V54)] as the minus backward-side radial tilt signal by means of the focused spot 100 are represented by the dotted line in FIG. 11J.

A waveform of [(V44+V45)−(V43+V46)] as the plus backward-side radial tilt signal by means of the focused spot 99 as the sub beam and a waveform of [(V47+V50)−(V48+V49)]as the minus forward-side radial tilt signal by means of the focused spot 100 are represented by the solid line in FIG. 11K. For this reason, a difference between the radial tilt signal by means of the focused spot 12 as the main beam and the sum of the forward-side and backward-side radial tilt signals by means of the focused spots 99 and 100 as the sub beams, namely, a waveform of [(V23+V24+V29+V30+V33+V34+V35+V36)−(V25+V26+V27+V28+V31+V32+V37+V38)]−K [(V39+V42+V44+V45+V47+V50+V52+V53)−(V40+V41+V43+V46+V48+V49+V51+V54)] (K is constant) as a final radial tilt signal is represented by the solid line in FIG. 11L.

In the case where the disc 7 has a negative radial tilt, a waveform of [(V23+V24+V29+V30+V33+V34+V35+V36)−(V25+V26+V27+V28+V31+V32+V37+V38)] as the radial tilt signal by means of the focused spot 12 as the main beam is represented by the solid line in FIG. 11M. A waveform of [(V39+V42)−(V40+V41)] as the plus forward-side radial tilt signal by means of the focused spot 99 as the sub beam and a waveform of [V52+V53)−(V51+V54)] as the minus backward-side radial tilt signal as the focused spot 100 are represented by the solid line in FIG. 11N. A waveform of [(V44+V45))−(V43+V46)] as the plus backward-side radial tilt signal by means of the focused spot 99 as the sub beam and a waveform of [(V47+V50)−(V48+V49)] as the minus forward-side radial tilt signal by means of the focused spot 100 are represented by the solid line in FIG. 11O. For this reason, a difference between the radial tilt signal by means of the focused spot 12 as the main beam and the sum of the forward-side and backward-side radial tilt signals by means of the focused spots 99 and 100 as the sub beams, namely, a waveform of [(V23+V24+V29+V30+V33+V34+V35+V36)−(V25+V26+V27+V28+V31+V32+V37+V38)]−K[(V39+V42+V44+V45+V47+V50+V52+V53)−(V40+V41+V43+V46+V48+V49+V51+V54)] (K is constant) as a final radial tilt signal is represented by the solid line in FIG. 11P.

Various waveforms relating to the tracking error signals and the radial tilt signals when the objective lens 6 is shifted in the radial direction of the disc 7 can be also described similarly with reference to FIG. 11. Namely, even when the objective lens 6 is shifted in the radial direction of the disc 7, an offset is not generated in the radial tilt signal, and the radial tilt of the disc 7 can be detected correctly.

In the optical head apparatus according to the fifth embodiment of the present invention, the focused spot 12 as the main beam and the focused spots 99 and 100 as the sub beams are arranged on the same track 11 of the disc 7. Therefore, as for a disc with different track pitches, the arrangement of the focused spots 12, 99 and 100 is not changed, and the radial tilt of a disc with arbitrary track pitch can be detected correctly.

In the fifth embodiment of the optical head apparatus of the present invention, the waveform of [(V39+V40)−(V41+V42] as the plus forward-side push-pull signal by means of the focused spot 99 as the sub beam and the waveform of [(V51+V52)−(V53+V54)] as the minus backward-side push-pull signal by means of the focused spot 100 are represented by the solid line in FIG. 11B, and the waveform of [(V43+V44)−(V45+V46)] as the plus backward-side push-pull signal by means of the focused spot 99 as the sub beam and the waveform of [(V47+V48)−(V49+V50)] as the minus forward-side push-pull signal by means of the focused spot 100 are represented by the solid line in FIG. 11C.

Here, a difference between the sum of the plus forward-side push-pull signal by means of the focused spot 99 and the minus backward-side push-pull signal by means of the focused spot 100 and the sum of the plus backward-side push-pull signal by means of the focused spot 99 and the minus forward-side push-pull signal by means of the focused spot 100 is called as a land/groove position detecting signal. At this time, a value of [(V39+V40+V45+V46+V49+V50+V51+V52)−(V41+V42+V43+V44+V47+V48+V53+V54)] as the land/groove position detecting signal becomes a positive value in the case where the focused spot 12 as the main beam is positioned on the groove of the disc 7 and becomes a negative value in the case where the focused spot 12 is positioned on the land. Therefore, signs of the land/groove position detecting signal enable detection as to whether the focused spot 12 is positioned on the land or the groove in the disc 7.

In the optical head apparatus according to the fourth embodiment of the present invention, as shown in FIG. 15, the focused spot 92 has the strong intensity on the left side in the radial direction of the disc 7, and the focused spot 93 has the strong intensity on the right side in the radial direction of the disc 7. For this reason, when the track 11 is tilted with respect to the string of the focused spots 12, 92 and 93 due to eccentricity of the disc 7 or the like, the phase of the sum of the push-pull signals by means of the focused spots 92 and 93 changes greatly in the cases where the track 11 is tilted in a positive direction and in a negative direction. As a result, an amplitude of the differential push-pull signals changes greatly.

On the contrary, in the optical head apparatus according to the fifth embodiment of the present invention, as shown in FIG. 17, the intensity distribution in the radial direction of the disc 7 in both the focused spots 99 and 100 is symmetrical. For this reason, the phase of the sum of the push-pull signals by means of the focused spots 99 and 100 does not change in the cases where the track 11 is tilted in the positive direction and in the negative direction with respect to the string of the focused spots 12, 99 and 100 due to the eccentricity of the disc 7 or the like. As a result, the amplitude of the differential push-pull signals does not change.

Sixth Embodiment of Optical Head Apparatus

Figure 18:
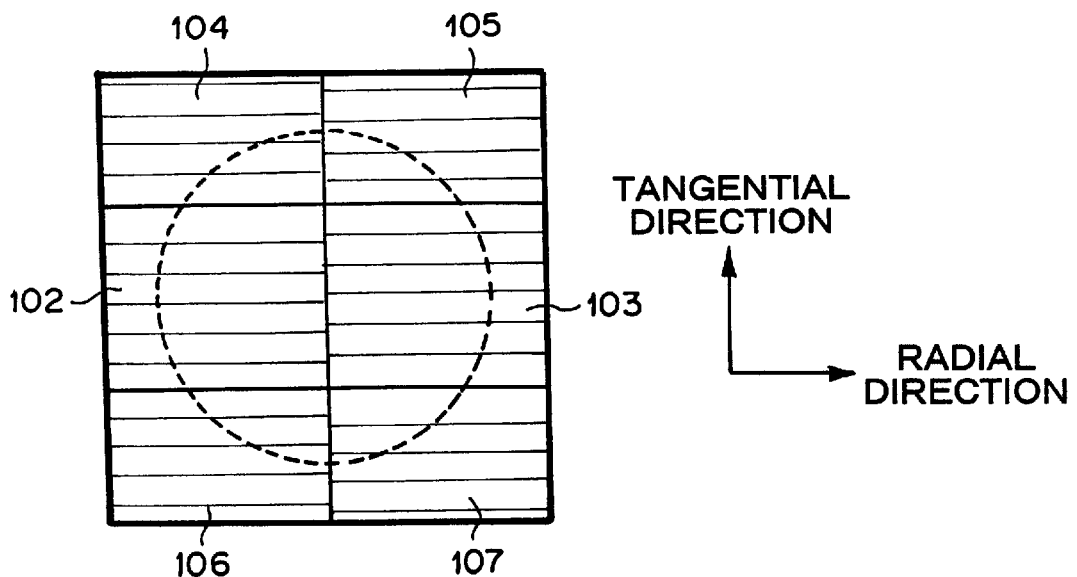
FIG. 18 is a plan view of the diffractive element in the optical head apparatus according to a sixth embodiment of the present invention.

In the optical head apparatus according to the sixth embodiment of the present invention, the diffractive element 3 shown in FIG. 2 of the optical head apparatus according to the first embodiment of the present invention is replaced by a diffractive element 101 shown in FIG. 18.

FIG. 18 is a plan view of the diffractive element 101. The diffractive element 101 is constituted so that diffraction gratings are formed in a region including the effective diameter of the objective lens 6 shown by a dotted line in the drawing, and the region is divided into six regions 102 to 107 by a straight line which passes through the optical axis of the incident beam and is parallel with the tangential direction of the disc 7 and two straight lines parallel with the radial direction of the disc 7.

In an inside of the effective diameter of the objective lens 6, an area occupied by the regions 102 and 103 is larger than an area occupied by the regions 104 to 107. Directions of the diffraction gratings are parallel with the radial direction of the disc 7 in all the regions 102 to 107, and the pattern of the gratings are linear with equal pitches in all the regions 102 to 107. Phases of the gratings in the regions 102, 105 and 107 and phases of the gratings in the regions 103, 104 and 106 are shifted by $\pi/2$ each other. When a phase difference between the line portions and the space portions of the gratings is, for example, $0.232\pi$, an incident beam is transmitted about 87.3% as a 0th order beam and is diffracted about 5.1% as ±1st order beams. When the +1st order beam and the −1st order beam are a beam diffracted up and a beam diffracted down in FIG. 18, the phases of the +1st order beams diffracted from the regions 102, 105 and 107 are advanced by $\pi/2$ from the phases of the +1st order beams diffracted from the regions 103, 104 and 106, and the phases of the −1st order beams diffracted from the regions 102, 105 and 107 are delayed by $\pi/2$ from the phases of the −1st order beams diffracted from the regions 103, 104 and 106.

Figure 19:
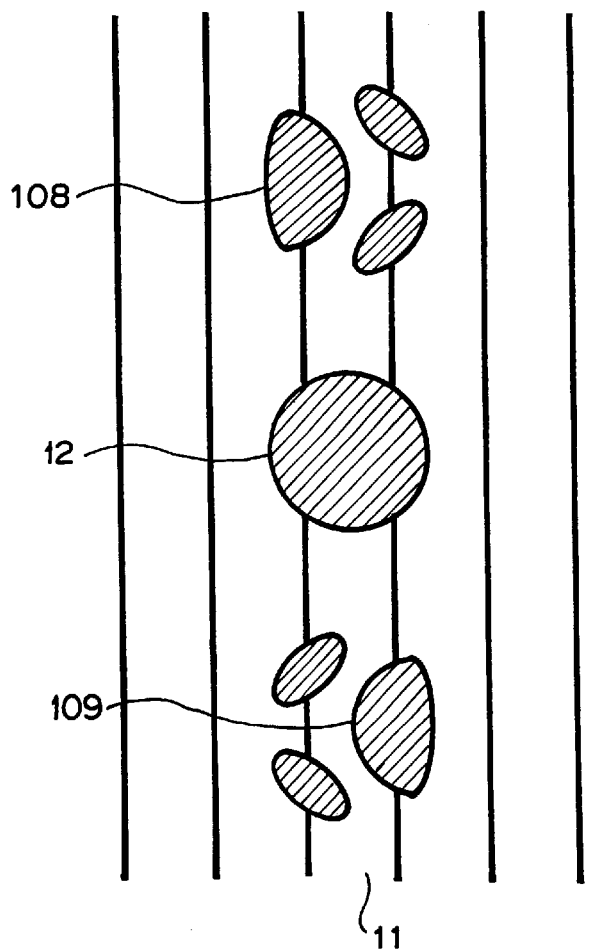
FIG. 19 is a diagram showing an arrangement of focused spots on the disc in the optical head apparatus according to the sixth embodiment of the present invention.

FIG. 19 shows an arrangement of focused spots on the disc 7. Spots 12, 108 and 109 correspond to a 0th order beam, a +1st order beam and a −1st order beam diffracted by the diffractive element 101 respectively, and they are positioned on the same track 11 (groove or land). The focused spot 108 has one peak in which the intensity is strong on the central of the tangential direction and on the left side of the radial direction of the disc 7 and two peaks in which the intensity is strong on the forward side and the backward side of the tangential direction and on the right side of the radial direction of the disc 7. The focused spot 109 has one peak in which the intensity is strong on the central of the tangential direction and on the right side of the radial direction of the disc 7 and two peaks in which the intensity is strong on the forward side and the backward side of the tangential direction and on the left side of the radial direction of the disc 7.

A waveform of [(V23+V24+V25+V26+V31+V32+V33+V34)−(V27+V28+V29+V30+V35+V36+V37+V38)] as a push-pull signal by means of the focused spot 12 as the main beam is represented by the solid line in FIG. 11A. Here, push-pull signals by means of the +1st order beams diffracted from the regions 102 and 103 of the diffractive element 101 and the +1st order beams diffracted from the regions 104 and 105 and the +1st order beams diffracted from the regions 106 and 107 are called as a central push-pull signal, a forward-side push-pull signal and a backward-side push-pull signal by means of the focused spot 108 respectively, and push-pull signals by means of the −1st order beams diffracted from the regions 102 and 103 of the diffractive element 101 and the −1st order beams diffracted from the regions 104 and 105 and the −1st order beams diffracted from the regions 106 and 107 are called as a central push-pull signal, a forward-side push-pull signal and a backward-side push-pull signal by means of the focused spot 109 respectively.

At this time, waveforms of the central push-pull signal by means of the focused spot 108, and the forward-side push-pull signal and the backward-side push-pull signal by means of the focused spot 109 as the sub beam are represented by the solid line in FIG. 11B. Waveforms of the forward-side push-pull signal and the backward-side push-pull signal by means of the focused spot 108 as the sub beam and the central push-pull signal by means of the focused spot 109 are represented by the solid line in FIG. 11C. For this reason, a waveform of a difference between the push-pull signal by means of the focused spot 12 as the main beam and the sum of the central, forward-side and backward-side push-pull signals by means of the focused spots 108 and 109 as the sub beams, namely, [(V23+V24+V25+V26+V31+V32+V33+V34)−(V27+V28+V29+V30+V35+V36+V37+V38)]−K[(V39+V40+V43+V44+V47+V48+V51+V52)−(V41+V42+V45+V46+V49+V50+V53+V54)] (K is constant) as a tracking error signal according to the differential push-pull method is represented by the solid line in FIG. 11D.

In the case where the disc 7 has no radial tilt, a waveform of [(V23+V24+V29+V30+V33+V34+V35+V36)−(V25+V26+V27+V28+V31+V32+V37+V38)] as a radial tilt signal by means of the focused spot 12 as the main beam is represented by the solid line in FIG. 11E.

Here, the radial tilt signals by means of the +1st order beams diffracted from the regions 102 and 103 of the diffractive element 101 and the +1st order beams diffracted from the regions 104 and 105 and the +1st order beams diffracted from the regions 106 and 107 are called as a central radial tilt signal, a forward-side radial tilt signal and a backward-side radial tilt signal by means of the focused spot 108 respectively, and the radial tilt signals by means of the −1st order beams diffracted from the regions 102 and 103 of the diffractive element 101 and the −1st order beams diffracted from the regions 104 and 105 and the −1st order beams diffracted from the regions 106 and 107 are called as a central radial tilt signal, a forward-side radial tilt signal and a backward-side radial tilt signal by means of the focused spot 109 respectively.

At this time, waveforms of the central radial tilt signal by means of the focused spot 108 as the sub beam and the forward-side radial tilt signal and the backward-side radial tilt signal by means of the focused spot 109 as the sub beam are represented by the solid line in FIG. 11F. Waveforms of the forward-side radial tilt signal and the backward-side radial tilt signal by means of the focused spot 108 as the sub beam and the central radial tilt signal by means of the focused spot 109 are represented by the solid line in FIG. 11G. For this reason, a waveform of a difference between the radial tilt signal by means of the focused spot 12 as the main beam and the sum of the central, forward-side and backward-side radial tilt signals by means of the focused spots 108 and 109 as the sub beams, namely, of [(V23+V24+V29+V30+V33+V34+V35+V36)−(V25+V26+V27+V28+V31+V32+V37+V38)]−K[(V39+V42+V44+V45+V47+V50+V52+V53)−(V40+V41+V43+V46+V48+V49+V51+V54)] (K is constant) as a final radial tilt signal is represented by the solid line in FIG. 11H.

In the case where the disc 7 has a positive radial tilt, a waveform of [(V23+V24+V29+V30+V33+V34+V35+V36)−(V25+V26+V27+V28+V31+V32+V37+V38)] as a radial tilt signal by means of the focused spot 12 as the main beam is represented by the solid line in FIG. 11I. Waveforms of the central radial tilt signal by means of the focused spot 108 as the sub beam, and the forward-side radial tilt signal and the backward-side radial tilt signal by means of the focused spot 109 are represented by the solid line in FIG. 11J. Waveforms of the forward-side radial tilt signal and the backward-side radial tilt signal by means of the focused spot 108 as the sub beam and a waveform of the central radial tilt signal by means of the focused spot 109 are represented by the solid line in FIG. 11K. For this reason, a difference between the radial tilt signal by means of the focused spot 12 as the main beam and the sum of the central, forward-side and backward-side radial tilt signals by means of the focused spots 108 and 109 as the sub beams, namely, a waveform of [(V23+V24+V29+V30+V33+V34+V35+V36)−(V25+V26+V27+V28+V31+V32+V37+V38)]−K[(V39+V42+V44+V45+V47+V50+V52+V53)−(V40+V41+V43+V46+V48+V49+V51+V54)] (K is constant) as a final radial tilt signal is represented by the solid line in FIG. 11L.

In the case where the disc 7 has a negative radial tilt, a waveform of [(V23+V24+V29+V30+V33+V34+V35+V36)−(V25+V26+V27+V28+V31+V32+V37+V38)] as the radial tilt signal by means of the focused spot 12 as the main beam is represented by the solid line in FIG. 11M.

Waveforms of the central radial tilt signal by means of the focused spot 108 as the sub beam, and the forward-side radial tilt signal and the backward-side radial tilt signal by means of the focused spot 109 are represented by the solid line in FIG. 11N. Waveforms of the forward-side radial tilt signal and the backward-side radial tilt signal by means of the focused spot 108 as the sub beam and the central radial tilt signal by means of the focused spot 109 are represented by the solid line in FIG. 11O. For this reason, a waveform of a difference between the radial tilt signal by means of the focused spot 12 as the main beam and the sum of the central, forward-side and backward-side radial tilt signals by means of the focused spots 108 and 109 as the sub beam, namely, a waveform of [(V23+V24+V29+V30+V33+V34+V35+V36)−(V25+V26+V27+V28+V31+V32+V37+V38)]−K[(V39+V42+V44+V45+V47+V50+V52+V53)−(V40+V41+V43+V46+V48+V49+V51+V54)] (K is constant) as a final radial tilt signal is represented by the solid line in FIG. 11P.

Various waveforms relating to the tracking error signals and the radial tilt signals when the objective lens 6 is shifted in the radial direction of the disc 7 can be also described similarly with reference to FIG. 11. Namely, even when the objective lens 6 is shifted in the radial direction of the disc 7, an offset is not generated in the radial tilt signal, and the radial tilt of the disc 7 can be detected correctly.

In the optical head apparatus according to the sixth embodiment of the present invention, the focused spot 12 as the main beam and the focused spots 108 and 109 as the sub beams are arranged on the same track 11 of the disc 7. Therefore, as for a disc with different track pitches, the arrangement of the focused spots 12, 108 and 109 is not changed, and the radial tilt of a disc with arbitrary track pitch can be detected correctly.

In addition, similarly to the optical head apparatus according to the second embodiment of the present invention, detection can be made as to whether the focused spot 12 is positioned on the land and the groove in the disc 7.

In the optical head apparatus according to the fourth embodiment of the present invention, as shown in FIG. 15, the focused spot 92 has the strong intensity on the left side in the radial direction of the disc 7, and the focused spot 93 has the strong intensity on the right side in the radial direction of the disc 7. For this reason, when the track 11 is tilted with respect to the string of the focused spots 12, 92 and 93 due to eccentricity of the disc 7 or the like, the phase of the sum of the push-pull signals by means of the focused spots 92 and 93 changes greatly in the cases where the track 11 is tilted in a positive direction and in a negative direction. As a result, an amplitude of the differential push-pull signal changes greatly.

On the contrary, in the optical head apparatus according to the sixth embodiment of the present invention, as shown in FIG. 19, on the focused spot 108, the intensity is strong on the left side of the radial direction at the central of the tangential direction of the disc 7 and on the right side of the radial direction on the forward and backward sides of the tangential direction of the disc 7. On the focused spot 109, the intensity is strong on the right side of the radial direction at the central of the tangential direction of the disc 7, and on the left side of the radial direction on the forward and backward sides of the tangential direction of the disc 7. For this reason, the phase of the sum of the push-pull signals by means of the focused spots 108 and 109 does not change in the cases where the track 11 is tilted in the positive direction and in the negative direction with respect to the string of the focused spots 12, 108 and 109 due to the eccentricity of the disc 7 or the like. As a result, the amplitude of the differential push-pull signal does not change greatly.

Seventh Embodiment of Optical Head Apparatus

Figure 20:
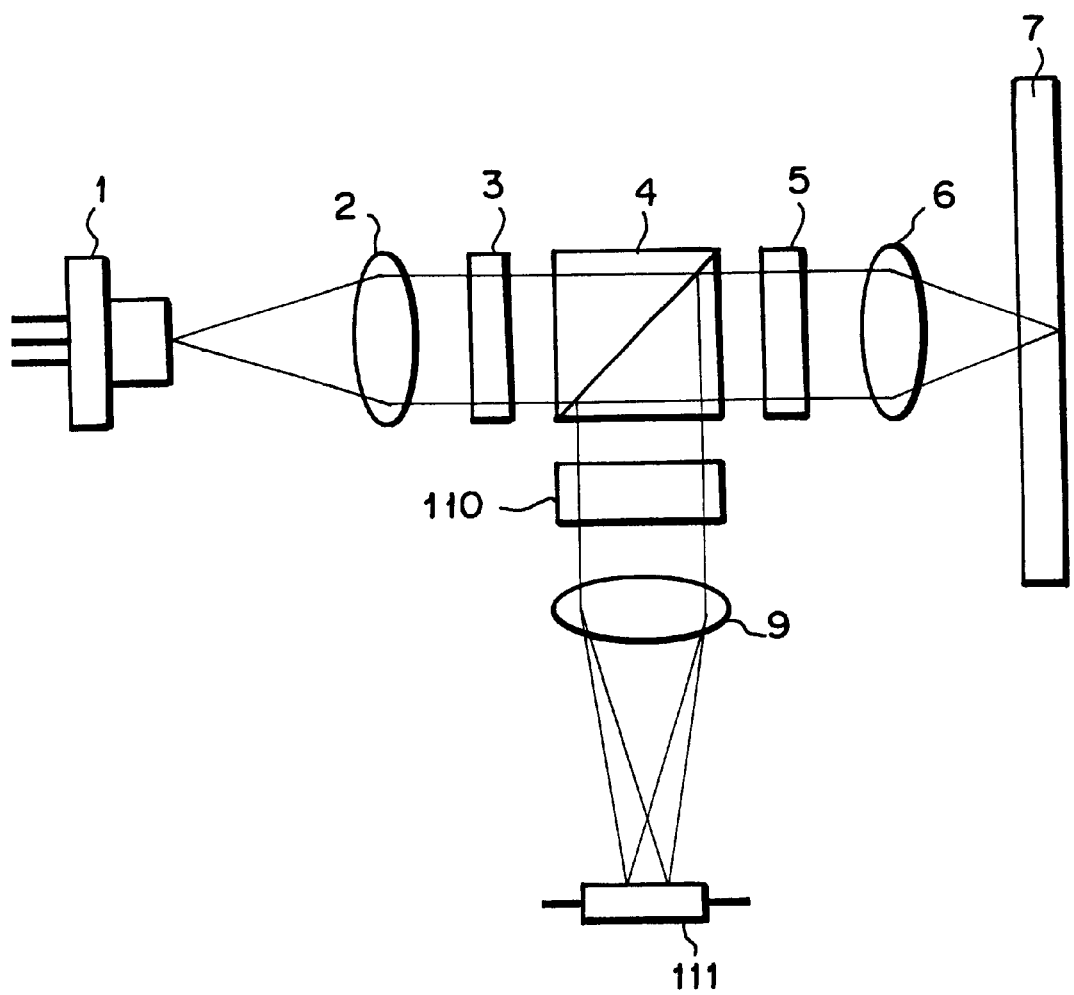
FIG. 20 is a diagram showing an optical head apparatus according to a seventh embodiment of the present invention.

FIG. 20 shows the optical head apparatus according to the seventh embodiment of the present invention. A beam emitted from the semiconductor laser 1 is converted into a parallel beam by the collimating lens 2, and is divided into three beams: a 0th order beam as a main beam; and ±1st order beams diffracted as sub beams by the diffractive element 3. These beams enter the polarizing beam splitter 4 as P polarized beams and are reflected about 100% thereby. Thereafter, they are transmitted through the quarter wave plate 5 so as to be converted from linear polarized beams into circular polarized beams, and are focused on the disc 7 by the objective lens 6. The three beams reflected from the disc 7 are transmitted through the objective lens 6 in the opposite directions, and are transmitted through the quarter wave plate 5 so as to be converted from the circular polarized beams into linear polarized beams whose polarizing direction intersects perpendicularly to that in the forward path. Further, the linear polarized beams enter the polarizing beam splitter 4 as S polarized beams and are reflected approximately 100% thereby, and are transmitted through a cylindrical lens 110 and the lens 9 so as to be received by a photo detector 111. The photo detector 111 is provided in the middle of the focal lines of the cylindrical lens 110 and the lens 9.

The plan view of the diffractive element 3 in the optical head apparatus according to the seventh embodiment of the present invention is the same as the plan view of the diffractive element 3 in the optical head apparatus according to the first embodiment of the present invention shown in FIG. 2. Moreover, the arrangement of focused spots on the disc 7 in the optical head apparatus according to the seventh embodiment of the present invention is the same as the arrangement of the focused spots on the disc 7 in the optical head apparatus according to the first embodiment of the present invention shown in FIG. 3.

Figure 21:
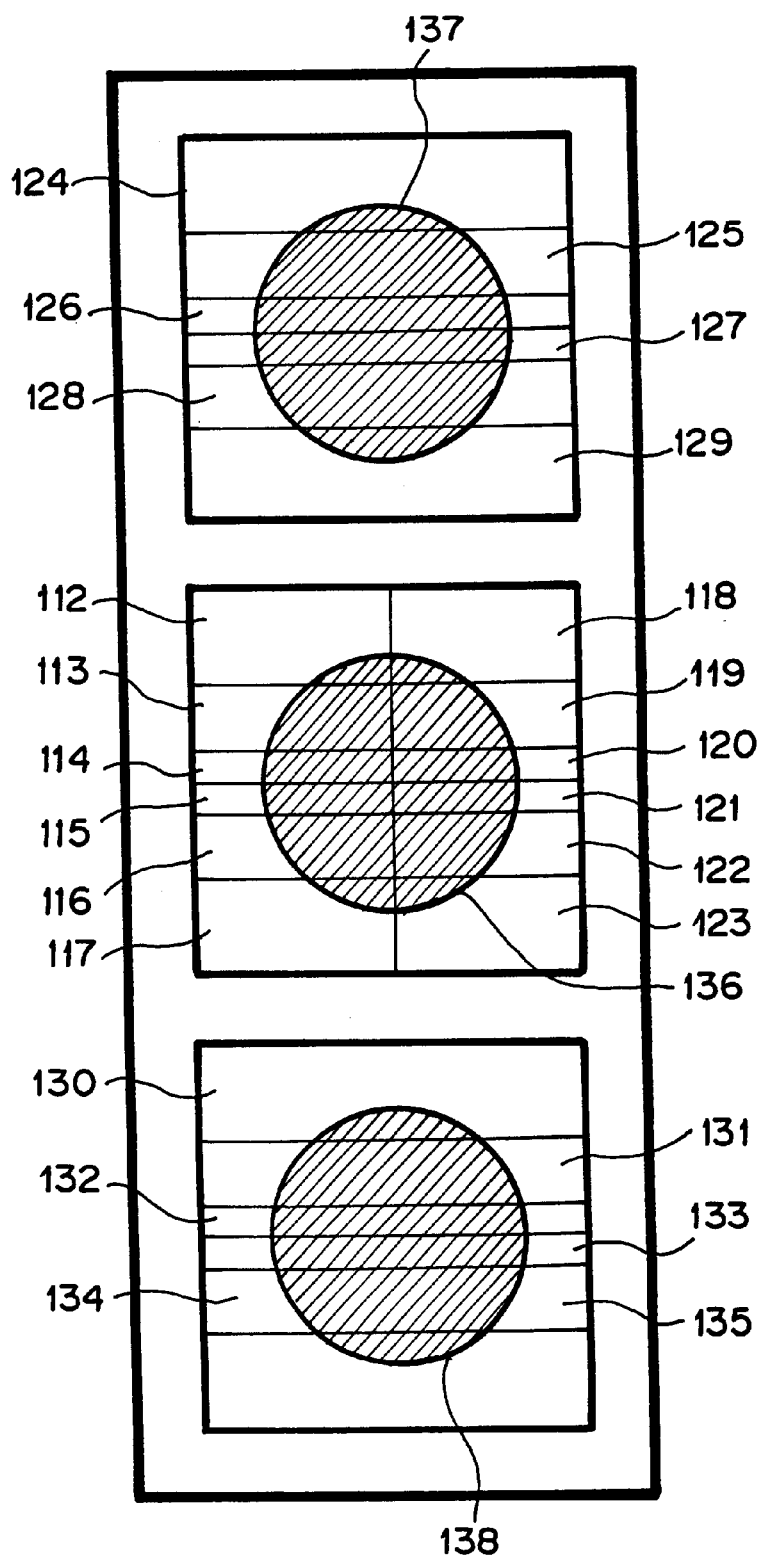
FIG. 21 is a diagram showing a pattern of detection portions of the photo detector in the optical head apparatus according to the seventh embodiment of the present invention and an arrangement of focused spots on the photo detector.

FIG. 21 shows a pattern of detection portions of the photo detector 111 and an arrangement of focused spots on the photo detector 111. A focused spot 136 corresponds to a 0th order beam from the diffractive element 3, and is received by detection portions 112 to 123 which are divided into 12 by five dividing lines passing through the optical axis and parallel with the tangential direction of the disc 7 and one dividing line parallel with the radial direction.

A focused spot 137 corresponds to a +1st order beam diffracted by the diffractive element 3, and is received by detection portions 124 to 129 which are divided into six by five dividing lines parallel with the tangential direction of the disc 7. A focused spot 138 corresponds to a −1st order beam, and is received by detection portions 130 to 135 which are divided into six by five dividing lines parallel with the tangential direction of the disc 7.

As shown in FIG. 3, the string of the focused spots 12 to 14 on the disc 7 is in the tangential direction, but the string of the focused spots 136 to 138 on the photo detector 111 is in the radial direction due to the function of the cylindrical lens 110 and the lens 9.

When outputs from the detection portions 112 to 135 of the photo detector 111 shown in FIG. 21 are represented by V112 to V135 respectively, a focusing error signal is obtained by calculation of [(V112+V113+V114+V121+V122+V123)−(V115+V116+V117+V118+V119+V120)] according to the astigmatic method.

A tracking error signal is obtained by calculation of [(V112+V113+V114+V118+V119+V120)−(V115+V116+V117+V121+V122+V123)]−K[(V124+V125+V126+V130+V131+V132)−(V127+V128+V129+V133+V134+V135)] (K is constant) according to the differential push-pull method.

A radial tilt signal for detecting a radial tilt of the disc 7 is obtained by calculation of [(V112+V114+V116+V118+V120+V122)−(V113+V115+V117+V119+V121+V123)]−K[(V124+V126+V128+V130+V132+V134)−(V125+V127+V129+V131+V133+V135)] (K is constant).

In addition, a playback signal by means of the focused spot 12 as the main beam is obtained by calculation of [V112+V113+V114+V115+V116+V117+V118+V119+V120+V121+V122+V123].

Various waveforms relating to tracking error signals and radial tilt signals in the optical head apparatus according to the seventh embodiment of the present invention are the same as the various waveforms relating to the tracking error signals and the radial tilt signals in the optical head apparatus according to the first embodiment of the present invention shown in FIG. 6. Namely, even if the objective lens 6 is shifted in the radial direction of the disc 7, an offset is not generated in the radial tilt signal, and the radial tilt of the disc 7 can be detected correctly.

Eighth Embodiment of Optical Head Apparatus

Figure 22:
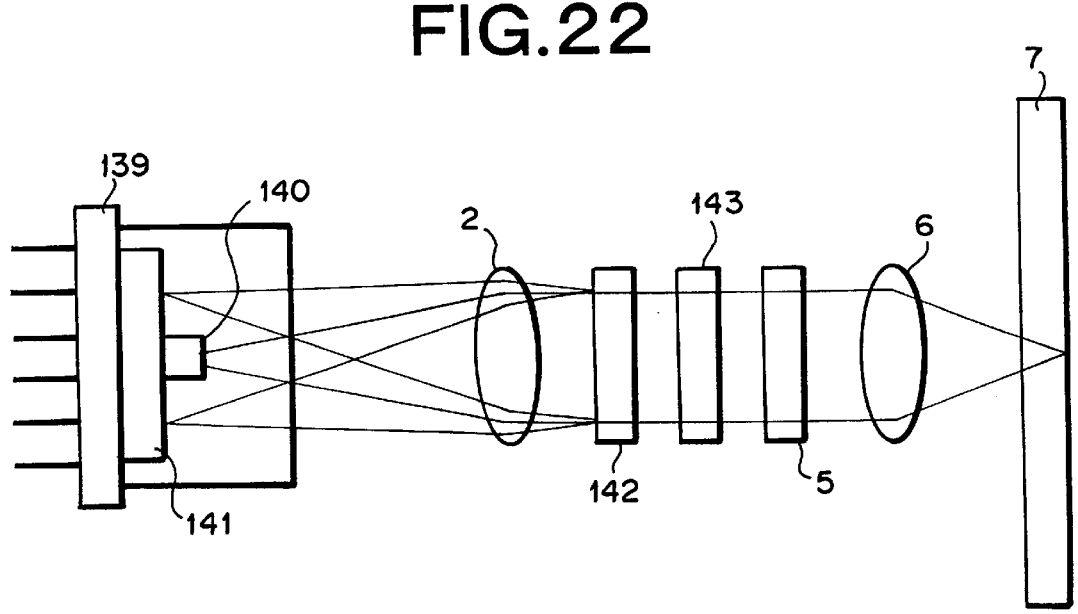
FIG. 22 is a diagram showing an optical head apparatus according to an eighth embodiment of the present invention.

FIG. 22 shows the optical head apparatus according to the eighth embodiment of the present invention. A semiconductor laser 140 and a photo detector 141 are installed in a module 139. Here, an optical path from the semiconductor laser 140 to the disc 7 is a forward path, and an optical path from the disc 7 to the photo detector 141 is a return path.

A beam emitted from a semiconductor laser 140 is converted into a parallel beam by the collimating lens 2 and enters a polarizing diffractive element 142 as an extraordinary beam so as to be divided into three beams: a 0th order beam as a main beam; and ±1st order beams as sub beams. These beams enter the polarizing holographic element 143 as ordinary beams and are transmitted about 100% therethrough. Thereafter, they are transmitted through the quarter wave plate 5 so as to be converted from linear polarized beams into circular polarized beams, and are focused on the disc 7 by the objective lens 6. The three beams reflected from the disc 7 are transmitted through the objective lens 6 in the opposite direction, and are transmitted through the quarter wave plate 5 so as to be converted from the circular polarized beams into linear polarized beams whose polarizing direction intersects perpendicularly to that in the forward path. Further, the linear polarized beams enter the polarizing holographic element 143 as extraordinary beams and are diffracted about 100% thereby as +1st order beams diffracted, and enter the polarizing diffractive element 142 as ordinary beams so as to be diffracted about 100% thereby. Thereafter, the beams are transmitted through the collimating lens 2 and are received by a photo detector 141.

The plan view of the polarizing diffractive element 142 in the optical head apparatus according to the eighth embodiment of the present invention is the same as the plan view of the diffractive element 3 in the optical head apparatus according to the first embodiment of the present invention shown in FIG. 2. The polarizing diffractive element 142 is constituted so that two-layered gratings which are composed of a proton exchange region and a dielectric film is formed on a lithium niobate substrate having birefringence, for example. A depth of the proton exchange region and a thickness of the dielectric film are designed suitably so that a phase difference between a line area and a space area of the gratings can be defined independently for ordinary beam and extraordinary beam. When the phase difference between the line area and the space area of the extraordinary beam on the forward path is 0.232π, the incident beam is transmitted about 87.3% as a 0th order beam and is diffracted about 5.1% as ±1st order beams. Meanwhile, when the phase difference between the line area and the space area of the gratings of the ordinary beam on the return path is zero, the incident beam is transmitted approximately 100%.

The arrangement of focused spots on the disc 7 in the optical head apparatus according to the eighth embodiment of the present invention is the same as the arrangement of the focused spots on the disc 7 in the optical head apparatus according to the first embodiment of the present invention shown in FIG. 3.

The plan view of the polarizing holographic element 143 in the optical head apparatus according to the eighth embodiment of the present invention is the same as the plan view of the holographic element 8 in the optical head apparatus according to the first embodiment of the present invention shown in FIG. 4.

The polarizing holographic element 143 is constituted so that two-layered gratings which are composed of a proton exchange region and a dielectric film are formed on a lithium niobate substrate having birefringence, for example. Further, the sectional shape of the gratings is a two-layered saw tooth shape in all the regions 15 to 22, and a depth of the proton exchange region and a thickness of the dielectric film are designed suitably so that a phase difference between the top area and the bottom area of the saw teeth can be defined independently for ordinary beam and extraordinary beam. When the phase difference between the top area and the bottom area of the saw teeth is zero for the ordinary beam on the forward path, incident beams to the respective regions are transmitted approximately 100%. Meanwhile, when the phase difference between the top area and the bottom area of the saw teeth is 2π for extraordinary beam on the return path, incident beams to the respective areas are diffracted approximately 100% as +1st order beams.

Figure 23:
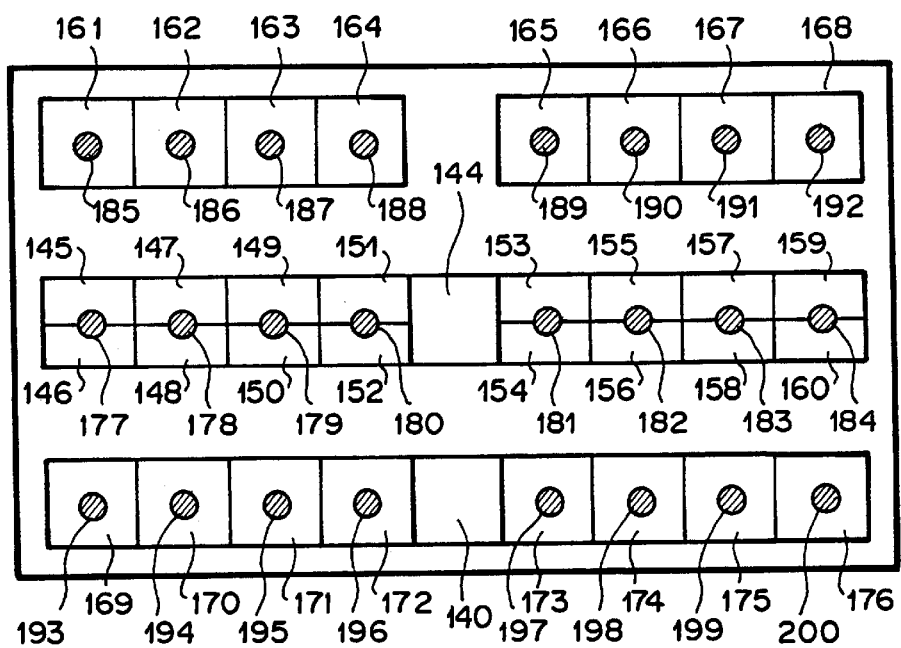
FIG. 23 is a diagram showing a pattern of detection portions of the photo detector in the optical head apparatus according to the eighth embodiment of the present invention and an arrangement of focused spots on the photo detector.

FIG. 23 shows a pattern of detection portions of the photo detector 141 and the arrangement of focused spots on the photo detector 141. The semiconductor laser 140 and a mirror 144 are provided on the photo detector 141. A beam emitted from the semiconductor laser 140 is reflected by the mirror 144 and goes to the disc 7. A focused spot 177 corresponds to a +1st order beam diffracted by the region 15 of the polarizing holographic element 143 of the 0th order beam from the polarizing diffractive element 142, and is focused on a boundary line between detection portions 145 and 146 divided as two sections by a dividing line parallel with the radial direction of the disc 7. A focused spot 178 corresponds to a +1st order beam diffracted by the region 16 of the polarizing holographic element 143 of 0th order beam from the polarizing diffractive element 142, and is focused on a boundary line between detection portions 147 and 148 divided as two regions by a dividing line parallel with the radial direction of the disc 7. A focused spot 179 corresponds to a +1st order beam diffracted by the region 17 of the polarizing holographic element 143 of the 0th order beam from the polarizing diffractive element 142, and is focused on a boundary line between detection portions 149 and 150 divided as two regions by a dividing line parallel with the radial direction of the disc 7. A focused spot 180 corresponds to a +1st order beam diffracted by the region 18 of the polarizing holographic element 143 of the 0th order beam from the polarizing diffractive element 142, and is focused on a boundary line between detection portions 151 and 152 divided as two regions by a dividing line parallel with the radial direction of the disc 7.

A focused spot 181 corresponds to a +1st order beam diffracted by the region 20 of the polarizing holographic element 143 of the 0th order beam from the polarizing diffractive element 142, and is focused on a boundary line between detection portions 153 and 154 divided as two regions by a dividing line parallel with the radial direction of the disc 7. A focused spot 182 corresponds to a +1st order beam diffracted by the region 19 of the polarizing holographic element 143 of the 0th order beam from the polarizing diffractive element 142, and is focused on a boundary line between detection portions 155 and 156 divided as two regions by a dividing line parallel with the radial direction of the disc 7. A focused spot 183 corresponds to a +1st order beam diffracted by the region 22 of the polarizing holographic element 143 of the 0th order beam from the polarizing diffractive element 142, and is focused on a boundary line between detection portions 157 and 158 divided as two regions by a dividing line parallel with the radial direction of the disc 7. A focused spot 184 corresponds to a +1st order beam diffracted by the region 21 of the polarizing holographic element 143 of the 0th order beam from the polarizing diffractive element 142, and is focused on a boundary line between detection portions 159 and 160 divided as two regions by a dividing line parallel with the radial direction of the disc 7.

In addition, a focused spot 185 corresponds to a +1st order beam diffracted by the region 15 of the polarizing holographic element 143 in the +1st order beam diffracted from the polarizing diffractive element 142, and is focused on a single beam receiving area 161. A focused spot 186 corresponds to a +1st order beam diffracted by the region 16 of the polarizing holographic element 143 in the +1st order beam diffracted from the polarizing diffractive element 142, and is focused on a single beam receiving area 162. A focused spot 187 corresponds to a +1st order beam diffracted by the region 17 of the polarizing holographic element 143 in the +1st order beam diffracted from the polarizing diffractive element 142, and is focused on a single beam receiving area 163. A focused spot 188 corresponds to a +1st order beam diffracted by the region 18 of the polarizing holographic element 143 in the +1st order beam diffracted from the polarizing diffractive element 142, and is focused on a single beam receiving area 164. A focused spot 189 corresponds to a +1st order beam diffracted by the region 20 of the polarizing holographic element 143 in the +1st order beam diffracted from the polarizing diffractive element 142, and is focused on a single beam receiving area 165.

A focused spot 190 corresponds to a +1st order beam diffracted by the region 19 of the polarizing holographic element 143 in the +1st order beam diffracted from the polarizing diffractive element 142, and is focused on a single beam receiving area 166. A focused spot 191 corresponds to a +1st order beam diffracted by the region 22 of the polarizing holographic element 143 in the +1st order beam diffracted from the polarizing diffractive element 142, and is focused on a single beam receiving area 167. A focused spot 192 corresponds to a +1st order beam diffracted by the region 21 of the polarizing holographic element 143 in the +1st order beam diffracted from the polarizing diffractive element 142, and is focused on a single beam receiving area 168.

In addition, a focused spot 193 corresponds to a +1st order beam diffracted by the region 15 of the polarizing holographic element 143 in −1st order beam diffracted from the polarizing diffractive element 142, and is focused on a single beam receiving area 169. A focused spot 194 corresponds to a +1st order beam diffracted by the region 16 of the polarizing holographic element 143 in the −1st order beam diffracted from the polarizing diffractive element 142, and is focused on a single beam receiving area 170. A focused spot 195 corresponds to a +1st order beam diffracted by the region 17 of the polarizing holographic element 143 in the −1st order beam diffracted from the polarizing diffractive element 142, and is focused on a single beam receiving area 171. A focused spot 196 corresponds to a +1st order beam diffracted by the region 18 of the polarizing holographic element 143 in the −1st order beam diffracted from the polarizing diffractive element 142, and is focused on a single beam receiving area 172.

A focused spot 197 corresponds to a +1st order beam diffracted by the region 20 of the polarizing holographic element 143 in the −1st order beam diffracted from the polarizing diffractive element 142, and is focused on a single beam receiving area 173. A focused spot 198 corresponds to a +1st order beam diffracted by the region 19 of the polarizing holographic element 143 in the −1st order beam diffracted from the polarizing diffractive element 142, and is focused on a single beam receiving area 174. A focused spot 199 corresponds to a +1st order beam diffracted by the region 22 of the polarizing holographic element 143 in the −1st order beam diffracted from the polarizing diffractive element 142, and is focused on a single beam receiving area 175. A focused spot 200 corresponds to a +1st order beam diffracted by the region 21 of the polarizing holographic element 143 in the −1st order beam diffracted from the polarizing diffractive element 142, and is focused on a single beam receiving area 176.

Here, when outputs from the detection portions 145 to 176 are represented by V145 to V176 respectively, a focusing error signal is obtained by calculation of [(V145+V147+V149+V151+V154+V156+V158+V160)−(V146+V148+V150+V152+V153+V155+V157+V159)] according to the Foucault method.

A tracking error signal is obtained by calculation of [(V145+V146+V147+V148+V153+V154+V155+V156)−(V149+V150+V151+V152+V157+V158+V159+V160)]−K[(V161+V162+V165+V166+V169+V170+V173+V174)−(V163+V164+V167+V168+V171+V172+V175+V176)] (K is constant) according to the differential push-pull method.

A radial tilt signal for detecting a radial tilt of the disc 7 is obtained by calculation of [(V145+V146+V151+V152+V155+V156+V157+V158)−(V147+V148+V149+V150+V153+V154+V159+V160)]−K[(V161+V164+V166+V167+V169+V172+V174+V175)−(V162+V163+V165+V168+V170+V171+V173+VI 76)] (K is constant).

In addition, a playback signal by means of the focused spot 12 as the main beam is obtained by calculation of [V145+V146+V147+V148+V149+V150+V151+V152+V153+V154+V155+V156+V157+V158+V159+V160].

Various waveforms relating to tracking error signals and radial tilt signals in the optical head apparatus according to the eighth embodiment of the present invention are the same as the various waveforms relating to the tracking error signals and the radial tilt signals in the optical head apparatus according to the first embodiment of the present invention shown in FIG. 6. Namely, even if the objective lens 6 is shifted in the radial direction of the disc 7, an offset is not generated in the radial tilt signal, and the radial tilt of the disc 7 can be detected correctly.

Ninth Embodiment of Optical Head Apparatus

Figure 24:
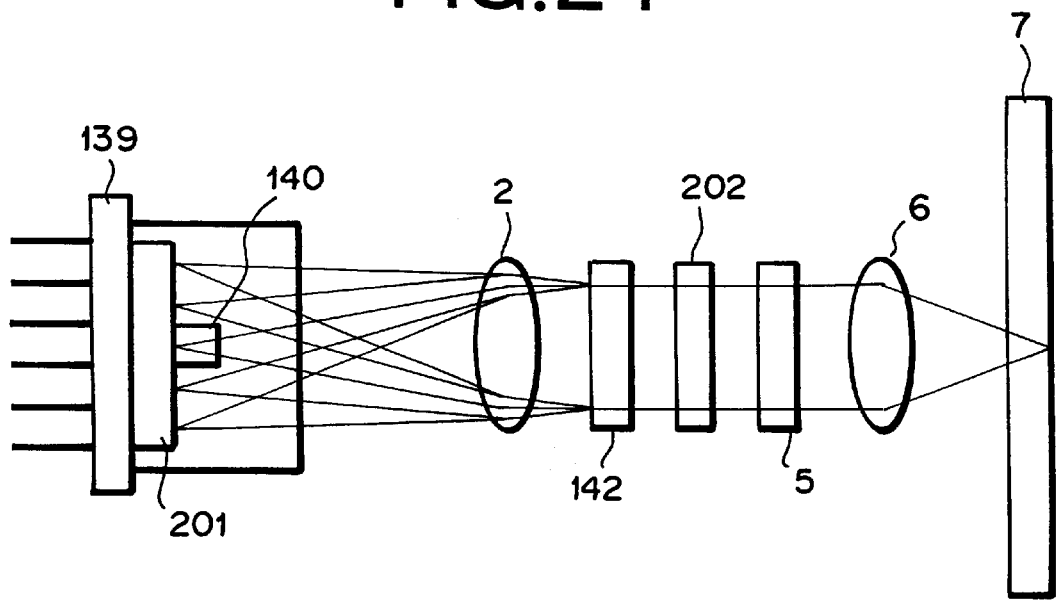
FIG. 24 is a diagram showing an optical head apparatus according to a ninth embodiment of the present invention.

FIG. 24 shows the optical head apparatus according to a ninth embodiment of the present invention. The semiconductor laser 140 and a photo detector 201 are provided in the module 139.

A beam emitted from a semiconductor laser 140 is converted into a parallel beam by the collimating lens 2 and enters the polarizing diffractive element 142 as an extraordinary beam so as to be divided into three beams: a 0th order beam as a main beam; and ±1st order beams diffracted as sub beams. These beams enter a polarizing holographic element 202 as ordinary beams and are transmitted approximately 100% therethrough. Thereafter, they are transmitted through the quarter wave plate 5 so as to be converted from linear polarized beams into circular polarized beams, and are focused on the disc 7 by the objective lens 6.

The three beams reflected from the disc 7 are transmitted through the objective lens 6 in the opposite direction, and are transmitted through the quarter wave plate 5 so as to be converted from the circular polarized beams into linear polarized beams whose polarizing direction intersects perpendicularly to that in the forward path. Further, the linear polarized beams enter the polarizing holographic element 202 as extraordinary beams and are mostly diffracted thereby as ±1st order beams, and enter the polarizing diffractive element 142 as ordinary beams so as to be transmitted approximately 100% therethrough. Thereafter, the beams are transmitted through the collimating lens 2 and are received by the photo detector 201. The photo detector 201 is provided in the middle of two focal lines of the polarizing holographic element 202 and the collimating lens 2.

The plan view of the polarizing diffractive element 142 in the optical head apparatus according to the ninth embodiment of the present invention is the same as the plan view of the diffractive element 3 in the optical head apparatus according to the first embodiment of the present invention shown in FIG. 2. The polarizing diffractive element 142 is constituted so that two-layered gratings which are composed of a proton exchange region and a dielectric film are formed on a lithium niobate substrate having birefringence, for example. A depth of the proton exchange region and a thickness of the dielectric film are designed suitably so that a phase difference between a top area and a bottom area of the gratings can be defined independently for ordinary beam and extraordinary beam.

When the phase difference between the line area and the space area of the extraordinary beam on the forward path is $0.232\pi$, the incident beam is transmitted about 87.3% as a 0th order beam and is diffracted about 5.1% as ±1st order beams. Meanwhile, when the phase difference between the line area and the space area of the gratings of the ordinary beam on the return path is zero, the incident beam is transmitted approximately 100%. The arrangement of focused spots on the disc 7 in the optical head apparatus according to the ninth embodiment of the present invention is the same as the arrangement of the focused spots on the disc 7 in the optical head apparatus according to the first embodiment of the present invention shown in FIG. 3.

Figure 25:
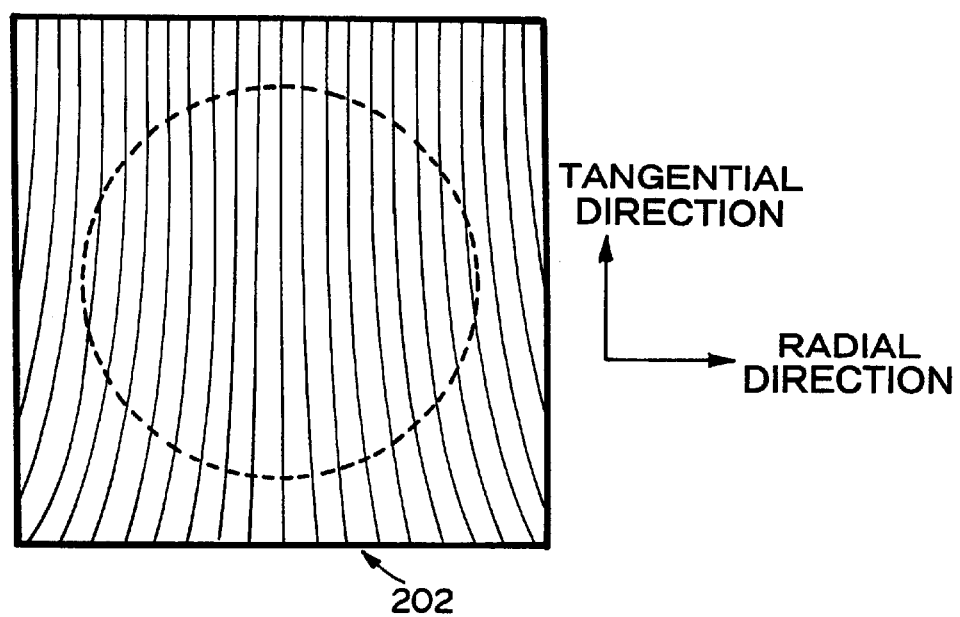
FIG. 25 is a plan view of a polarizing holographic element in the optical head apparatus according to the ninth embodiment of the present invention.

FIG. 25 is a plan view of the polarizing holographic element 202. The polarizing holographic element 202 works as a cylindrical lens for the ±1st order beams, and generatrices on the +1st order beam and generatrices on the −1st order beam form an angle of +45° and an angle of −45° with respect to the radial direction of the disc 7. A direction of the gratings in the polarizing holographic element 202 is approximately parallel with the tangential direction of the disc 7, but a pattern of the gratings is a hyperbola in which the tangential direction and the radial direction of the disc 7 are asymptotes. The polarizing holographic element 202 is constituted so that the two-layered gratings which are composed of the proton exchange area and the dielectric film are formed on the lithium niobate substrate having birefringence, for example. A depth of the proton exchange region and a thickness of the dielectric film are designed suitably so that a phase difference between a line area and a space area of the gratings can be defined independently for ordinary beam and extraordinary beam. When the phase difference between the line area and the space area of the gratings is zero for the ordinary beam on the forward path, incident beams are transmitted approximately 100%. Meanwhile, when the phase difference between the line area and the space area of the gratings is $\pi$ for ordinary beam on the return path, incident beams are diffracted approximately 40.5% as ±1st order beams.

Figure 26:
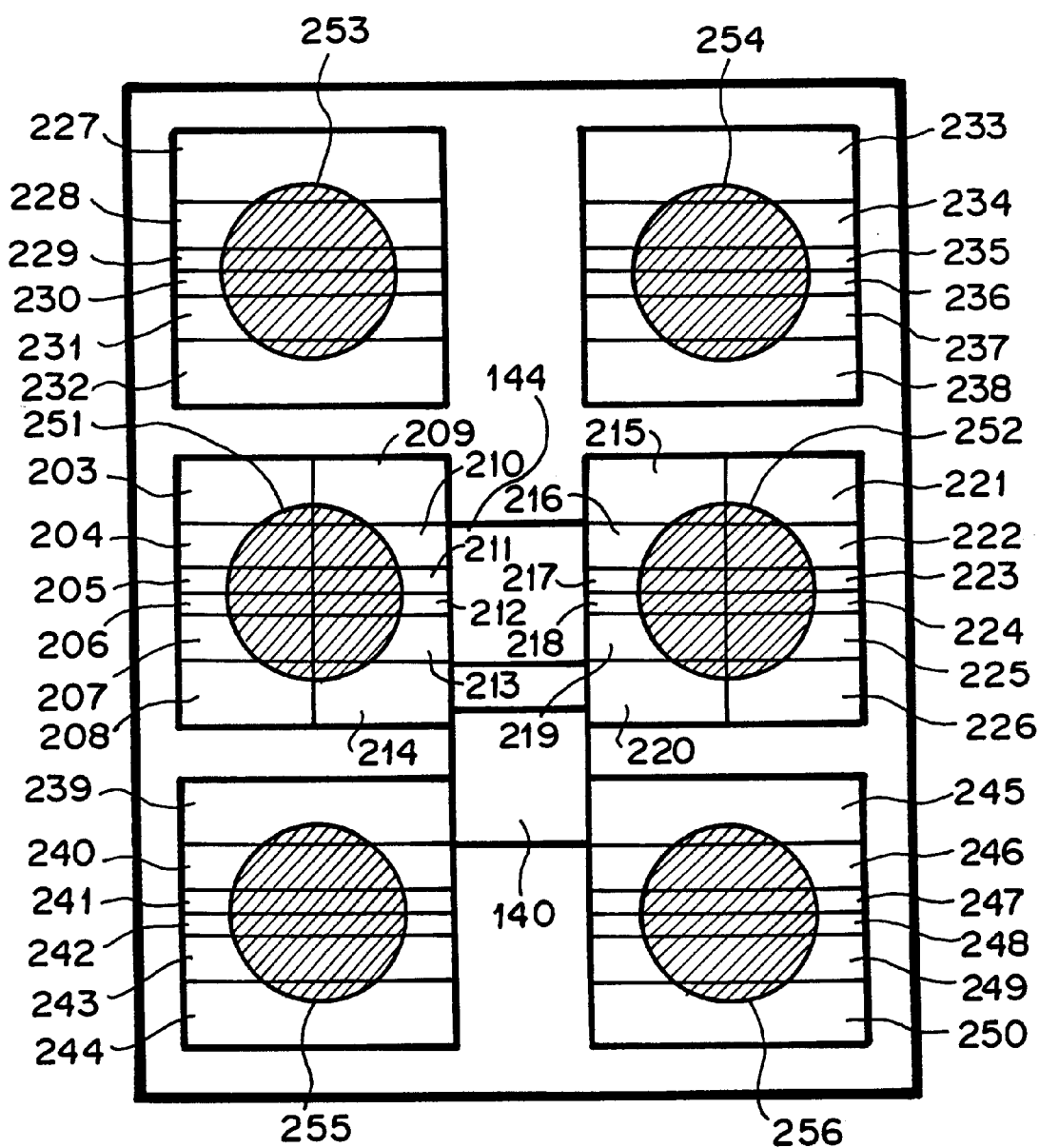
FIG. 26 is a diagram showing a pattern of detection portions of the photo detector in the optical head apparatus according to the ninth embodiment of the present invention and an arrangement of focused spots on the photo detector.
Figure 27:
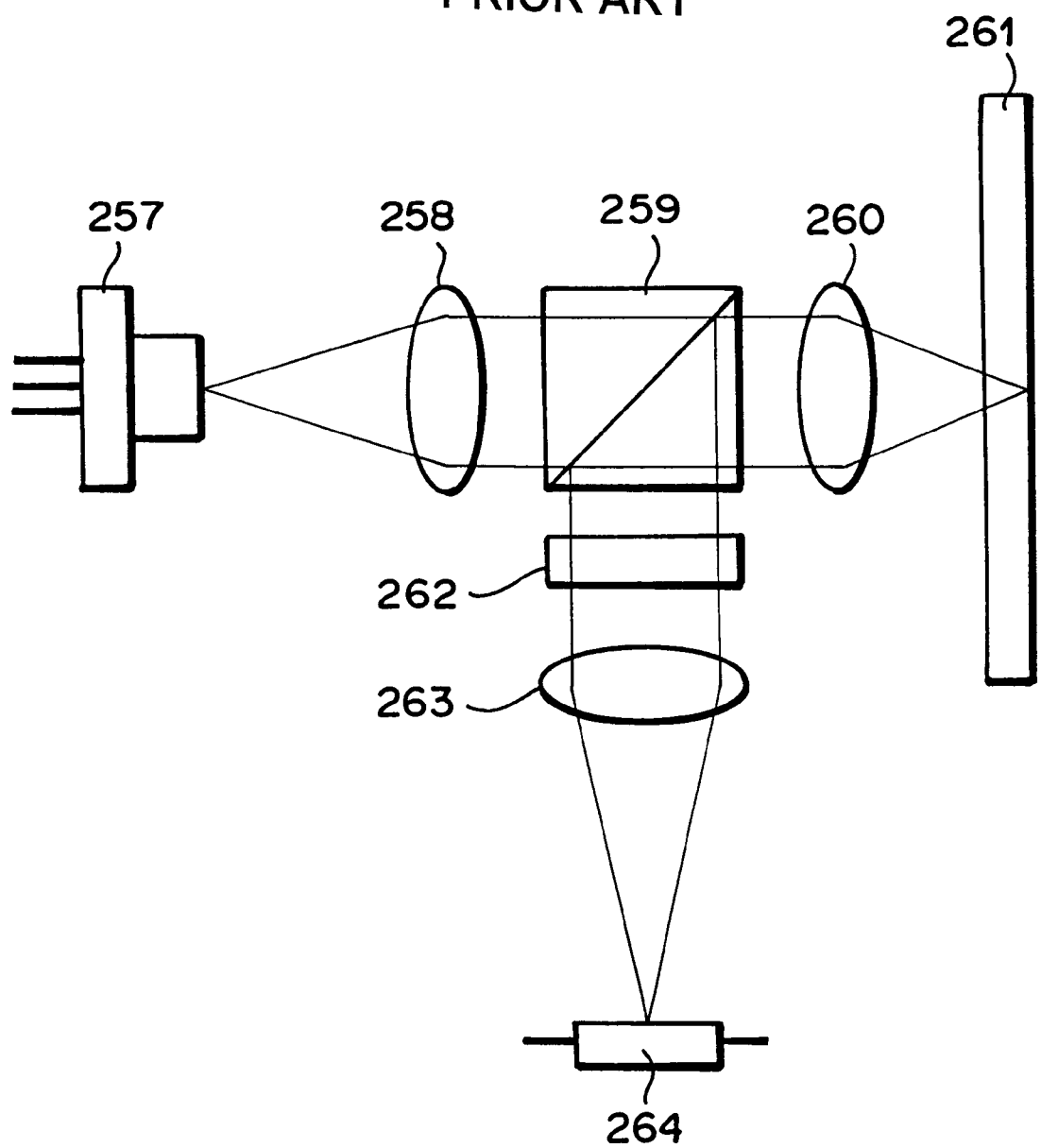
FIG. 27 is a diagram showing a structure of a conventional optical head apparatus.

FIG. 26 shows a pattern of detection portions of the photo detector 201 and the arrangement of focused spots on the photo detector 201. The semiconductor laser 140 and a mirror 144 are provided on the photo detector 201. A beam emitted from the semiconductor laser 140 is reflected by the mirror 144 and goes to the disc 7.

A focused spot 251 corresponds to a +1st order beam diffracted by the polarizing holographic element 202 in 0th order beam from the polarizing diffractive element 142, and is received by detection portions 203 to 214 which are divided into twelve by five dividing lines passing through the optical axis and parallel with the tangential direction of the disc 7 and a dividing line parallel with the radial direction.

A focused spot 252 corresponds to a −1st order beam diffracted by the polarizing holographic element 202 in 0th order beam from the polarizing diffractive element 142, and is received by detection portions 215 to 226 which are divided into twelve by five dividing lines passing through the optical axis and parallel with the tangential direction of the disc 7 and a dividing line parallel with the radial direction.

A focused spot 253 corresponds to a +1st order beam diffracted by the polarizing holographic element 202 in the +1st order beam diffracted from the polarizing diffractive element 142, and is received by detection portions 227 to 232 which are divided into six by five dividing lines parallel with the tangential direction of the disc 7. A focused spot 254 corresponds to a −1st order beam diffracted by the polarizing holographic element 202 in the +1st order beam diffracted from the polarizing diffractive element 142, and is received by detection portions 233 to 238 which are divided into six by five dividing lines parallel with the tangential direction of the disc 7.

A focused spot 255 corresponds to a +1st order beam diffracted by the polarizing holographic element 202 in the −1st order beam diffracted from the polarizing diffractive element 142, and is received by detection portions 239 to 244 which are divided into six by five dividing lines parallel with the tangential direction of the disc 7. A focused spot 256 corresponds to a −1st order beam diffracted by the polarizing holographic element 202 in the −1st order beam diffracted from the polarizing diffractive element 142, and is received by detection portions 245 to 250 which are divided into six by five dividing lines parallel with the tangential direction of the disc 7.

A string of the focused spots 12 to 14 on the disc 7 is in the tangential direction, but the string of the focused spots 251, 253 and 255 and the focused spots 252, 254 and 256 on the photo detector 201 is in the radial direction due to the function of the polarizing holographic element 202 and the collimating lens 2. Moreover, since two generatices in the ±1st order beams of the polarizing holographic element 202 intersect perpendicularly to each other, the intensity distributions on the up and down sides and on the right and left sides in the focused spots 251, 253 and 255 and the focused spots 252, 254 and 256 are opposite to each other respectively.

When outputs from the detection portions 203 to 250 are represented by V203 to V250 respectively, a focusing error signal is obtained by calculation of [(V203+V204+V205+ V212+V213+V214+V218+V219+V220+V221+V222+ V223)−(V206+V207+V208+V209+V210+V211+V215+ V216+V217+V224+V225+V226)] according to the astigmatic method.

A tracking error signal is obtained by calculation of [(V203+V204+V205+V209+V210+V211+V218+V219+ V220+V224+V225+V226)−(V206+V207+V208+V212+ V213+V214+V215+V216+V217+V221+V222+V223)]−K [(V227+V228+V229+V236+V237+V238+V239+V240+ V241+V248+V249+V250)−(V230+V231+V232+V233+ V234+V235+V242+V243+V244+V245+V246+V247)] (K is constant) according to the differential push-pull method.

A radial tilt signal for detecting a radial tilt of the disc 7 is obtained by calculation of [(V203+V205+V207+V209+ V211+V213+V216+V218+V220+V222+V224+V226)− (V204+V206+V208+V210+V212+V214+V215+V217+ V219+V221+V223+V225)]−K[(V227+V229+V231+ V234+V236+V238+V239+V241+V243+V246+V248+ V250)−(V228+V230+V232+V233+V235+V237+V240+ V242+V244+V245+V247+V249)] (K is constant).

In addition, a playback signal by means of the focused spot 12 as the main beam is obtained by calculation of [V203+V204+V205+V206+V207+V208+V209+V210+ V211+V212+V213+V214+V215+V216+V217+V218+ V219+V220+V221+V222+V223+V224+V225+V226].

Various waveforms relating to tracking error signals and radial tilt signals in the optical head apparatus according to the ninth embodiment of the present invention are the same as the various waveforms relating to the tracking error signals and the radial tilt signals in the optical head apparatus according to the first embodiment of the present invention shown in FIG. 6. Namely, even if the objective lens 6 is shifted in the radial direction of the disc 7, an offset is not generated in the radial tilt signal, and the radial tilt of the disc 7 can be detected correctly.

As an embodiment of the optical head of the present invention, there also considers an embodiment such that the arrangement of the focused spots on the disc 7 in the seventh embodiment shown in FIG. 20, the eighth embodiment shown in FIG. 22 and the ninth embodiment shown in FIG. 24 is changed into the arrangement of focused spots on the disc 7 shown in FIG. 10.

As an embodiment of the optical head apparatus of the present invention, there also considers an embodiment such that the diffractive element 3 in the seventh embodiment shown in FIG. 20, the polarizing diffractive element 142 in the eighth embodiment shown in FIG. 22 and the polarizing diffractive element 142 in the ninth embodiment shown in FIG. 24 are replaced by another diffractive element or another polarizing diffractive element.

A plan view of another diffractive element or another polarizing diffractive element is the same as the plan view of the diffractive element 84 shown in FIG. 12, the plan view of the diffractive element 89 shown in FIG. 14, the plan view of the diffractive element 94 shown in FIG. 16 or the plan view of the diffractive element 101 shown in FIG. 18.

In the first embodiment of the optical head apparatus of the present invention shown in FIG. 1, the main beam and the sub beams reflected by the disc 7 are divided by the holographic element 8 shown in FIG. 4 into four parts of regions: regions 15 and 19 which are in a peripheral area of a region where the 0th order beam and the +1st order beam diffracted by the disc 7 are overlapped with each other; regions 16 and 20 which are in a central area of a region where the 0th order beam and the +1st order beam diffracted by the disc 7 are overlapped with each other; regions 17 and 21 which are in a peripheral area of a region where the 0th order beam and the −1st order beam diffracted by the disc 7 are overlapped with each other; and regions 18 and 22 which are in a central area of a region where the 0th order beam and the −1st order beam diffracted by the disc 7 are overlapped with each other. The peripheral area and the central area of the region where the 0th order beam and the +1st order beam diffracted by the disc 7 are overlapped with each other, and the peripheral area and the central area of the region where the 0th order beam and the −1st order beam diffracted by the disc 7 are overlapped with each other are separated by a dividing line parallel with the tangential direction of the disc 7.

In addition, in the seventh embodiment of the optical head apparatus of the present invention shown in FIG. 20, the main beam and the sub beams reflected by the disc 7 are divided by the photo detector 111 shown in FIG. 21 into four parts of regions: the detection portions 112, 114, 118, 120, 124, 126, 130 and 132 which are a peripheral area of a region where the 0th order beam and the +1st order beam diffracted by the disc 7 are overlapped with each other; the detection portions 113, 119, 125 and 131 which are a central area of a region where the 0th order beam and the +1st order beam diffracted by the disc 7 are overlapped with each other; the detection portions 115, 117, 121, 123, 127, 129, 133 and 135 which are a peripheral area of a region where the 0th order beam and the −1st order beam diffracted by the disc 7 are overlapped with each other; and the detection portions 116, 122, 128 and 134 which are a central area of a region where the 0th order beam and the −1st order beam diffracted by the disc 7 are overlapped with each other. The peripheral area and the central area of the region where the 0th order beam and the +1st order beam diffracted by the disc 7 are overlapped with each other, and the peripheral area and the central area of the region where the 0th order beam and the −1st order beam diffracted by the disc 7 are overlapped with each other are separated by a dividing line parallel with the tangential direction of the disc 7.

Figure 28:
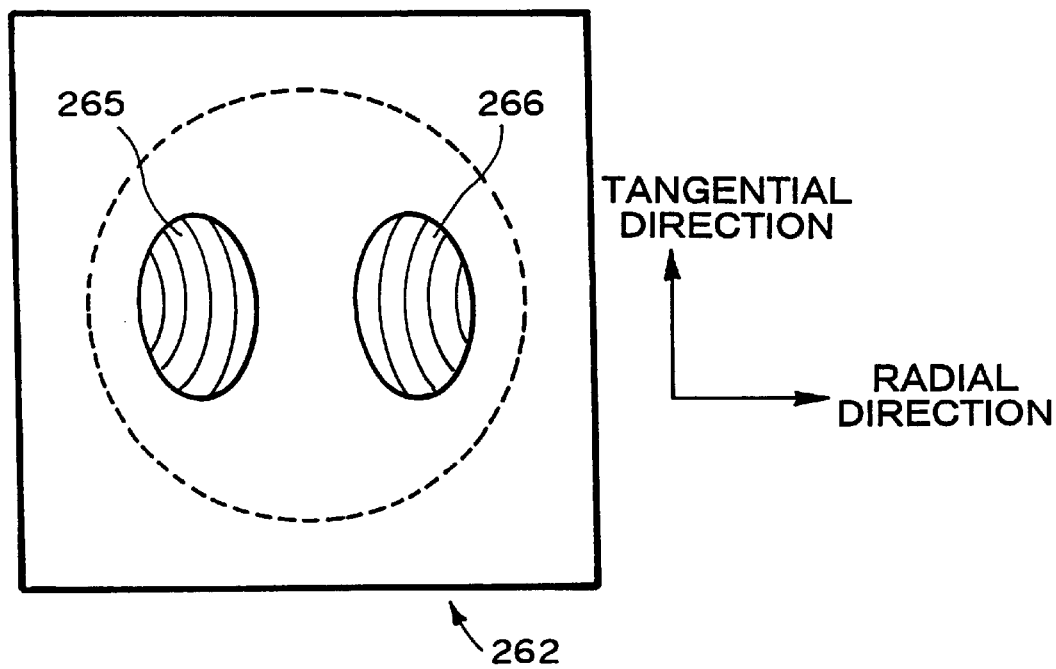
FIG. 28 is a plan view of a holographic element in the conventional optical head apparatus.
Figure 29:
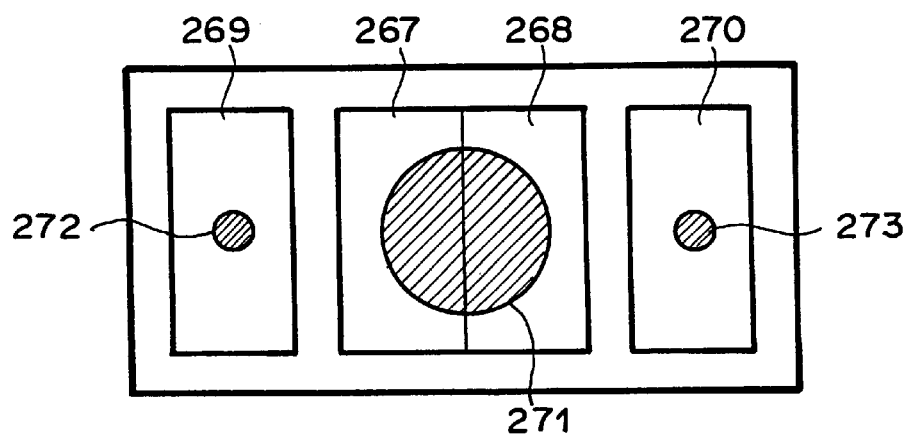
FIG. 29 is a diagram showing a pattern of detection portions of the photo detector in the conventional optical head apparatus and an arrangement of focused spots on the photo detector.

On the contrary, in other possible embodiment, the peripheral area and the central area of the region where the 0th order beam and the +1st order beam diffracted by the disc 7 are overlapped with each other, and the peripheral area and the central area of the region where the 0th order beam and the −1st order beam diffracted by the disc 7 are overlapped with each other may be separated by ellipses. In this case, the holographic element 262 as shown in FIG. 28 is provided with two ellipses 265 and 266. The same structure is applied also to the eighth embodiment of the optical head apparatus of the present invention shown in FIG. 22 and the ninth embodiment of the optical head apparatus of the present invention shown in FIG. 24.

In the first embodiment of the optical head apparatus of the present invention shown in FIG. 1, the seventh embodiment of the optical head apparatus of the present invention shown in FIG. 20, the eighth embodiment of the optical head apparatus of the present invention shown in FIG. 22 and the ninth embodiment of the optical head apparatus of the present invention shown in FIG. 24, the beam emitted from the semiconductor laser is divided into three beams: the 0th order beam; and ±1st order beams by the diffractive element or the polarizing diffractive element, and the 0th order beam is used as the main beam and the ±1st order beams are used as the sub beams. On the contrary, there also considers an embodiment that the beam emitted from the semiconductor laser is divided into two beams: the 0th order beam and the +1st order beam or the −1st order beam by the diffractive element or the polarizing diffractive element, and 0th order beam is used as the main beam and the +1st order beam or the −1st order beam is used as the sub beam.

In addition, instead of the case where the beam emitted from one semiconductor laser is divided into two or three beams by the diffractive element or the polarizing diffractive element so as to be used as the main beam and the sub beam, there is also considered an embodiment that beam emitted from two or three semiconductor lasers are used as the main beam and the sub beams. At this time, the focused spot of the sub beam is shifted to the radial direction of the disc with respect to the focused spot of the main beam, or the phases of the sub beams entering the objective lens are shifted each other on the left side and the right side of the straight line passing through the optical axis and parallel with the tangential direction of the disc. In the latter case, an element such as a phase control element for shifting the phases of the sub beams entering the objective lens on the left side and the right side of the straight line passing through the optical axis and parallel with the tangential direction of the disc is inserted on the optical path of the sub beams. As the phase control element, a plane parallel plate or the like whose thickness is different on the left side and the right side of the straight line passing through the optical path and parallel with the tangential direction of the disc is used.

In the first embodiment of the optical information recording/playback apparatus of the present invention shown in FIG. 8 and the second embodiment of the optical information recording/playback apparatus of the present invention shown in FIG. 9, the calculation circuit and the driving circuit are added to the optical head apparatus according to the first embodiment of the present invention shown in FIG. 1, but there also considers an embodiment that the calculation circuit and the driving circuit are added to the optical head apparatuses according to the second through ninth embodiments. In the embodiments of the optical information recording/playback apparatus of the present invention, the polarity of the circuit composed of the calculation circuit and the driving circuit for correcting the radial tilt is switched on the groove and the land. At this time, it is necessary to detect as to whether the focused spot of the main beam is positioned on the land or the groove of the disc. When address information formed on the disc is reproduced, the land/groove position detection can be made intermittently. However, in the embodiments that calculation circuit and the driving circuit are added to the optical head apparatus according to the second, fourth, fifth and sixth embodiments of the present invention, when a land/groove position detecting signal is used, such a land/groove position detection can be made continuously without reproducing the address information formed on the disc.

Here, the above embodiments explained the optical head apparatus to be used in a phase-change type optical information recording/playback apparatus, but the present invention is not limited to the optical head apparatus to be used in the phase-change type optical information recording/playback apparatus and can be applied also to an optical head apparatus to be used in a magneto-optical type optical information recording/playback apparatus. Moreover, there was explained the disc type optical recording medium which is rotated by a spindle motor, or the like as the optical recording medium, but the optical recording medium is not limited to the disc type optical recording medium, and the optical head apparatus of the present invention is applied to a card type optical recording medium or a tape type optical recording medium. As a result, a tilt in a direction intersecting perpendicularly to the track is detected, and correction is made according to a tilt amount so that a bad influence upon the recording/playback characteristics can be eliminated. This optical recording medium is suitable particularly for an optical recording medium which cannot keep its surface perfectly flat.

What is claimed is:

1. An optical head apparatus which comprises:
   a light source;
   an objective lens for focusing a light from said light source on an optical recording medium;
   a photo detector for receiving a reflected light from said optical recording medium;
   generating means for generating a main beam and a sub beam from said light from said light source;
   dividing means for dividing said main beam and sub beam reflected from said optical recording medium into four regions, that is, a peripheral section R1 of a region where a 0th order beam and a +1st order beam diffracted by said optical recording medium are overlapped with each other, a central section R2 of a region where the 0th order beam and the +1st order beam diffracted by said optical recording medium are overlapped with each other, a peripheral section R3 of a region where the 0th order beam and a −1st order beam diffracted by said optical recording medium are overlapped with each other, and a central section R4 of a region where the 0th order beam and the −1st order beam diffracted by said optical recording medium are overlapped with each other; and
   a photo detector for receiving said main beam and said sub beam which are divided by said dividing means,
   wherein a radial tilt is a difference "A"–"B", where said "A" is a sum of intensities of said regions R1 and R4 and said "B" is a sum of intensities of said regions R2 and R3.

2. The optical head apparatus according to claim 1, wherein said generating means is a diffractive element for generating a 0th order main beam, a +1st order sub beam and a −1st order sub beam from said light from said light source.

3. The optical head apparatus according to claim 1, wherein said dividing means is a holographic element.

4. The optical head apparatus according to claim 1, wherein said sub beams focused on said optical recording medium are shifted from said main beam in a radial direction of said optical recording medium.

5. The optical head apparatus according to claim 1, wherein said sub beams entering said objective lens are shifted from each other on a left side and a right side of a straight line passing through an optical axis and parallel with a tangential direction of said optical recording medium.

6. The optical head apparatus according to claim 1, wherein said radial tilt is detected by said photo detector which has a plurality of light detecting portions for detecting separately a component of said difference contributed by said main and a component of said difference contributed by said sub beams.

7. The optical head apparatus according to claim 1, wherein said sections R1 and R2 are separated with said sections R3 and R4 by straight lines parallel to a tangential direction of said optical recording medium.

8. The optical head apparatus according to claim 1, wherein said sections R1 and R2 are separated with said sections R3 and R4 by ellipses on a radial direction of said optical recording medium.

9. The optical head apparatus according to claim 4, wherein said main beam is positioned on a track (groove or land) of said optical recording medium, and said sub beams are positioned on a land or groove adjacent to said track.

10. The optical head apparatus according to claim 4, wherein said main beam is positioned on a track (groove or land) of said optical recording medium, and said sub beams are positioned on a boundary between a land or groove adjacent to said track and said track.

11. The optical head apparatus according to claim 10, wherein:
   a land/groove position detecting signal is generated on the basis of a push-pull signal by means of said sub beams; and
   a detection is made as to whether said main beam is positioned on a land or groove by a sign of said land/groove position detecting signal.

12. The optical head apparatus according to claim 2, wherein said diffractive element for generating said main beam and said sub beams includes at least two grating areas each of whose phases are different from each other.

13. The optical head apparatus according to claim 12, wherein said main beam and sub beams are positioned on the same track.

14. The optical head apparatus according to claim 12, wherein:
   said diffractive element is constituted so that diffraction gratings are formed in a region including an effective diameter of said objective lens, and said region is divided into two regions as a first region on the left side and a second region on the right side by a straight line passing through an optical axis of said objective lens and parallel with a tangential direction of said optical recording medium; and and a phase of the gratings in said first region are shifted by π from that of the gratings in said second region.

15. The optical head apparatus according to claim 12, wherein:

said diffractive element is constituted so that diffraction gratings are formed in a region including an effective diameter of said objective lens, and said region is divided into two regions as a first region on the left side and a second region on the right side by a straight line passing through an optical axis of said objective lens and parallel with a tangential direction of said optical recording medium; and and a phase of the gratings in said first region are shifted by π/2 from that of the gratings in said second region.

16. The optical head apparatus according to claim 12, wherein:

said diffractive element is constituted so that diffraction gratings are formed in a region including an effective diameter of said objective lens, and said region is divided into four regions as a first region on the upper left side and a second region on the upper right side, a third region on the lower left side and a fourth region on the lower right side by straight lines passing through an optical axis of said objective lens and parallel and perpendicular to a tangential direction of said optical recording medium; and phases of the gratings in said first and fourth region are shifted by π/2 from those of the gratings in said second and third region.

17. The optical head apparatus according to claim 12, wherein:

said diffractive element is constituted so that diffraction gratings are formed in a region including an effective diameter of said objective lens, and said region is divided into six regions as a first region on the central left side and a second region on the central right side, a third region on the upper left side, a fourth region on the upper right side, a fifth region on the lower left side and a sixth region on the lower right side, by a straight line passing through an optical axis of said objective lens and parallel to a tangential direction of said optical recording medium and two straight lines parallel to a radial direction; and phases of the gratings in said first, fourth and sixth region are shifted by π/2 from those of the gratings in said second, third and fifth region.

18. The optical head apparatus according to claim 12, wherein:

a land/groove position detecting signal is generated on the basis of a push-pull signal by means of said sub beams; and a detection is made as to whether said main beam is positioned on a land or groove by a sign of said land/groove position detecting signal.

19. The optical head apparatus according to claim 1, wherein a plurality of light sources are provided as said light source, and beam emitted from said plurality of light sources are used as said main beam and a sub beam.

20. The optical head apparatus according to claim 19, wherein a phase control element, for shifting phases of said sub beam entering said objective lens on the left side and the right side of the straight line passing through the optical axis and parallel with the tangential direction of said optical recording medium, is provided on an optical path of the sub beam.

21. The optical head apparatus according to claim 20, wherein said phase control element is a plane parallel plate whose thickness is different on the left side and the right side of the straight line passing through the optical axis and parallel with the tangential direction of said optical recording medium.

22. An optical information recording and playback apparatus which comprises:

a light source;

an objective lens for focusing a light from said light source on an optical recording medium;

a photo detector for receiving a reflected light from said optical recording medium;

generating means for generating a main beam and a sub beam from said light from said light source;

dividing means for dividing said main beam and sub beam reflected from said optical recording medium into four regions, that is, a peripheral section R1 of a region where a 0th order beam and a +1st order beam diffracted by said optical recording medium are overlapped with each other, a central section R2 of a region where the 0th order beam and the +1st order beam diffracted by said optical recording medium are overlapped with each other, a peripheral section R3 of a region where the 0th order beam and a −1st order beam diffracted by said optical recording medium are overlapped with each other, and a central section R4 of a region where the 0th order beam and the −1st order beam diffracted by said optical recording medium are overlapped with each other; and a photo detector for receiving said main beam and said sub beam which are divided by said dividing means, wherein a radial tilt is a difference "A"–"B", where said "A" is a sum of intensities of said regions R1 and R4 and said "B" is a sum of intensities of said regions R2 and R3; and said radial tilt is corrected on the basis of said difference.

23. The optical information recording and playback apparatus according to claim 22, wherein said generating means is a diffractive element for generating a 0th order main beam, a +1st order sub beam and a −1st order sub beam from said light from said light source.

24. The optical information recording and playback apparatus according to claim 22, wherein said dividing means is a holographic element.

25. The optical information recording and playback apparatus according to claim 22, wherein said objective lens is tilted in a radial direction of said optical recording medium for correcting said radial tilt.

26. The optical information recording and playback apparatus according to claim 22, wherein said whole optical head apparatus is tilted in a radial direction of said optical recording medium for correcting said radial tilt.

27. The optical information recording and playback apparatus according to claim 22, wherein a liquid crystal optical element is provided in an optical system of said optical head apparatus, and a voltage is applied to said liquid crystal optical element for correcting said radial tilt.

28. The optical information recording and playback apparatus according to claim 22, wherein a detection is made as to whether said main beam focused on said optical recording medium is positioned on a land or groove, and a polarity of a circuit for correcting the radial tilt is switched for the groove and the land of said optical recording medium.

29. The optical information recording and playback apparatus according to claim 28, characterized in that address information formed on said optical recording medium is read out so that a position of the land or the groove is detected.

30. An optical head which comprises:

a semiconductor laser for emitting a laser beam;

a collimating lens for converting the beam emitted from said semiconductor laser into a parallel beam;

a diffractive element for dividing a transmitted beam of said collimating lens into a 0th order beam as a main beam and ±1st order beams as sub beams;

a polarizing beam splitter for transmitting the three beams divided by said diffractive element;

a quarter wave plate for converting the transmitted beams of said polarizing beam splitter from linear polarized beams into circular polarized beams;

an objective lens for focusing the transmitted beams of said quarter wave plate on an optical recording medium;

a holographic element for diffracting the three beams which are reflected from said optical recording medium, are transmitted through said objective lens in an opposite direction, are transmitted through said quarter wave plate to be converted from circular polarized beams into linear polarized beams whose polarizing direction intersects perpendicularly to that in a forward path and are reflected by said polarizing beam splitter as +1st order beams;

a lens for focusing the beams diffracted by said holographic element; and a photo detector for receiving the beams transmitted through said focusing lens, wherein said holographic element divides the main beam and the sub beams reflected from said optical recording medium into four regions as a peripheral section of a region where a 0th order beam and a +1st order beam diffracted by said optical recording medium are overlapped with each other, a central section of a region where the 0th order beam and the +1st order beam diffracted by said optical recording medium are overlapped with each other, a peripheral section of a region where the 0th order beam and a −1st order beam diffracted by said optical recording medium are overlapped with each other and a central section of a region where the 0th order beam and the −1st order beam diffracted by said optical recording medium are overlapped with each other.

31. An optical information recording/playback apparatus which comprises:

an optical head apparatus comprising:

a semiconductor laser for emitting a laser beam;

a collimating lens for converting the beam emitted from said semiconductor laser into a parallel beam;

a diffractive element for dividing a transmitted beam of said collimating lens into a 0th order beam as a main beam and +1st order beams as sub beams;

a polarizing beam splitter for transmitting the three beams divided by said diffractive element;

a quarter wave plate for converting the transmitted beams of said polarizing beam splitter from linear polarized beams into circular polarized beams;

an objective lens for focusing the transmitted beams of said quarter wave plate on an optical recording medium;

a holographic element for diffracting the three beams which are reflected from said optical recording medium, are transmitted through said objective lens in an opposite direction, are transmitted through said quarter wave plate to be converted from circular polarized beams into linear polarized beams whose polarizing direction intersects perpendicularly to that in a forward path and are reflected by said polarizing beam splitter as +1st order beams;

a lens for focusing the beams diffracted by said holographic element; and a photo detector for receiving the beams transmitted through said focusing lens, wherein said holographic element divides the main beam and the sub beams reflected from said optical recording medium into four regions of a peripheral section of a region where a 0th order beam and a +1st order beam diffracted by said optical recording medium are overlapped with each other, a central section of a region where the 0th order beam and the +1st order beam diffracted by said optical recording medium are overlapped with each other, a peripheral section of a region where the 0th order beam and a −1st order beam diffracted by said optical recording medium are overlapped with each other and a central section of a region where the 0th order beam and the −1st order beam diffracted by said optical recording medium are overlapped with each other;

a calculation circuit for calculating a radial tilt signal based on outputs from respective detection portions of said photo detector; and a driving circuit for tilting said objective lens in the radial direction of said optical recording medium by means of an actuator so that the radial tilt signal becomes zero.

* * * * *